United States Patent
Lee et al.

(10) Patent No.: US 11,233,892 B2
(45) Date of Patent: Jan. 25, 2022

(54) METHOD FOR PROVIDING CONTENT AND ELECTRONIC DEVICE FOR SUPPORTING SAME

(71) Applicant: Samsung Electronics Co., Ltd., Suwon-si (KR)

(72) Inventors: Sun Kee Lee, Suwon-si (KR); Doo Suk Kang, Suwon-si (KR); Bo Kun Choi, Suwon-si (KR); Geon Soo Kim, Suwon-si (KR); Seung Nyun Kim, Suwon-si (KR); Young Kyoo Kim, Suwon-si (KR); Han Jib Kim, Suwon-si (KR); Gyu Cheol Choi, Suwon-si (KR); Cheong Jae Lee, Suwon-si (KR); Seung Young Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,133

(22) PCT Filed: Oct. 31, 2018

(86) PCT No.: PCT/KR2018/013076
§ 371 (c)(1),
(2) Date: May 22, 2020

(87) PCT Pub. No.: WO2019/103341
PCT Pub. Date: May 31, 2019

(65) Prior Publication Data
US 2020/0396326 A1    Dec. 17, 2020

(30) Foreign Application Priority Data
Nov. 24, 2017  (KR) .................. 10-2017-0157980

(51) Int. Cl.
*H04M 1/72409* (2021.01)
*H04W 76/14* (2018.01)
(Continued)

(52) U.S. Cl.
CPC ......... *H04M 1/72409* (2021.01); *H04W 4/80* (2018.02); *H04W 8/005* (2013.01);
(Continued)

(58) Field of Classification Search
CPC ......... H04M 1/72409; H04M 1/72412; H04M 1/72403; H04W 76/14; H04W 4/80;
(Continued)

(56) References Cited

U.S. PATENT DOCUMENTS 8,301,692 B1    10/2012  Hamaker et al.
10,415,980 B1 *  9/2019  Buscemi ............ G01C 21/206
(Continued)

FOREIGN PATENT DOCUMENTS

EP           3026943 A1     6/2016
KR      10-2014-0132625 A  11/2014
(Continued)

OTHER PUBLICATIONS

International Search Report and Written Opinion of the International Searching Authority in connection with International Application No. PCT/KR2018/013076 dated Feb. 8, 2019, 11 pages.
(Continued)

*Primary Examiner* — Eugene Yun

(57) ABSTRACT

An electronic device according to various embodiments of the present disclosure includes: a housing; a user interface exposed through a portion of the housing; at least one communication circuit configured to discover and connect to another electronic device wirelessly without an access point or a base station; at least one processor operatively connected with the user interface and the communication cir-
(Continued)

cuit; and a memory operatively connected with the processor, wherein, when being executed, the memory stores instructions that cause the processor to transmit a plurality of first beacon signals for wireless connection by using the communication circuit during first time periods, to detect at least one second beacon signal for wireless connection, transmitted from an external device, by using the communication circuit, during one period of second time periods which are different from the first time periods, to receive multimedia data from an external server after detecting the at least one second beacon signal, and to output at least one of an audio, an image, or a video based at least in part on the multimedia data. Other embodiments are possible.

20 Claims, 39 Drawing Sheets

(51) Int. Cl.
*H04W 4/80* (2018.01)
*H04W 8/00* (2009.01)
*H04W 40/24* (2009.01)
*H04W 84/18* (2009.01)

(52) U.S. Cl.
CPC ......... *H04W 40/244* (2013.01); *H04W 76/14* (2018.02); *H04W 84/18* (2013.01)

(58) Field of Classification Search
CPC ... H04W 8/005; H04W 40/244; H04W 84/18; H04W 4/00
USPC ....................................................... 455/41.3
See application file for complete search history.

(56) References Cited

U.S. PATENT DOCUMENTS

| | | |
|---|---|---|
| 2007/0220100 A1 | 9/2007 | Rosenberg |
| 2007/0286136 A1* | 12/2007 | Rittle ............... H04W 52/0216 370/338 |
| 2012/0078997 A1 | 3/2012 | Evans et al. |
| 2014/0334636 A1 | 11/2014 | Park et al. |
| 2015/0319288 A1 | 11/2015 | Kahn et al. |
| 2017/0289602 A1 | 10/2017 | Hwang et al. |
| 2017/0357477 A1 | 12/2017 | Im et al. |
| 2018/0146045 A1 | 5/2018 | Kang |
| 2018/0262865 A1* | 9/2018 | Lepp ................ H04W 52/0235 |

FOREIGN PATENT DOCUMENTS

| | | |
|---|---|---|
| KR | 10-2016-0026382 A | 3/2016 |
| WO | 2016104988 A1 | 6/2016 |
| WO | 2016190557 A1 | 12/2016 |

OTHER PUBLICATIONS

Supplementary European Search Report dated Jan. 12, 2021 in connection with European Patent Application No. 18 88 0543, 7 pages.
Notice of Preliminary Rejection dated Nov. 16, 2021, in connection with Korean Application No. 10-2017-0157980, 15 pages.

* cited by examiner

|  | Genre 1 | Genre 2 | Genre 3 | Genre 4 | Genre 5 |
|---|---|---|---|---|---|
| First external device user account (A account) | 1 | 2 | 1 | 3 | 2 |
| Second external device user account (B account) | 3 | 2 | 1 | 5 | 2 |
| Third external device user account (C account) | 6 | 2 | 4 | 2 | 1 |

FIG.15

|  | Song 1 | Song 2 | Song 3 | Song 4 | Song 5 |
|---|---|---|---|---|---|
| A account | 0 | 1 | 2 | 3 | 4 |
| B account | 8 | 2 | 5 | 1 | 8 |
| C account | 2 | 4 | 1 | 6 | 2 |
| Average | 3.333333 | 2.333333 | 2.666667 | 3.333333 | 4.666667 |

FIG.16

METHOD FOR PROVIDING CONTENT AND ELECTRONIC DEVICE FOR SUPPORTING SAME

CROSS-REFERENCE TO RELATED APPLICATIONS

This application is a 371 National Stage of International Application No. PCT/KR2018/013076, filed Oct. 31, 2018, which claims priority to Korean Patent Application No. 10-2017-0157980, filed Nov. 24, 2017, the disclosures of which are herein incorporated by reference in their entirety.

BACKGROUND

1. Field

Various embodiments of the present disclosure relate to a method for providing a content and an electronic device supporting the same.

2. Description of Related Art

With the development of information and communication technology and semiconductor technology, various types of electronic devices are developing into multimedia devices providing various multimedia services. For example, electronic devices are able to provide various multimedia services such as a music streaming service, a video playing service, an advertisement providing service, or the like.

SUMMARY

In related-art technology, an external device (for example, a mobile electronic device) requesting output (or playing) of a content should be directly connected with an electronic device (for example, a speaker or the like) which is capable of outputting the content to request the electronic device to output the content.

Various embodiments of the present disclosure relate to a method by which an electronic device capable of outputting a content can output a content when an external device requesting output of the content is not directly connected with the electronic device capable of outputting the content, and an electronic device supporting the same.

The technical objects to be achieved by the present disclosure are not limited to those mentioned above, and other technical objects that are not mentioned above may be clearly understood to those skilled in the art based on the description provided below.

According to various embodiments of the present disclosure, an electronic device includes: a housing; a user interface exposed through a portion of the housing; at least one communication circuit configured to discover and connect to another electronic device wirelessly without an access point or a base station; at least one processor operatively connected with the user interface and the communication circuit; and a memory operatively connected with the processor, wherein, when being executed, the memory stores instructions that cause the processor to transmit a plurality of first beacon signals for wireless connection by using the communication circuit during first time periods, to detect at least one second beacon signal for wireless connection, transmitted from an external device, by using the communication circuit, during one period of second time periods which are different from the first time periods, to receive multimedia data from an external server after detecting the at least one second beacon signal, and to output at least one of an audio, an image, or a video based at least in part on the multimedia data.

According to various embodiments of the present disclosure, a method for providing a content in an electronic device includes: transmitting a plurality of first beacon signals for wireless connection by using a communication circuit during first time periods; detecting at least one second beacon signal for wireless connection, transmitted from an external device, by using the communication circuit, during one period of second time periods which are different from the first time periods; receiving multimedia data from an external server after detecting the at least one second beacon signal; and outputting at least one of an audio, an image, or a video based at least in part on the multimedia data.

The method for providing a content according to various embodiments of the present disclosure and the electronic device supporting the same can provide a content reflecting profile information of a user to the user in a state in which the electronic device is not directly connected with an external device.

The method for providing a content according to various embodiments of the present disclosure and the electronic device supporting the same can provide a content through a peripheral device based on a user's location.

BRIEF DESCRIPTION OF THE DRAWINGS

FIG. 15 is a view to illustrate a method by which the external server obtains preference for profile information according to various embodiments of the present disclosure;

FIG. 16 is a view to illustrate a method by which the external server scores contents according to various embodiments of the present disclosure;

DETAILED DESCRIPTION

Figure 1:
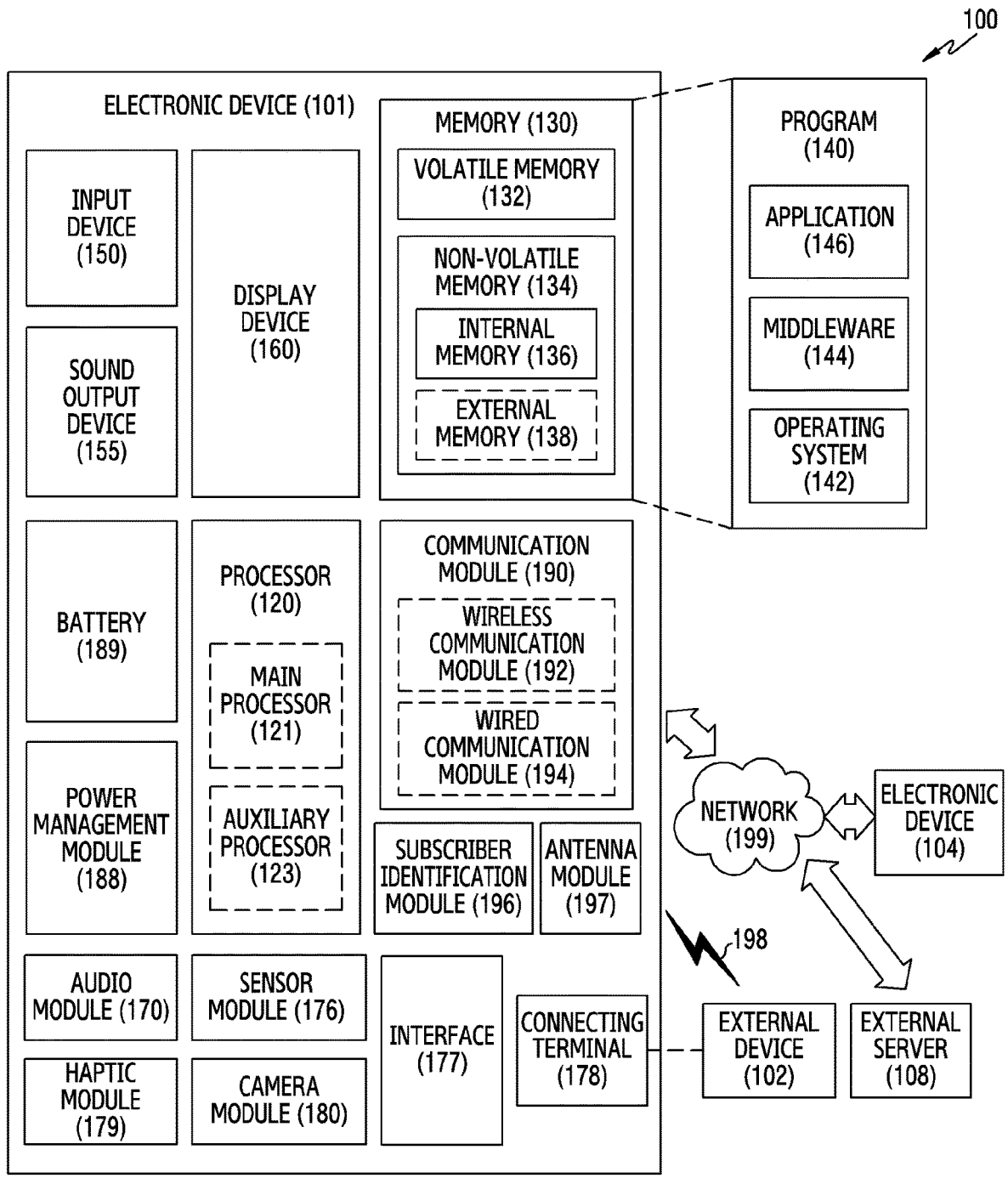
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an external device 102 via a first network 198 (e.g., a short-range wireless communication network), or an electronic device 104 or an external server 108 via a second network 199 (e.g., a long-range wireless communication network). According to an embodiment, the electronic device 101 may communicate with the electronic device 104 via the external server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an external device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external device 102, the electronic device 104, or the external server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network using subscriber information stored in the subscriber identification module 196.

The antenna module 197 may include at least one antenna for transmitting or receiving a signal or power to or from the outside (e.g., the external electronic device). According to an embodiment, the communication module 190 (e.g., the wireless communication module 192) may transmit or receive the signal to or from the external electronic device through at least one antenna appropriate for a communication scheme used in the communication network.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the external server 108 coupled with the second network 199. Each of the external device 102 and the electronic device 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
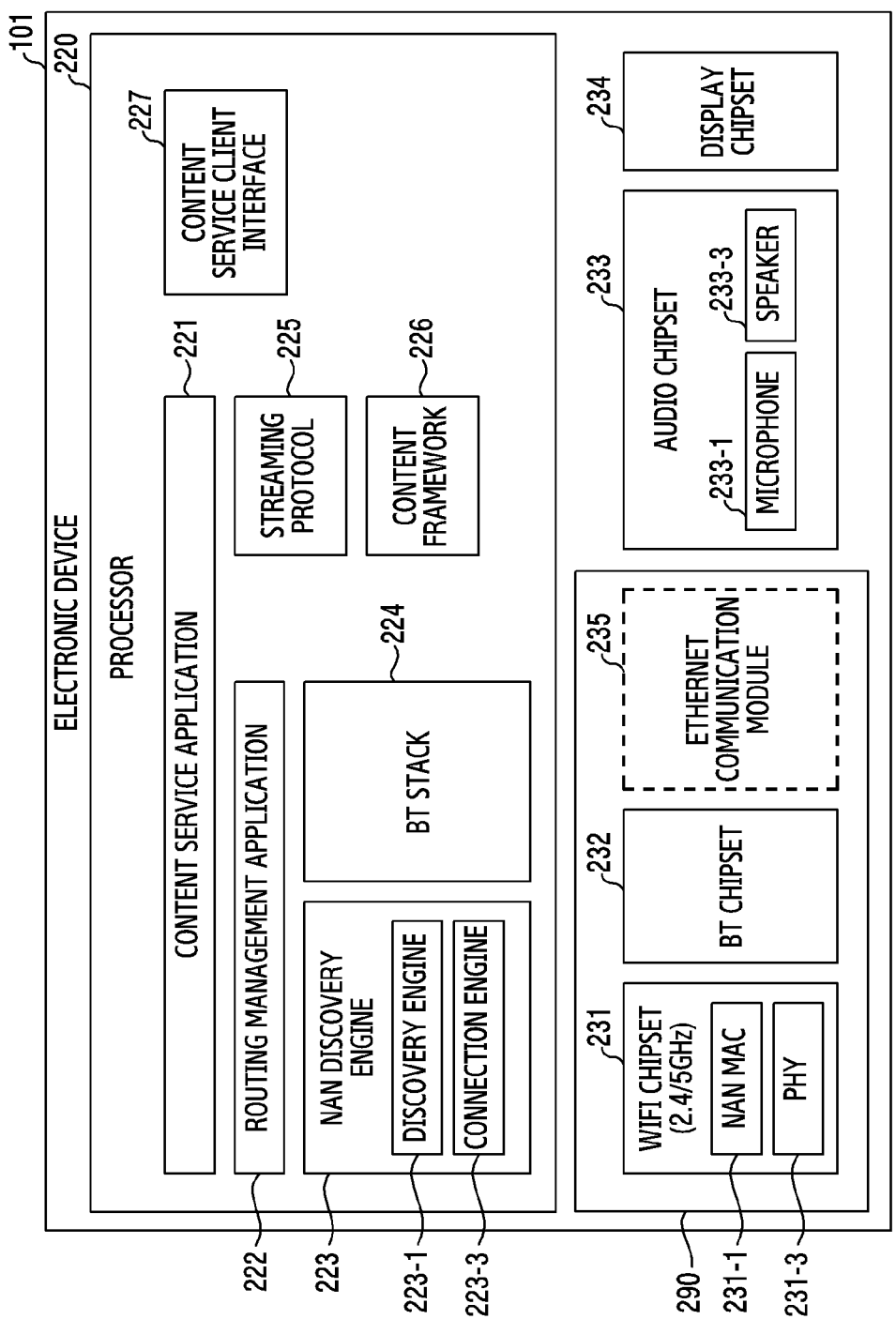
FIG. 2 is a block diagram illustrating a configuration of an electronic device according to various embodiments.

FIG. 2 is a block diagram illustrating a configuration of an electronic device according to various embodiments.

Referring to FIG. 2, the electronic device 101 may include a processor 220 (for example, the processor 120), a communication module 290 (for example, the communication module 190) including a WiFi chipset 231, a Bluetooth (BT)

chip et 232, and an Ethernet communication module 235, an audio chipset 233, and a display chipset 234 (for example, the display device 160).

In an embodiment, the processor 220 may include a content service application 221, a routing management application 222, a NAN discovery engine 223, a BT stack 224, a streaming protocol 225, a content framework 226, and a content service client interface 227.

In an embodiment, the content service application 221 may include an application for executing a content such as an audio or a video. For example, the content service application 221 may correspond to an application related to a streaming music service. However, this should not be considered as limiting.

In an embodiment, the routing management application 222 may divide data provided from a physical layer, and may route the data via an appropriate path. For example, the routing management application 222 may deliver data related to a content provided from a physical layer to the content service application 221.

In an embodiment, the NAN discovery engine 223 is an element for supporting NAN, and may include a discovery engine 223-1 and a connection engine 223-3. In an embodiment, the NAN discovery engine 223 may be an element necessary for transmitting and receiving a discovery beacon, a synchronization beacon packet, and a service discovery packet of NAN.

In an embodiment, the BT stack 224 may be an element for supporting Bluetooth communication.

In an embodiment, the streaming protocol 225 may include, for example, an instruction or the like for receiving a streaming service from a server or the like.

In an embodiment, the content framework 226 may be an element for generating a content. For example, when audio or video data is received from a server, the content framework 226 may provide information for generating a content, based at least in part on the audio or video data.

In an embodiment, the content service client interface 227 may correspond to an element for managing a service for receiving a content.

In an embodiment, the WiFi chipset 231 may correspond to an element for supporting WiFi communication (for example, NAN or the like), and may include a NAN medium access control (MAC) (or a NAN MAC layer) 231-1, and a PHY (or a physical layer) 231-3.

In an embodiment, the BT chipset 232 may correspond to an element for supporting Bluetooth communication (for example, Bluetooth low energy (BLE) or the like). Furthermore, the Bluetooth communication may be a device supporting a Bluetooth mesh network.

In an embodiment, the Ethernet communication module 235 may correspond to an element for supporting communication using Ethernet. In an embodiment, the electronic device 101 may not include the Ethernet communication module 235.

In an embodiment, the audio chipset 233 may be an element for inputting or outputting audio data, and may include a microphone 233-1 (the input device 150) and a speaker 233-3 (for example, the sound output device 155).

In an embodiment, the display chipset 234 (for example, the display device 160) may correspond to an element for displaying a content or the like.

In an embodiment, the electronic device 101 may further include elements in addition to the elements illustrated in FIG. 2, or may include other elements substituting for some elements. In an embodiment, the electronic device 101 may include a configuration omitting some of the elements illustrated in FIG. 2.

Figure 3:
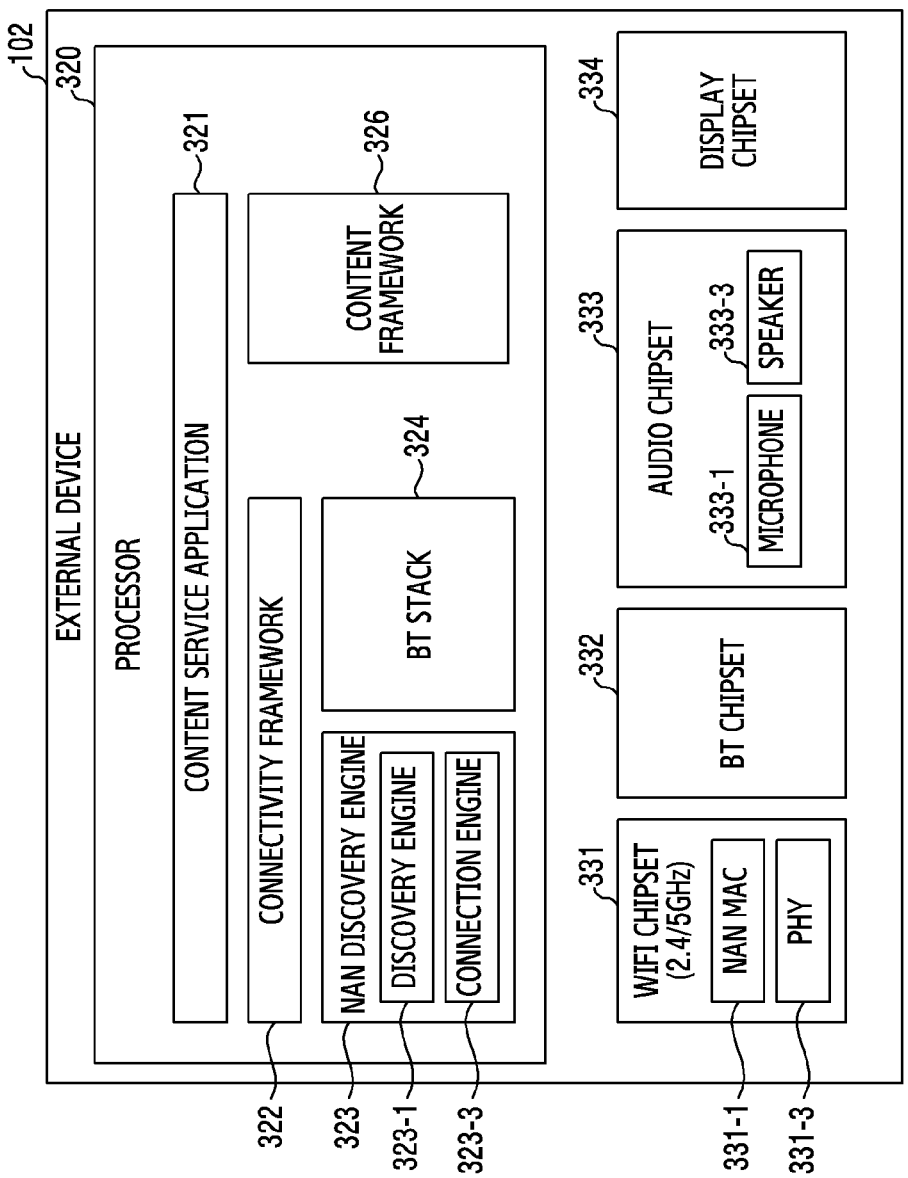
FIG. 3 is a block diagram illustrating a configuration of an external device according to various embodiments.

FIG. 3 is a block diagram illustrating a configuration of an external device according to various embodiments.

Referring to FIG. 3, the external device (for example, the external device 102) may include a processor 320, a WiFi chipset 331, a BT chipset 332, an audio chipset 333, and a display chipset 334.

In an embodiment, the processor 320 may include a content service application 321, a connectivity framework 322, a NAN discovery engine 323, a BT stack 324, and a content framework 326.

In an embodiment, the content service application 321 may include an application for executing a content such as an audio or a video. For example, the content service application 321 may correspond to an application related to a streaming music service. However, this should not be considered as limiting.

In an embodiment, the connectivity framework 322 may be an element for managing connectivity with the electronic device 101 or the external server 108.

In an embodiment, the NAN discovery engine 323 is an element for supporting NAN, and may include a discovery engine 323-1 and a connection engine 323-3. In an embodiment, the NAN discovery engine 323 may be an element necessary for transmitting and receiving a NAN discovery beacon, a NAN synchronization bean packet, and a NAN service discovery frame.

In an embodiment, the BT stack 324 may be an element for supporting Bluetooth communication.

In an embodiment, the content framework 326 may be an element for generating a content. For example, when audio or video data is received from the external server 108 or the like, the content framework 326 may provide information for generating a content, based at least in part on the audio or video data.

In an embodiment, the WiFi chipset 331 may correspond to an element for supporting WiFi communication (for example, NAN or the like), and may include a NAN MAC (or a NAN MAC layer) 331-1 and a PHY (ora physical layer) 331-3.

In an embodiment, the BT chipset 332 may correspond to an element for supporting Bluetooth communication (for example, BLE or the like).

In an embodiment, the audio chipset 333 may be an element for inputting or outputting audio data, and may include a microphone 333-1 and a speaker 333-3.

In an embodiment, the display chipset 334 may correspond to an element for displaying a content or the like, for example.

In an embodiment, the external device 102 may further include elements, in addition to the elements illustrated in FIG. 3, or may include other elements substituting for some elements. In an embodiment, the external device 102 may include a configuration omitting some of the elements illustrated in FIG. 3. In an embodiment, the external device 102 of FIG. 3 may include all or some of the elements of the electronic device 101.

Figure 4:
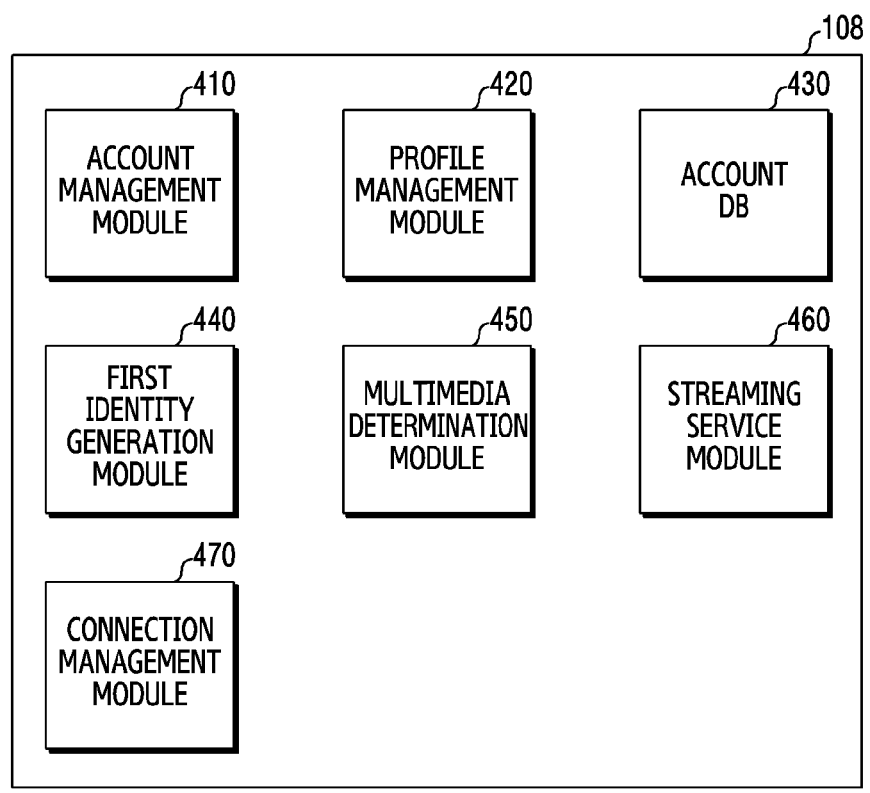
FIG. 4 is a block diagram illustrating a configuration of an external server according to various embodiments.

FIG. 4 is a block diagram illustrating a configuration of an external server according to various embodiments.

Referring to FIG. 4, the external server (for example, the external server 108) may include an account management module 410, a profile management module 420, an account database (DB) 430, a first identity generation module 440, a multimedia determination module 450, a streaming service module 460, and a connectivity management module 470.

In an embodiment, the account management module 410 may be an element for managing an account of a device user who subscribes (or registers) to a service supported by the external server 108.

In an embodiment, the profile management module 420 may be an element for managing a profile of a device user who subscribes to a service supported by the external server 108.

In an embodiment, the account DB 430 may be an element for storing information regarding an account of a device user who subscribes to a service supported by the external server 108. In an embodiment, the account DB 430 may store profile information of the device user in association with the account of the device user.

In an embodiment, the first identity generation module 440 may be an element for generating an identity related to multimedia data generated by the external server 108.

In an embodiment, the multimedia determination module 450 may be an element for determining a content to be outputted at the electronic device 101, based at least in part on information or the like received from the electronic device 101, and for generating multimedia data regarding the determined content.

In an embodiment, the streaming service module 460 may be an element for providing a streaming service to the electronic device 101.

In an embodiment, the connectivity management module 470 may be a module for managing connectivity with an external device (for example, the electronic device 101, the electronic device 104), or the electronic device 101.

The electronic device 101 according to various embodiments of the present disclosure may include: a housing; a user interface exposed through a portion of the housing; at least one communication circuit (for example, the communication module 190, the communication module 290) configured to discover and connect to another electronic device (for example, the external device 102) wirelessly without an access point or a base station; at least one processor 120 operatively connected with the user interface and the communication circuit (for example, the communication module 190); and a memory (for example, the memory 130) operatively connected with the processor 120, wherein, when being executed, the memory (for example, the memory 130) stores instructions that cause the processor 120 to transmit a plurality of first beacon signals for wireless connection by using the communication circuit (for example, the communication module 190) during first time periods, to detect at least one second beacon signal for wireless connection, transmitted from the external device 120, by using the communication circuit (for example, the communication module 190), during one period of second time periods which are different from the first time periods, to receive multimedia data from the external server 108 after detecting the at least one second beacon signal, and to output at least one of an audio, an image, or a video based at least in part on the multimedia data.

According to various embodiments, the memory may store instructions that cause the processor 120 to transmit information regarding the external device to the external server 108 after detecting the at least one second beacon signal.

According to various embodiments, the memory may further store instructions that cause the processor to determine that the at least one second beacon signal is not detected anymore, and, when it is determined that the at least one second beacon signal is not detected anymore, to stop outputting at least one of the audio, the image, or the video.

According to various embodiments, the plurality of first beacon signals may include first information regarding the electronic device 101, and the first information includes at least one of a MAC address of the electronic device 101, or a UUID of the electronic device 101.

According to various embodiments, the multimedia data may be determined based at least in part on profile information of a user of the external device 102.

According to various embodiments, the electronic device 101 may support Bluetooth low energy (BLE).

According to various embodiments, the memory may further store instructions that cause the processor 120 to periodically receive identities related to multimedia data from the external server 108.

According to various embodiments, the plurality of first beacon signals may include the identities.

According to various embodiments, the communication circuit (for example, the communication module 190) may be configured to support NAN.

According to various embodiments, the external device 102 may include: a housing; a user interface exposed through a portion of the housing; at least one communication circuit (for example, the WiFi chipset 331, the BT chipset 332, or the like) configured to discover and connect to another electronic device wirelessly without an access point or a base station; at least one processor 320 operatively connected with the user interface and the communication circuit; and a memory operatively connected with the processor 320, wherein, when being executed, the memory stores instructions that cause the processor 320 to transmit a plurality of first beacon signals for wireless connection by using the communication circuit during first time periods, to detect at least one second beacon signal for wireless connection, transmitted from the electronic device 101, by using the communication circuit, during one period of second time periods which are different from the first time periods, to transmit information regarding the external device 102 to the external server 108 after detecting the at least one second beacon signal, and to receive information regarding multimedia data to be outputted by the external device 102 from the external server 108.

According to various embodiments, the plurality of first beacon signals may include first information regarding the electronic device 101, and the first information may include at least one of a MAC address of the electronic device 101, or a UUID of the electronic device, and the plurality of first beacon signals may include identities related to the multimedia data periodically transmitted to the external device 102 by the external server 108.

Figure 5:
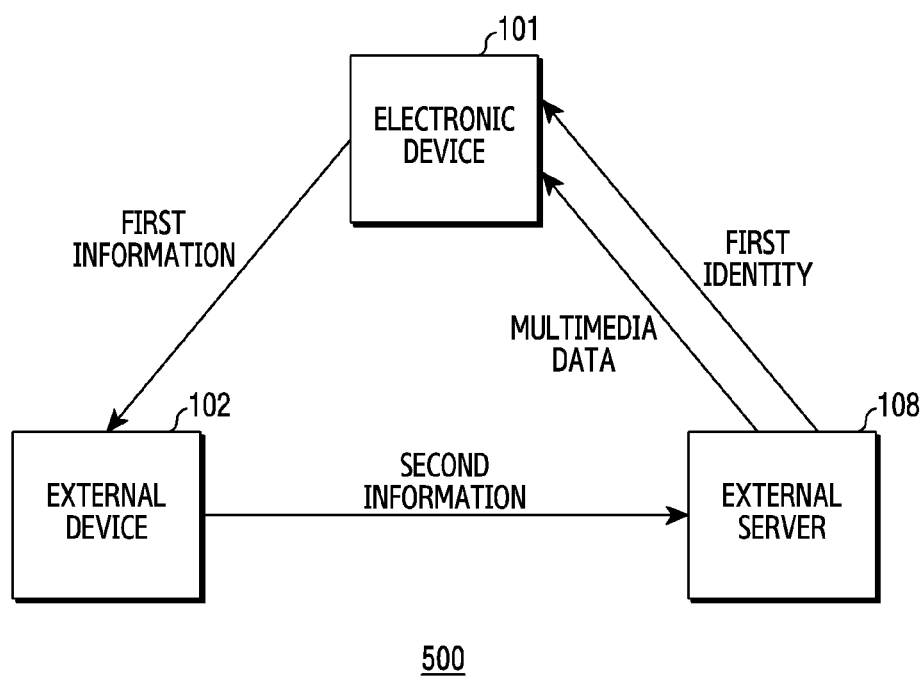
FIG. 5 is a system view to illustrate a method for providing a content according to various embodiments of the present disclosure.

FIG. 5 is a system view to illustrate a method for providing a content according to various embodiments of the present disclosure.

Referring to FIG. 5, FIG. 5 may be a view illustrating a system 500 including an electronic device 101, an external device 102, and an external server 108, and providing a content.

In an embodiment, the electronic device 101 may be an electronic device which may provide a content. For example, the electronic device 101 may be an electronic device which includes the speaker 233-3 capable of outputting audio data (or sound data or music data). In another embodiment, the electronic device 101 may be an electronic device which further includes a display (for example, the display chipset 234) for outputting image data or video data. However, this should not be considered as limiting. The electronic device 101 may include all electronic devices which can provide contents.

In an embodiment, the electronic device 101 may correspond to an electronic device which is placed at a store or the like and provides a content. However, this should not be considered as limiting In an embodiment, the electronic device 101 may receive multimedia data regarding a content (or necessary for outputting a content) from the external server 108, and may output a content based at least in part on the received multimedia data. In an embodiment, when the electronic device 101 is connected with the external server 108 based on an account (or is connected by using an account-based session), the electronic device 101 may receive multimedia data regarding a content from the external server 108, and may output the content based at least in part on the received multimedia data. For example, when the electronic device 101 is connected with the external server 108 based on an account, the electronic device 101 may receive a streaming service related to audio data or video data from the external server 108. However, this should not be considered as limiting.

In an embodiment, the electronic device 101 may receive (or may be provided with) multimedia data determined (or generated) at the external server 108, based at least in part on profile information of the user of the external device 102 in a state in which the electronic device 101 is not directly connected with the external device 102. The electronic device 101 may output the content based at least in part on the received multimedia data.

Hereinafter, a service which enables the external server 108 to determine multimedia data which is a basis of a content to be outputted at the electronic device 101, based at least in part on profile information of the user of the external server 108 in the state in which the electronic device 101 and the external device 102 are not directly connected with each other, and to provide the multimedia data to the electronic device 101 will be referred to as a "content providing service," and a server which provides the content providing service will be referred to as an "external server."

In an embodiment, the electronic device 101 may receive an identity (hereinafter, a "first identity") related to multimedia data from the external server 108. In an embodiment, the first identity may be information that is periodically generated at the external server 108, and identifies that the electronic device 101 has authority over the content providing service. However, this should not be considered as limiting. The first identity will be described in detail.

In an embodiment, in the state in which the external device 102 is not directly connected with the electronic device 101, the external device 102 may receive information (hereinafter, referred to as "first information") including the first identity, unique information of the electronic device 101 (for example, a MAC address of the electronic device 101, or a universally unique identifier (UUID) of the electronic device 101), and information for identifying the content providing service (or an identity for identifying the content providing service, or information indicating the content providing service).

In an embodiment, the state in which the external device 102 and the electronic device 101 are not directly connected with each other may be a state in which the external device 102 receives a beacon including the first information from the electronic device 101.

In an embodiment, when the external device 102 and the electronic device 101 support NAN, the state in which the external device 102 and the electronic device 101 are not directly connected with each other may be a state in which the external device 102 receives a discovery beacon from the electronic device 101. In another embodiment, when the external device 102 and the electronic device 101 support NAN, the state in which the external device 102 and the electronic device 101 are not directly connected with each other may be a state in which the external device 102 receives a discovery beacon from the electronic device 101, and exchanges a synchronization beacon (or a beacon for maintaining synchronization) with the electronic device 101. In an embodiment, when the external device 102 and the electronic device 101 support NAN, the state in which the external device 102 and the electronic device 101 are not directly connected with each other may be a state in which the external device 102 receives a discovery beacon from the electronic device 101 and exchanges a synchronization beacon with the electronic device 101, and does not exchange a service discovery frame with the electronic device 101. In an embodiment, when the external device 102 and the electronic device 101 support NAN, the state in which the external device 102 and the electronic device 101 are not directly connected with each other may be a state in which the external device 102 receives a discovery beacon from the electronic device 101 and exchanges a synchronization beacon with the electronic device 101, and does not perform at least one of an association operation or an authentication operation. However, this should not be considered as limiting.

In an embodiment, when the external device 102 and the electronic device 101 support BLE, the state in which the external device 102 and the electronic device 101 are not directly connected with each other may be a state in which the external device 102 receives an advertising packet from the electronic device 101. In another embodiment, when the external device 102 and the electronic device 101 support BLE, the state in which the external device 102 and the electronic device 101 are not directly connected with each other may be a state in which the external device 102 receives an advertising packet from the electronic device 101, and does not perform an operation (or procedure) for connecting with the electronic device 101. However, this should not be considered as limiting.

In the above-described embodiments, NAN or BLE is illustrated to explain the state in which the external device 102 and the electronic device 101 are not directly connected with each other. However, this should not be considered as limiting. The state in which the external device 102 and the electronic device 101 are not directly connected with each other may include all of a state in which a connection for data exchange between the external device 102 and the electronic device 101 is not completed, and a state in which some operations for connecting are performed.

In an embodiment, when the external device 102 is located within a specified distance from the electronic device 101, the external device 102 may receive the first information. For example, in a case in which the electronic device 101 is a speaker which is placed at a store, the external device 102 may receive a beacon including the first information from the electronic device 101 when the external device 102 is located at a distance at which the external device 102 can receive a beacon including the first information from the electronic device 101 (or when the external device 102 moves to the inside of the store from the outside). However, this should not be considered as limiting.

In an embodiment, when the external device 102 receives the first information from the electronic device 101, the external device 102 may transmit, to the external server 108, information (hereinafter, "second information") including the first identity, the unique information of the electronic device 101 (for example, at least part of the first information), unique information of the external device 102 (for example, a MAC address of the external device 102, or a UUID of the external device 102, or the like), and information for requesting provision of a content, in order for the external server 108 to provide the content providing service. In an embodiment, the second information may be information necessary for requesting the external server 108 to provide the content providing service to the electronic device 101.

In an embodiment, the second information may include profile information of the user of the external device 102, in addition to the first identity, the unique information of the electronic device 101, the unique information of the external device 102, and the information for requesting provision of a content. In an embodiment, the profile information may include information related to preference of the user of the external device 102 for a content or the like. However, this should not be considered as limiting. The profile information will be described below in detail.

In an embodiment, the external device 102 may be connected with the external server 108 based on an account. However, this should not be considered as limiting.

Hereinafter, a device which receives the first information from the electronic device 101, and transmits the second information to the external server 108 will be referred to as an "external device."

In an embodiment, the external device 102 may include a portable (or mobile) electronic device. However, this should not be considered as limiting.

In an embodiment, the external server 108 may determine multimedia data to be transmitted to the electronic device 101, based at least in part on the second information received from the external device 102.

In an embodiment, the external server 108 may determine multimedia data for generating a content to be outputted by the electronic device 101, based at least in part on the profile information of the user of the external device 102. For example, the external server 108 may determine multimedia data for generating a content to be output by the electronic device 101, by considering information regarding music (or video or the like) preferred by the user of the external device 102.

In an embodiment, when there are a plurality of external devices 102, the external server 108 may determine multimedia data for generating a content to be outputted by the electronic device 101, based at least in part on respective profile information of users of the plurality of external devices. For example, the external server 108 may determine multimedia data for generating a content to be outputted by the electronic device 101, by considering information regarding music (or video or the like) preferred by the users of the plurality of external devices, respectively.

In an embodiment, the electronic device 101 may output a content, based at least in part on the multimedia data determined (or generated) by the external server 108 based at least in part on the profile of the user of the external device 102. In an embodiment, the content outputted by the electronic device 101 may include at least one of an image, a video, or an audio which is generated based on the profile of the user of the external device 102. However, this should not be considered as limiting. For example, the content outputted by the electronic device 101 may include various contents such as recommendation information regarding a product (or service) or the like generated based on the profile of the user of the external device 102, or guide information explaining the product or the like.

Hereinafter, a method for providing a content will be described in detail.

Figure 6:
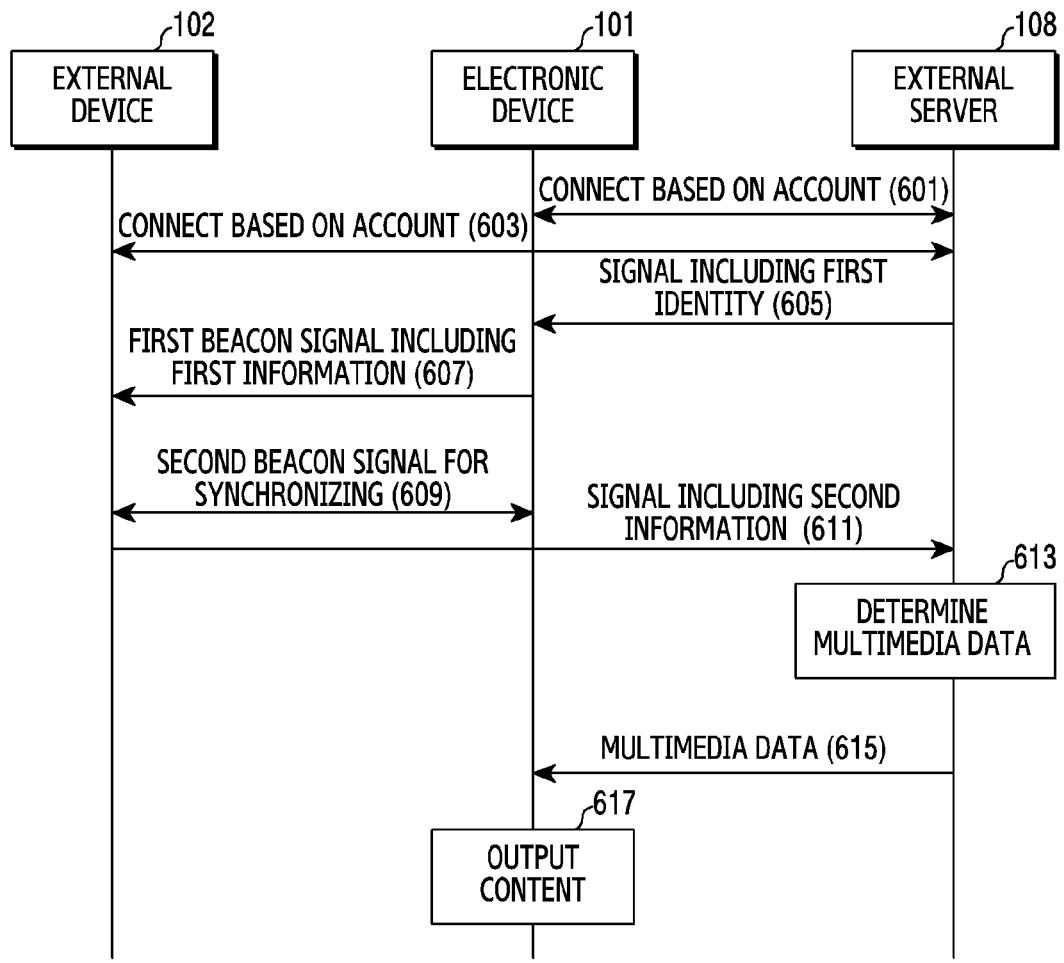
FIG. 6 is a view to illustrate a method for providing a content according to various embodiments of the present disclosure.

FIG. 6 is a view to illustrate a method for providing a content according to various embodiments of the present disclosure. For example, FIG. 6 is a view to illustrate a method by which the electronic device 101 provides a content when the electronic device 101 and the external device 102 support NAN.

Referring to FIG. 6, in operation 601, the electronic device 101 (for example, the communication module 290) may be connected with the external server 108 (for example, the connectivity management module 470) based on an account.

In an embodiment, an account of the electronic device 101 for connecting to the external server 108 may be an account of the user of the electronic device 101 regarding a content providing service provided by the external server 108. In an embodiment, the account of the electronic device 101 for connecting to the external server 108 is an ID for using the content providing service, and may be issued to the user of the electronic device 101 (or generated for the user of the electronic device 101) when the user of the electronic device 101 registers the content providing service. In an embodiment, the electronic device 101 (for example, the processor 220) may set (or establish) a session (hereinafter, referred to as an "account-based session") for the content providing service with the external server 108 (for example, the connectivity management module 470), based at least in part on the account. In an embodiment, the account-based session may be a session which is connected based on a security session such as transport layer security (TLS) or the like. However, the security session is not limited to the above-described TLS. In an embodiment, the account of the electronic device 101 for connecting to the external server 108 may be issued for each of the users. In an embodiment, the user of the electronic device 101 may connect to the external server 108 by inputting the account, a one time password (OPT), a password, a private key, or the like to the electronic device 101.

In an embodiment, after operation 601, the electronic device 101 may be being provided with the content providing service from the external server 108 (for example, the streaming service module 460) through account-based connection although it is not illustrated in FIG. 6. In an embodiment, the electronic device 101 may be outputting a content based at least in part on the multimedia data received from the external server 108. For example, the electronic device 101 may be outputting an audio, an image, or a video related to the content providing service, by using the streaming service provided by the external server 108.

In an embodiment, after the electronic device 101 is connected with the external server 108 based on the account, or when the electronic device 101 is provided with the content providing service from the external server 108, the electronic device 101 may receive information for identifying the content providing service from the external server 108.

In an embodiment, the electronic device 101 may include an element for inputting an account or a content providing service request to the electronic device 101. For example, the electronic device 101 may include an input device such as a display (for example, the display chipset 234) or a keyboard (or a keypad). In another embodiment, the electronic device 101 may include an element (or a voice recognition interface) for inputting an account or a content providing service request to the electronic device 101 through voice recognition. However, the element of the electronic device 101 for inputting the account or the content providing service request to the electronic device 101 is not limited to the above-described examples.

In an embodiment, when the electronic device 101 does not include the element for inputting the account or the content providing service request to the electronic device 101, the electronic device 101 may log in the external server 108 (or the content providing service), or may request the external server 108 to provide the content providing service to the electronic device 101, by using another electronic device which is able to input the account or the content providing service request. However, this should not be considered as limiting.

In operation 603, the external device 102 may be connected with the external server 108 based on an account.

In an embodiment, an account of the external device 102 for connecting to the external server 108 may be an account regarding the content providing service provided by the external server 108. In an embodiment, the account of the external device 102 for connecting to the external server 108 is an ID for using the content providing service, and may be issued to the user of the external device 102 when the user of the external device 102 registers the content providing service. In an embodiment, the external device 102 may set (or establish) an account-based session based at least in part on the account. In an embodiment, the account of the external device 102 for connecting to the external server 108 may be issued for each of the users. In an embodiment, the user of the external device 102 may connect to the external server 108 by inputting the account, an OPT, a password, a private key, or the like to the external device 102.

In an embodiment, after connecting to the external server 108 (for example, the streaming service module 460) based on the account, the external device 102 may be executing an application related to the content providing service. For example, after connecting to the external server 108 based on the account, the external device 102 may be executing an application related to the content providing service in a foreground or a background. However, this should not be considered as limiting. For example, the external device 102 may not be executing the application related to the content providing service even after connecting to the external server 108 based on the account.

In FIG. 6, operation 601 precedes operation 603, but operation 603 may precede operation 601.

In operation 605, the electronic device 101 may receive a signal including a first identity related to multimedia data from the external server 108.

In an embodiment, the first identity may be periodically generated at the external server 108 (for example, the first identity generation module 440). In an embodiment, the first identity may be generated by being periodically changed at the external server 108 (or differently from the first identity previously transmitted to the electronic device 101). In an embodiment, the first identity may be information for identifying that the electronic device 101 has authority over the content providing service. In an embodiment, the first identity may be information indicating a state in which the external device 102 can receive a beacon signal from the electronic device 101 (or the external device 102 is located within a specified distance from the electronic device 101) when the external device 102 is not directly connected with the electronic device 101. In an embodiment, the first identity may be information for obtaining (or searching) the account of the user of the electronic device 101 along with the unique information of the electronic device 101, included in second information, when the external server 108 receives a signal including the second information from the external device 102 as in operation 611, which will be described below. In an embodiment, the first identity may be the account of the user of the electronic device 101. However, this should not be considered as limiting.

In an embodiment, the first identity may be periodically generated (or refined) at the external server 108, and may be periodically transmitted to the electronic device 101. However, this should not be considered as limiting.

In operation 607, the electronic device 101 (for example, the communication module 290) may transmit (or broadcast) a first beacon signal including first information. The electronic device 101 may periodically transmit the first beacon signal including the first information. In an embodiment, the first information may include information including the first identity, the unique information of the electronic device 101 (for example, the MAC address of the electronic device 101, or the UUID of the electronic device 101), and the information for identifying the content providing service (or an identity (or a service identity) for identifying the content providing service or information indicating the content providing service).

In an embodiment, the first identity included in the first information may be information which is received from the external server 108 most recently (or lastly) from among the first identities periodically transmitted from the external server 108.

In an embodiment, when the first beacon signal including the first information is received, the external device 102 may deliver information indicating that the first beacon signal is received (or detected) to an application related to the content providing service, based at least in part on the information for identifying the content providing service, included in the first information. However, this should not be considered as limiting.

In an embodiment, when the first beacon signal including the first information is received, the external device 102 may identify the application related to the content providing service. For example, the external device 102 may identify whether the application related to the content providing service is being executed in the external device 102, based at least in part on the information for identifying the content providing service, included in the first information. When the external device 102 determines that the application related to the content providing service is not being executed in the external device 102 (or the external device 102 does not execute the application related to the content providing service), the external device 102 may execute (or activate) the application related to the content providing service, or may execute the application related to the content providing service in response to a user's input being received.

In operation 609, the electronic device 101 may transmit and receive a second beacon signal for synchronizing with the external device 102. For example, the electronic device 101 may periodically transmit and receive the second beacon signal for synchronizing with the external device 102.

Hereinafter, referring to FIGS. 7 to 9, the operation of the electronic device 101 transmitting the first beacon signal including the first information in operation 607, and the operation of the electronic device 101 and the external device 102 transmitting and receiving the second beacon signal for synchronizing in operation 609 will be described in more detail.

Figure 7:
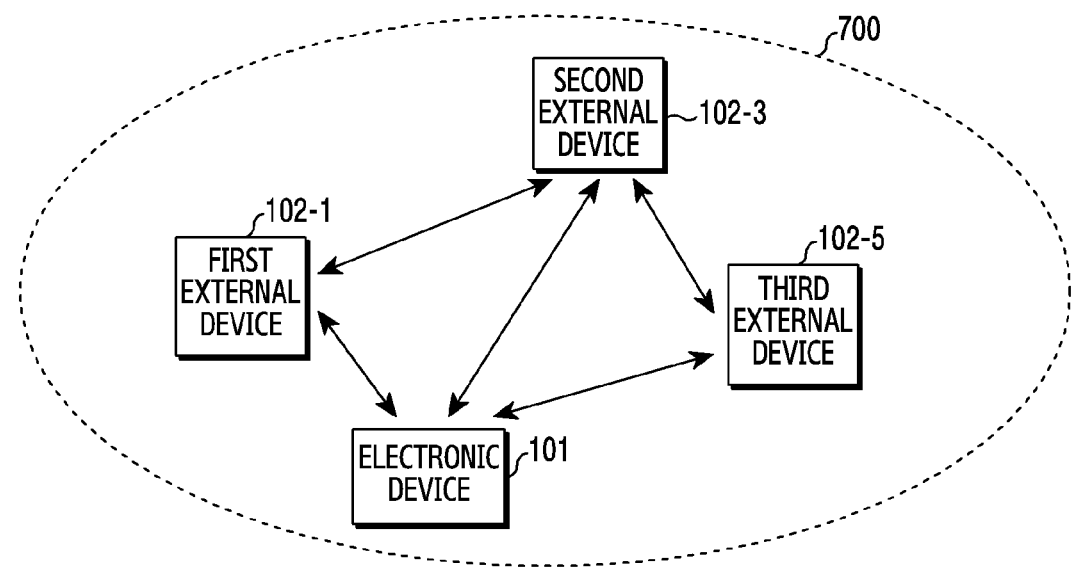
FIG. 7 is a view illustrating an example in which an electronic device and an external device form a neighbor awareness networking (NAN) cluster according to various embodiments of the present disclosure.

FIG. 7 is a view illustrating an example in which the electronic device 101 and the external device 102 form a NAN cluster according to various embodiments of the present disclosure.

Referring to FIG. 7, in an embodiment, a cluster 700 may be a set of devices forming NAN based on IEEE 802.11, enabling the electronic device 101 and a plurality of external devices, for example, a first external device 102-1, a second external device 102-3, and a third external device 102-5 to mutually transmit and receive data. The cluster 700 may be referred to as a NAN cluster according to the NAN specification.

In an embodiment, the electronic device 101 may be an anchor master of the NAN cluster 700. In an embodiment, the anchor mater may be a device that has the highest master rank (for example, master preference, random factor, device NAN interface address) in the NAN cluster. In an embodiment, the electronic device 101 may periodically transmit (or broadcast) a NAN discovery beacon as the anchor master. In an embodiment, the electronic device 101 may manage a NAN discovery window (DW) and may perform an operation for synchronizing between devices included in the NAN cluster as the anchor master. In an embodiment, the electronic device 101 may perform the anchor master role fixedly (or continuously). However, this should not be considered as limiting.

In an embodiment, the external device 102 which does not form the cluster 700 (or is not included in the cluster 700) may discover the cluster by receiving the first beacon signal (for example, the NAN discovery beacon) broadcasted from the electronic device 101 (passive scanning). In another embodiment, the external device 102 which does not form the cluster may request a NAN discovery probe request to the electronic device 101, and may identify the NAN cluster 700 by receiving, from the electronic device 101, a NAN discovery probe response including a cluster discovery attribute defined in the NAN, in response to the probe request, and may be included in the cluster 700 (active scanning). The cluster discovery attribute may include an attribute ID, a length of the attribute, a cluster ID, a cluster time offset, and an anchor master rank. The cluster discovery attribute may be a value included in a NAN IE.

In an embodiment, the electronic device 101 forming the NAN cluster 700 and the external device 102 which is not included in the NAN cluster 700 may perform an operation for forming the same (or single) NAN cluster (or operation for being included in the same NAN cluster). For example, when the external device 102 is included in a separate NAN cluster from the NAN cluster 700, the NAN cluster including the external device 102 and the NAN cluster 700 including the electronic device 101 may be merged with each other. In an embodiment, when the NAN cluster including the external device 102 and the NAN cluster 700 including the electronic device 101 are merged with each other, and the external device 102 performs the master role of the separate NAN cluster from the NAN cluster 700, the external device 102 may hand over the master role to the electronic device 101 (or the electronic device 101 performs the master role and the external device 102 performs a non-master role). In another embodiment, when the external device 102 is not included in the separate NAN cluster from the NAN cluster 700, the external device 102 may join the NAN cluster 700. In an embodiment, the operation of the electronic device 101 and the external device 102 forming the single NAN cluster 700, and thus synchronizing (or maintaining synchronization) may not refer to direct connection between the devices. The other portion of the NAN that has not been described in FIG. 7 may follow the specification of the NAN.

Figure 8:
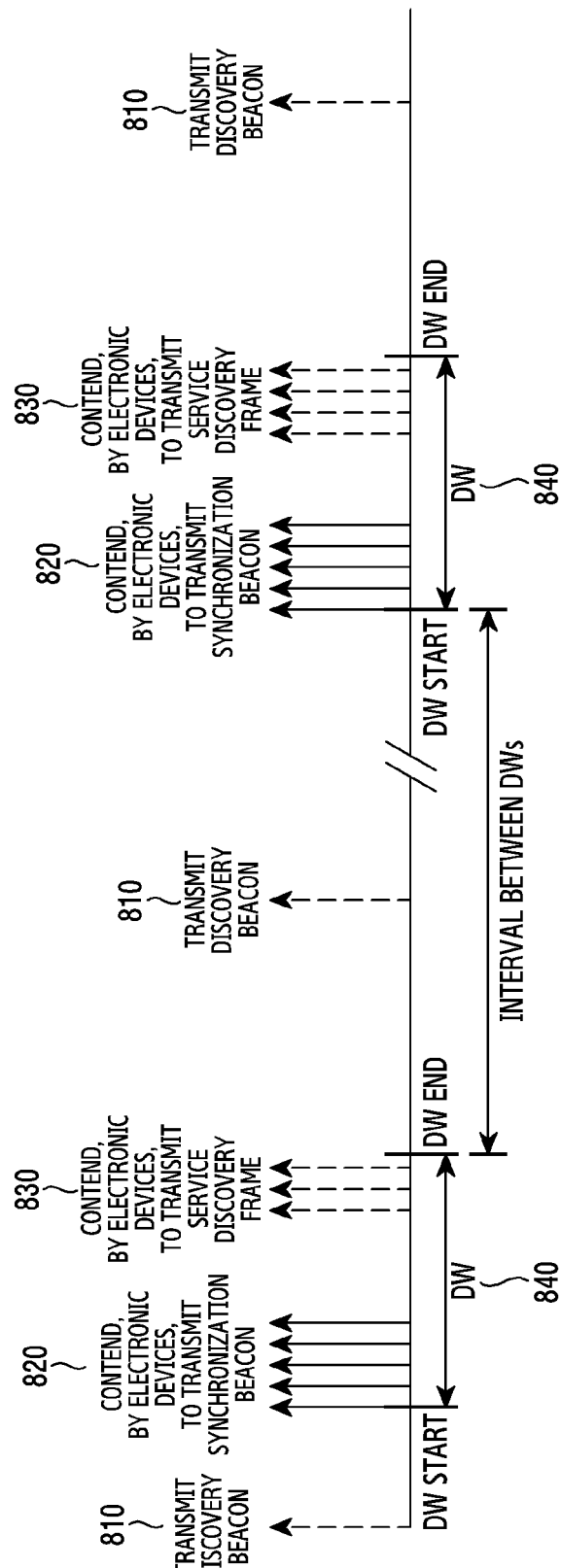
FIG. 8 is a view to illustrate a method by which an electronic device and an external device transmit and receive beacon signals via NAN according to various embodiments of the present disclosure.

FIG. 8 is a view to illustrate a method by which the electronic device 101 and the external device 102 transmit and receive a beacon signal through NAN according to various embodiments of the present disclosure.

For example, FIG. 8 illustrates an example in which the devices included in one NAN cluster transmit and receive signals through a specific channel (for example, channel 6) based on the NAN specification. However, the specific channel is not limited to channel 6, and may vary according to a frequency band (for example, 2.4 GHz, 5 GHz, or 60 GH) for transmitting and receiving a signal.

Referring to FIG. 8, in an embodiment, the electronic device 101 may transmit the first beacon signal, for example, the discovery beacon, in a period between DW periods 840 (810). In an embodiment, the electronic device 101, the first external device 102-1, the second external device 102-3, and the third external device 102-5 may transmit the second beacon signal, for example, the synchronization beacon, in the DW period 840 which is synchronized as defined by the NAN specification (820). For example, the electronic device 101, the first external device 102-1, the second external device 102-3, and the third external device 102-5 may transmit the synchronization beacon based on a contention. In an embodiment, the electronic device 101, the first external device 102-1, the second external device 102-3, and the third external device 102-5 may not transmit a service discovery frame for data exchange. For example, the electronic device 101, the first external device 102-1, the second external device 102-3, and the third external device 102-5 may perform the operation of transmitting and receiving the synchronization beacon to identify their mutual existence, and may not perform an operation (830) of transmitting and receiving the service discovery frame to exchange data. The other portion of the NAN that has not been described in FIG. 8 may follow the specification of the NAN.

Figure 9:
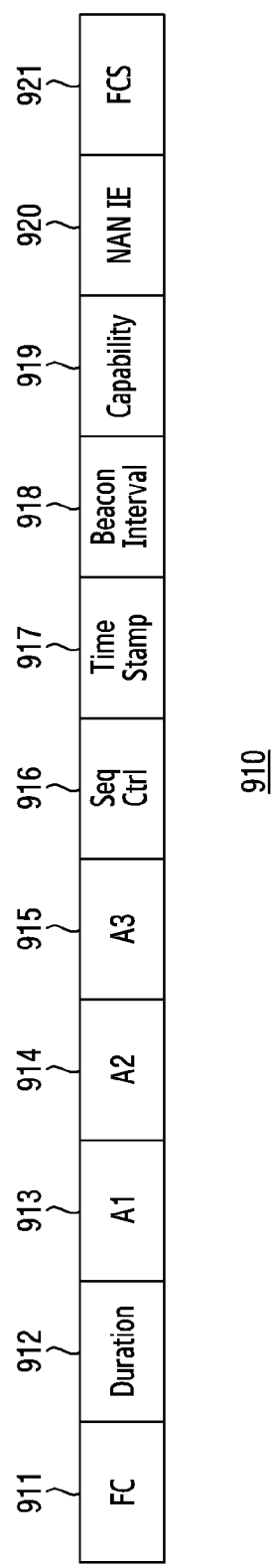
FIG. 9 is a view illustrating an example of a discovery beacon packet which is transmitted by an electronic device according to various embodiments of the present disclosure.

FIG. 9 is a view illustrating a discovery beacon packet which is transmitted by the electronic device 101 according to various embodiments of the present disclosure.

Referring to FIG. 9, the discovery beacon packet 910 may include information necessary for synchronizing with a cluster. For example, the discovery beacon packet 910 may include a frame control (FC) field (FC) 911 indicating a function of a signal (for example, a beacon), a field regarding a duration for a beacon frame (Duration) 912, a field regarding a broadcast address (A1) 913, a field regarding a MAC address of the transmitting electronic device 101 (A1) 914, a field regarding a cluster identity (A3) 915, a sequence control field (seq ctrl) 916, a field regarding a time stamp for a beacon frame (time stamp) 917, a beacon interval field indicating a transmission interval of a discovery beacon (beacon interval) 918, a field regarding capability information of the transmitting electronic device 101 919, a field indicating an information element (NAN IE (information element)) 920, and a field regarding a frame checksum (FCS) 921. In an embodiment, the first information included in the first beacon signal (for example, the discovery beacon packet 910) may be included in the field indicating the information element (NAN IE) 920. For example, the first information included in the first beacon signal may be included in a vendor specific field in the field indicating the information element. However, this should not be considered as limiting.

In another embodiment, when the external device 102 which does not form the cluster transmits a NAN discovery probe request to the electronic device 101, and receives a NAN discovery probe response from the electronic device 101 in response to the probe request, the first information may be included in the probe response.

Although not shown in FIG. 9, a synchronization beacon packet may include information necessary for maintaining synchronization between the devices. For example, the synchronization beacon packet may include an FC field indicating a function of a signal, a field regarding a duration for a beacon frame, a field regarding a broadcast address, a field regarding a MAC address of the transmitting electronic device 101, a field regarding a cluster identity, a sequence control field, a field regarding a time stamp for a beacon frame, a beacon interval field indicating an interval between start points of DWs, a field regarding capability information of the transmitting electronic device 101, a field indicating an information element, and a field regarding a frame checksum.

In an embodiment, the electronic device 101 and the external device 102 may identify their mutual existence (or that the external device 102 forms the cluster with the electronic device 101) through the synchronization beacon packet (for example, the field regarding the MAC address of the transmitting electronic device 101 (A2) 914, and the field regarding the cluster identity of the second beacon signal) mutually transmitted and received. The other portion of the NAN that has not been described in FIG. 9 may follow the specification of the NAN.

Referring back to FIG. 6, in an embodiment, the procedure of FIG. 6 may further include an operation of, when the electronic device 101 receives the second beacon signal for synchronizing from the external device 102, detecting (or identifying), by the electronic device 101, the external device 102, based at least in part on the received second beacon signal, and transmitting information regarding the external device 102 to the external server 108, although not shown in FIG. 6.

According to an embodiment, the external device 102 may synchronize with the electronic device 101 by using the NAN synchronization beacon received from the electronic device 101. The synchronization may refer to synchronizing an inner clock or timer of the external device 102 with time of the discovery window based on information included in the NAN synchronization beacon. The external device 102 may determine a NAN state after synchronizing. The external device 102 may set a NAN device state to be fixed to a non-master sync state based on service information (for example, a content service or separate flag information) included in at least one of the NAN beacon or the NAN synchronization beacon. The electronic device 101 may set a rank value such that the electronic device 101 is always the anchor master. According to the above-described operation, the second beacon may be a NAN synchronization beacon that is transmitted by the external device 102 in the non-master sync state.

According to an embodiment, the NAN device state of the external device 102 may be a non-master non sync state. In this state, the second beacon may be a NAN service discovery frame (SDF) which is transmitted by the external device 102. The external device 102 may transmit the NAN service discovery frame every time or periodically during the discovery window.

According to an embodiment, when communication between the external device 102 and the electronic device 101 is Bluetooth, the second beacon may be a mesh message of a Bluetooth mesh network which is transmitted by the external device 102. The message may be periodically transmitted.

In an embodiment, the information regarding the external device 102 may include at least one of unique information of the external device 102, information informing that the external device 102 and the electronic device 101 are included in the same cluster 700, or information indicating that the synchronization beacon is received from the external device 102. However, this should not be considered as limiting.

In an embodiment, the procedure of FIG. 6 may further include an operation of, when the electronic device 101 receives the second beacon signal for synchronizing from the external device 102, storing, by the electronic device 101, the information regarding the external device 102, based at least in part on the received second beacon signal, although it is not illustrated in FIG. 6.

In operation 611, the external device 102 may transmit, to the external server 108, the second information including information including the first identity, the unique information of the electronic device 101, the unique information of the external device 102, and the information requesting provision of a content.

In an embodiment, the first identity may be information which is periodically received from the electronic device 101.

In an embodiment, the second information may include profile information of the user of the external device 102, in addition to the first identity, the unique information of the electronic device 101, the unique information of the external device 102, and the information requesting provision of a content.

In an embodiment, the profile information to be transmitted to the external server 108 (for example, the profile management module 420) may include information regarding preference of the user of the external device 102 for a content.

In an embodiment, the profile information to be transmitted to the external server 108 may include information regarding a history (or record) of the user of the external device 102, of having been provided with a streaming service regarding a content (for example, music or video) by using the external server 108. For example, when the content is music, the profile information may include information regarding titles, genres, composers, or tempos of music that the user of the external device 102 has been provided with from the external server 108 during a specified period (for example, a week, a month, or a year), or a location of the user of the external device 102 when the streaming service of the content is provided from the external server 108, or the number of times that the user plays the music (for example, the number of times that the external device 102 is provided with a service for music of a specific title from the external server 108). In an embodiment, the information regarding the history of the user of the external device 102 of having been provided with the streaming service of the content by using the external server 108 may include a history of the user of the external device 102 of having been provided with the streaming service of the content from the external server 108 by using a device other than the external device 102 through an account related to the external server 108. However, this should not be considered as limiting.

However, even when the content is a content other than music, such as a video (for example, a video or text), the same or similar method as or to at least part of the method when the content is music may be applied.

In an embodiment, the profile information to be transmitted to the external server 108 may further include information regarding a content selected by the user of the external device 102. For example, when the user of the external device 102 wishes to listen to specific music through the electronic device 101, the external device 102 may include information regarding the specific music (or information of selected music) in the second information by a user input.

In an embodiment, the profile information to be transmitted to the external server 108 may include information regarding a history of the user of the external device 102 of having output a content through the external device 102. For example, the profile information to be transmitted to the external server 108 may include information regarding a history of a content that has been outputted from the external device 102 by receiving a service through the external server 108, and a history of having output a stored (or recorded) content by outputting a content stored (or downloaded) in the memory. However, this should not be considered as limiting.

In an embodiment, the external device 102 may transmit, to the external server 108, a signal including the second information in various forms by using the account-based session. For example, the external device 102 may transmit the signal including the second information to the external server 108 based at least in part on an HTTP/HTTPS protocol. In another example, the external device 102 may transmit the signal including the second information to the external server 108 based at least in part on a web representation state transfer (REST) application programming interface (API) using Javascript object notation (Json) or the like.

In an embodiment, the external device 102 may automatically transmit the signal including the second information to the external server 108 after receiving the first beacon signal or the second beacon signal although it is not illustrated in FIG. 6. For example, when the external device 102 receives the first beacon signal or second beacon signal, the external device 102 may output a screen informing of reception of the first beacon signal or the second beacon signal, and may automatically (or without a user input) the signal including the second information to the external server 108. In another embodiment, the external device 102 may transmit the signal including the second information by a user input after receiving the first beacon signal or the second beacon signal. For example, when the external device 102 receives the first beacon signal or the second beacon signal, the external device 102 may output a screen informing of reception of the first beacon signal or the second beacon signal, and may transmit the second information to the external server 108 in response to an input for transmitting the second information to the external server 108 being received from the user.

In operation 613, the external server 108 (for example, the multimedia determination module 450) may determine multimedia data to be transmitted to the electronic device 101, based at least in part on the received signal including the second information.

In an embodiment, the external server 108 (for example, the account management module 410) may obtain (or search) an account corresponding to the electronic device 101 (or an account of the user of the electronic device 101), based at least in part on the first identity and the unique information of the electronic device 101, included in the second information. For example, the external server 108 may obtain the account of the user of the electronic device 101 that matches the first identity and the unique information of the electronic device 101, included in the second information, and is stored.

In an embodiment, the external server 108 (for example, the profile management module 420) may obtain preference of the user of the external device 102 for the profile information. For example, when the content is music, the external server 108 may obtain (or determine or calculate) preference of the user of the external device 102 for a genre of music in the profile.

In an embodiment, the external server 108 may obtain preference of the user of the external device 102 for the profile information by using a certain method of machine learning. For example, the external server 108 may analyze music that the user of the external device 102 has been provided with from the external server 108 (or that has been outputted by the external device 102) in view of frequency and time, by using a neural network (or deep learning), and may obtain (or calculate) preference (for example, digitized data regarding the genre of music) based at least in part on the analyzed data. However, the preference is not limited to the digitized data regarding the genre of music, and may include digitized data of a variety of profile information like at least one of a title of music, a composer of music, or a tempo of music.

In an embodiment, the preference of the user of the external device 102 for the profile information may match (or may be mapped onto) the user account of the external device 102, and may be stored (updated) in the account DB 430.

In an embodiment, when the second information includes information regarding a content selected by the user of the external device 102, the external server 108 may obtain preference of the user of the external device 102 for the profile information by reflecting the information regarding the content selected by the user of the external device 102. For example, when the second information includes information regarding music selected by the user of the external device 102, the external server 108 may obtain preference of the user of the external device 102 for the profile information (for example, a genre of music, or the like) by applying a certain method of machine learning to the music selected by the user of the external device 102. However, this should not be considered as limiting.

In an embodiment, when the external server 108 receives the second information from a plurality of external devices, the external server 108 may obtain preference of respective users of the plurality of external devices for profile information. When the external server 108 obtains preference of the users of the plurality of external devices 102 for the profile information, the external server 108 may associate (or match) the preference of the user for the profile information with each of the accounts of the users of the plurality of external devices, and may store the preference.

In an embodiment, the external server 108 (for example, the multimedia determination module 450) may perform a scoring operation with respect to a content to be currently outputted by the electronic device 101, based at least in part on the obtained preference. In an embodiment, when there are a plurality of contents to be outputted by the electronic device 101, the external server 108 may score each of the plurality of contents (or digitize by adding) based at least in part on the obtained preference. For example, when the content is music and there are a plurality of external devices 102, the external server 108 may identify (or determine) genres of music regarding respective titles of music to be outputted by the electronic device 101. The external server 108 may add digitized preference of the users of the plurality of external devices 102 regarding each of genres of music with respect to each of the titles of music to be outputted by the electronic device 101. However, the scoring operation performed by the external server 108 is not limited to the above-described example.

In an embodiment, the external server 108 may determine a content (or multimedia data) to be outputted by the electronic device 101 by performing the scoring operation with respect to the content to be outputted by the electronic device 101. For example, the external server 108 may generate (or change or update) a content list in order for the electronic device 101 to output the contents in order from the content having the highest score (for example, a highest value of added preference regarding the title of music to be outputted by the electronic device 101). For example, the external server 108 may determine the order of outputting the contents to be outputted by the electronic device 101, based at least in part on the scored value. However, this should not be considered as limiting.

In an embodiment, the external server 108 may change the generated content list, based at least in part on basic profile information (or user private information) of the user of the external device 102 (for example, at least one of age or sex of the user of the external device 102). For example, when the user of at least one external device 102 is a minor, the external server 108 may remove a content that cannot be provided to minors from the generated content list. However, this should not be considered as limiting.

In an embodiment, the external server 108 may generate multimedia data regarding the generated content list.

In operation 615, the external server 108 may transmit the generated multimedia data to the electronic device 101. For example, the external server 108 may transmit multimedia data regarding the content list to the electronic device 101 by using the account-based session by which the external server 108 and the electronic device 101 are connected with each other.

In operation 617, the electronic device 101 may output the content based at least in part on the received multimedia data. For example, the electronic device 101 may output the contents included in the content list generated at the external server 108 according to the output order of the contents determined at the external server 108. However, this should not be considered as limiting.

Although not shown in FIG. 6, the external server 108 in an embodiment may transmit information regarding the generated content list to the external device 102. In an embodiment, the external device 102 may display the content list, for example, a list of contents to be outputted by the electronic device 101, through the display device 160.

Figure 10:
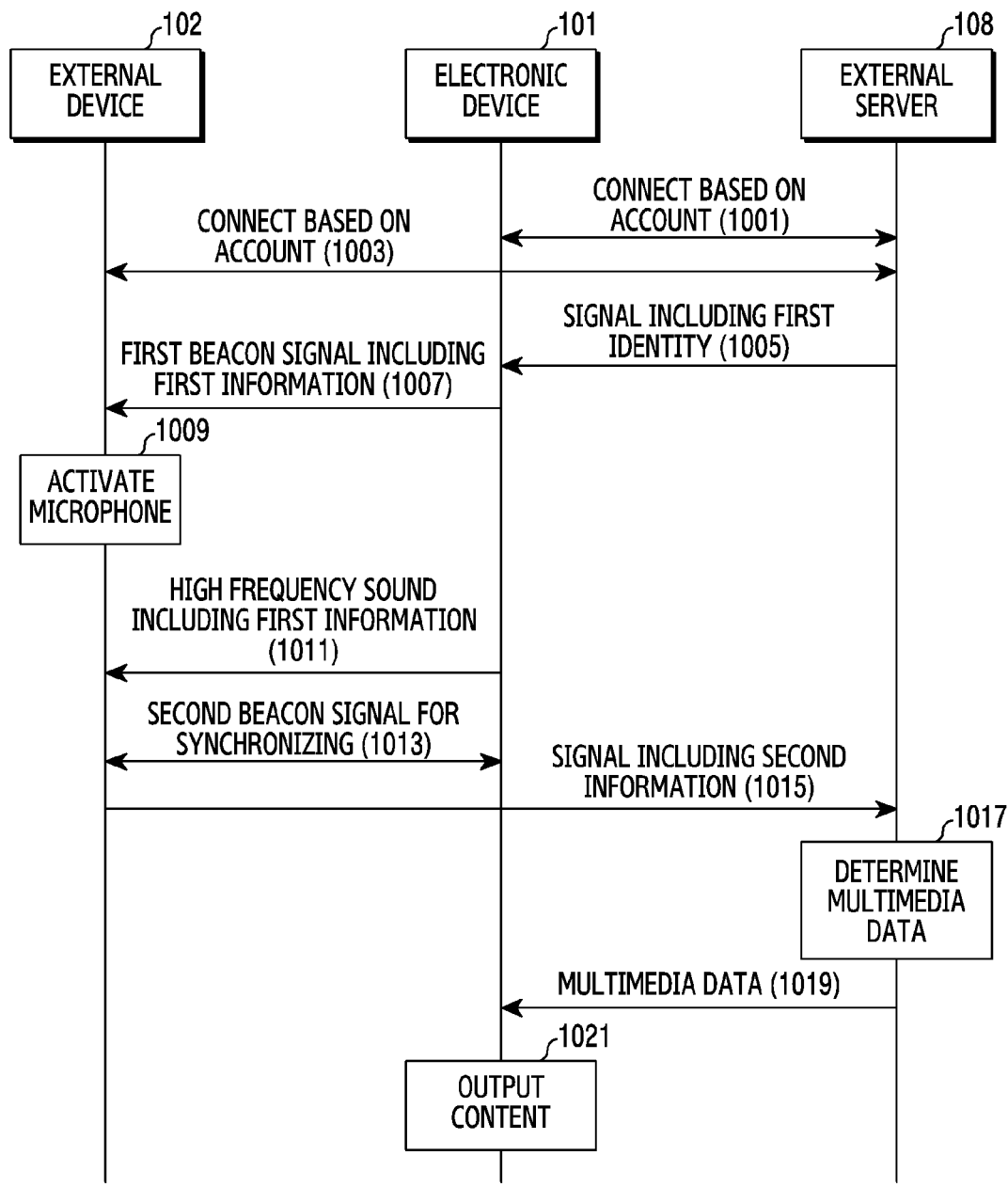
FIG. 10 is a view to illustrate a method for providing a content according to various embodiments of the present disclosure.

FIG. 10 is a view illustrating a method for providing a content according to various embodiments of the present disclosure.

Referring to FIG. 10, operations 1001, 1003, 1005, 1007, 1013, 1015, 1017, 1019, and 1021 of FIG. 10 are the same as or similar to operations 601, 603, 605, 607, 609, 611, 613, 615, and 617 of FIG. 6 at least in part, and thus a detailed description thereof is omitted.

In operation 1009, when the external device 102 includes the first beacon signal including the first information, the external device 102 may activate (turn on) a microphone included in the external device 102. However, this should not be considered as limiting. In an embodiment, the microphone of the external device 102 may be already activated before the first beacon signal including the first information is received. In an embodiment, the external device 102 may always keep the microphone activated or may periodically activate the microphone.

In operation 1011, the external device 102 may receive a high frequency sound (or ultrasonic waves) including the first information from the electronic device 101. In an embodiment, the external device 102 may receive information including all or a part of the first information from the electronic device 101. In an embodiment, the high frequency sound may be periodically generated at the electronic device 101, and may be a frequency which falls out of an audible frequency or may be the highest audible frequency. In an embodiment, the external device 102 may obtain the first information from the high frequency sound by using an application capable of analyzing a waveform (or pattern) of the high frequency sound received from the electronic device 101. In an embodiment, the operation of receiving the first information by using the high frequency sound may be an auxiliary operation of transmitting the first beacon signal including the first information by using NAN or BLE.

Although not shown in FIG. 10, when the external device 102 receives the high frequency sound including the first information, the external device 102 may transmit a high frequency sound to the electronic device 101 in response to the high frequency sound being received. However, this should not be considered as limiting.

FIG. 10 illustrates an example in which the electronic device 101 transmits the first information to the external device 102 by using the high frequency sound. However, the electronic device 101 may identify (or determine) that the external device 102 is located within a specified distance from the electronic device 101 by using the high frequency sound. For example, when the electronic device 101 transmits a high frequency sound of a specific pattern to the external device 102, but does not receive a high frequency sound including a response from the external device 102, the electronic device 101 may identify that the external device 102 is located out of the specified distance from the electronic device 101. In another embodiment, when the electronic device 101 transmits a high frequency sound of a specific pattern to the external device 102, and receives a high frequency sound including a response from the external device 102, the electronic device 101 may identify that the external device 102 is located within the specified distance from the electronic device 101.

In FIG. 10, operations 1009 and 1011 are performed before operation 1013. However, this should not be considered as limiting. For example, operations 1009 and 1011 may be performed after operation 1013. In an embodiment, at least part of operation 1007 or 1013 may be omitted, and at least part of data transmitted and received between the electronic device 101 and the external device 102 may be omitted in at least one of operation 1007 or 1013.

Figure 11:
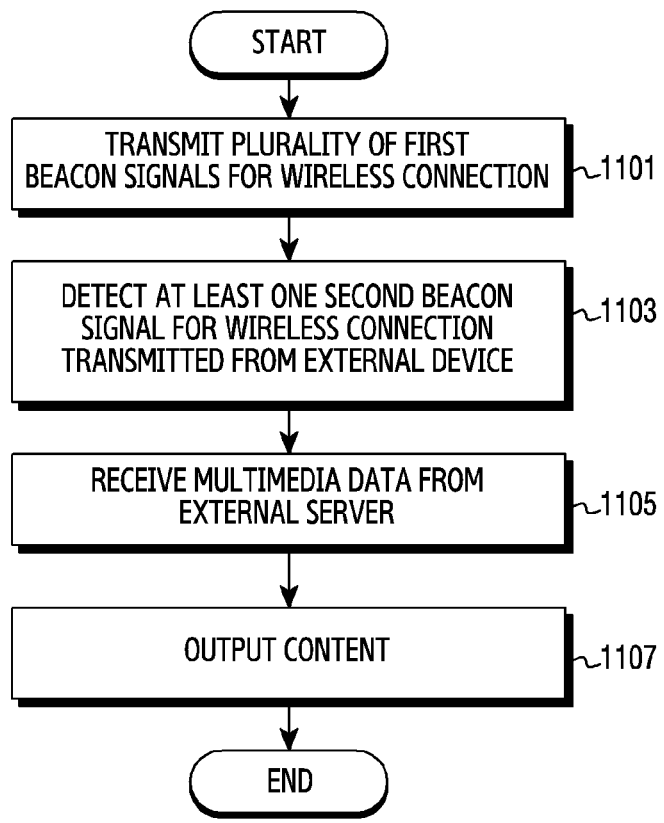
FIG. 11 is a flowchart to illustrate operations performed by an electronic device to provide a content according to various embodiments of the present disclosure.

FIG. 11 is a flowchart to illustrate operations performed by the electronic device 101 to provide a content according to various embodiments of the present disclosure. For example, FIG. 11 is a view to illustrate operations performed by the electronic device 101 to provide a content when the electronic device 101 and the external device 102 support NAN.

Referring to FIG. 11, to avoid a redundant explanation, it is assumed that operations 601 and 605 in FIG. 6 of the electronic device 101 connecting to the external server 108 based on the account, and receiving the signal including the first identity have been performed.

In operation 1101, the electronic device 101 may transmit (or broadcast) the first beacon signal including the first information. For example, the electronic device 101 may periodically transmit the first beacon signal including the first information. In an embodiment, the first information may include information including the first identity, the unique information of the electronic device 101 (for example, the MAC address of the electronic device 101, or the UUID of the electronic device 101), and the information for identifying the content providing service (or an identity for identifying the content providing service (or a service identity), or information indicating the content providing service).

In an embodiment, the first identity included in the first information may be information that is received from the external server 108 most recently (or lastly) from among the first identities periodically transmitted from the external server 108.

In an embodiment, the electronic device 101 may form a NAN cluster with the external device 102 by transmitting the first beacon signal. In an embodiment, the electronic device 101 may be an anchor master of the NAN cluster. In an embodiment, the electronic device 101 may perform the anchor master role fixedly (or continuously). However, this should not be considered as limiting.

In an embodiment, the first information included in the first beacon signal (for example, a discovery beacon packet) may be included in a field indicating an information element. For example, the first information included in the first beacon signal may be included in a vendor specific field indicating an information element. However, this should not be considered as limiting.

In operation 1103, the electronic device 101 may detect at least one second beacon signal for wireless connection transmitted from the external device 102. For example, the electronic device 101 may transmit a second beacon signal for synchronizing to the external device 102 in a DW period synchronized as defined by the NAN specification. The electronic device 101 may receive a second beacon signal for synchronizing from the external device 102 in a DW period synchronized as defined by the NAN specification.

In an embodiment, the second beacon signal may include information necessary for maintaining synchronization between the devices.

In an embodiment, when the electronic device 101 receives the second beacon signal for synchronizing from the external device 102, the electronic device 101 may identify the external device 102, and may transmit information regarding the external device 102 to the external server 108, although it is not illustrated in FIG. 11.

In an embodiment, the information regarding the external device 102 may include at least one of unique information of the external device 102 based at least in part on the second beacon signal, information informing that the external device 102 is included in the same cluster as that of the electronic device 101, or information informing that a synchronization beacon is received from the external device 102. However, this should not be considered as limiting.

In an embodiment, when the electronic device 101 receives the second beacon signal for synchronizing from the external device 102, the electronic device 101 may store the information regarding the external device 102 based at least in part on the received second beacon signal.

In operation 1105, the electronic device 101 may receive multimedia data from the external server 108.

In an embodiment, the electronic device 101 may receive multimedia data regarding a content to be outputted by the electronic device 10 from the external server 108. In an embodiment, the multimedia data received by the electronic device 101 may include information for generating contents to be outputted by the electronic device 101, and information regarding an output order of the contents to be outputted by the electronic device 101. However, this should not be considered as limiting.

In operation 1107, the electronic device 101 may output the content based at least in part on the multimedia data. For example, the electronic device 101 may output at least one of an audio, an image, or a video based at least in part on the multimedia data.

In an embodiment, the multimedia data may include at least one of sound data or music data. In an embodiment, the multimedia data may include at least one of image data or video data.

Figure 12:
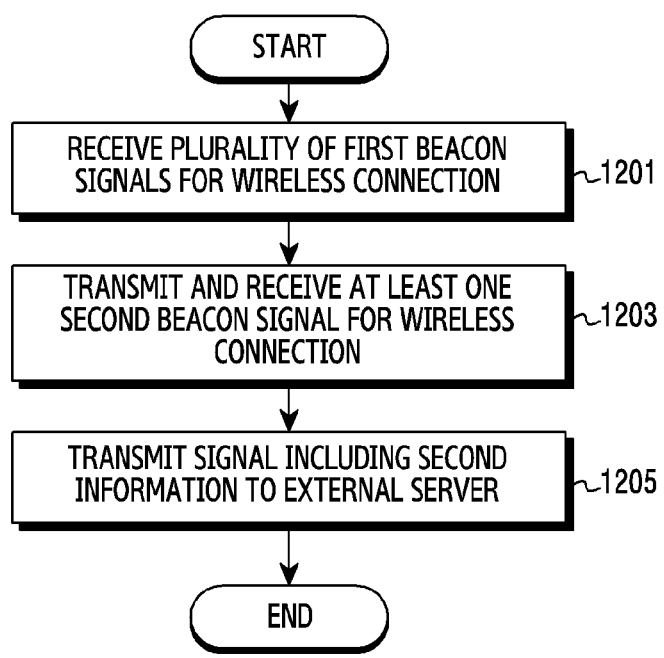
FIG. 12 is a flowchart to illustrate operations performed by an external device to provide a content according to various embodiments of the present disclosure.

FIG. 12 is a flowchart to illustrate operations performed by the external device 102 to provide a content according to various embodiments of the present disclosure. For example, FIG. 12 is a view to illustrate operations performed by the external device 102 to provide a content when the electronic device 101 and the external device 102 support NAN.

Referring to FIG. 12, to avoid a redundant explanation, it is assumed that the external device 102 is connected with the external server 108 based on the account as in operation 603 of FIG. 6.

In operation 1201, the external device 102 may receive the first beacon signals for wireless connection.

In an embodiment, the external device 102 may periodically receive the first beacon signal including the first information. In an embodiment, the first information may include information including the first identity, the unique information of the electronic device 101 (for example, the MAC address of the electronic device 101, or the UUID of the electronic device 101), and the information for identifying the content providing service (or an identity for identifying the content providing service (or a service identity), or information indicating the content providing service).

In an embodiment, the first identity included in the first information, transmitted by the electronic device 101, may be information that is received from the external server 108 most recently (or lastly) from among the first identities periodically transmitted from the external server 108.

In an embodiment, the external device 102 may form the NAN cluster with the electronic device 101 by receiving the first beacon signal and synchronizing. In an embodiment, the external device 102 may perform a non-master role of the NAN cluster.

In an embodiment, the first information included in the first beacon signal (for example, a discovery beacon packet) may be included in a field indicating an information element. For example, the first information included in the first beacon signal may be included in a vendor specific field in the field indicating the information element. However, this should not be considered as limiting.

In operation 1203, the external device 102 may transmit least one second beacon signal for wireless connection to the electronic device 101, or may receive at least one second beacon signal for wireless connection from the electronic device 101.

For example, the external device 102 may transmit a second beacon signal for synchronizing to the electronic device 101 in the DW period 840 synchronized as defined by the NAN specification. In another example, the external device 102 may receive a second beacon signal for synchronizing from the electronic device 101 in the DW period 840 synchronized as defined by the NAN specification.

In an embodiment, the second beacon signal may include information necessary for maintaining synchronization between the devices.

In operation 1205, the external device 102 may transmit a signal including the second information to the external server 108.

In an embodiment, the external device 102 may transmit, to the external server 108, the second information including information including the first identity, the unique information of the electronic device 101, the unique information of the external device 102, and the information for requesting provision of a content.

In an embodiment, the first identity may be information which is included in the first information and is periodically received from the electronic device 101.

In an embodiment, the second information may include profile information of the user of the external device 102, in addition to the first identity, the unique information of the electronic device 101, and the unique information of the external device 102.

In an embodiment, the profile information to be transmitted to the external server 108 may include information related to preference of the user of the external device 102 for a content or the like.

In an embodiment, the profile information to be transmitted to the external server 108 may include information regarding a history (or record) of the user of the external device 102, of having been provided with a streaming service regarding a content (for example, music or video) by using the external server 108. For example, when the content is music, the profile information may include information regarding titles, genres, composers, or tempos of music that the user of the external device 102 has been provided with from the external server 108 during a specified period (for example, a week, a month, or a year), or a location of the user of the external device 102 when the streaming service of the content is provided from the external server 108, or the number of times that the user plays the music (for example, the number of times that the external device 102 is provided with a service for music of a specific title from the external server 108). In an embodiment, the information regarding the history of the user of the external device 102 of having been provided with the streaming service of the content by using the external server 108 may include a history of the user of the external device 102 of having been provided with the streaming service of the content from the external server 108 by using a device other than the external device 102 through an account related to the external server 108. However, this should not be considered as limiting.

For example, even when the content is a content other than music, such as a video, the same or similar method as or to at least part of the method when the content is music may be applied.

In an embodiment, the profile information to be transmitted to the external server 108 may further include information regarding a content selected by the user of the external device 102. For example, when the user of the external device 102 wishes to listen to specific music through the electronic device 101, the external device 102 may include information regarding the specific music (or information of selected music) in the second information by a user input.

In an embodiment, the profile information to be transmitted to the external server 108 may include information regarding a history of the user of the external device 102 of having output a content through the external device 102. For example, the profile information to be transmitted to the external server 108 may include information regarding a history of a content that has been outputted from the external device 102 by receiving a service through the external server 108, and a history of having output a stored (or recorded) content by outputting a content stored (or downloaded) in the memory. However, this should not be considered as limiting.

In an embodiment, the external device 102 may transmit, to the external server 108, the signal including the second information in various forms by using the account-based session. For example, the external device 102 may transmit the signal including the second information to the external server 108 based at least in part on an HTTP/HTTPS protocol. In an embodiment, the external device 102 may transmit the signal including the second information to the external server 108 based at least in part on a web REST API using Json or the like.

In an embodiment, the external device 102 may automatically transmit the signal including the second information to the external server 108 after receiving the first beacon signal or the second beacon signal although it is not illustrated in FIG. 12. For example, when the external device 102 receives the first beacon signal or second beacon signal, the external device 102 may output a screen informing of reception of the first beacon signal or the second beacon signal, and may automatically (or without a user input) the signal including the second information to the external server 108. In another embodiment, the external device 102 may transmit the signal including the second information by a user input after receiving the first beacon signal or the second beacon signal. For example, when the external device 102 receives the first beacon signal or the second beacon signal, the external device 102 may output a screen informing of reception of the first beacon signal or the second beacon signal, and may transmit the second information to the external server 108 in response to an input for transmitting the second information to the external server 108 being received from the user.

In an embodiment although not shown in FIG. 12, the external device 102 may receive information regarding a content list generated at the external server 108 from the external server 108. In an embodiment, the external device 102 may display the content list, for example, a list of contents to be outputted by the electronic device 10, through a display device (for example, the display chipset 334).

Figure 13:
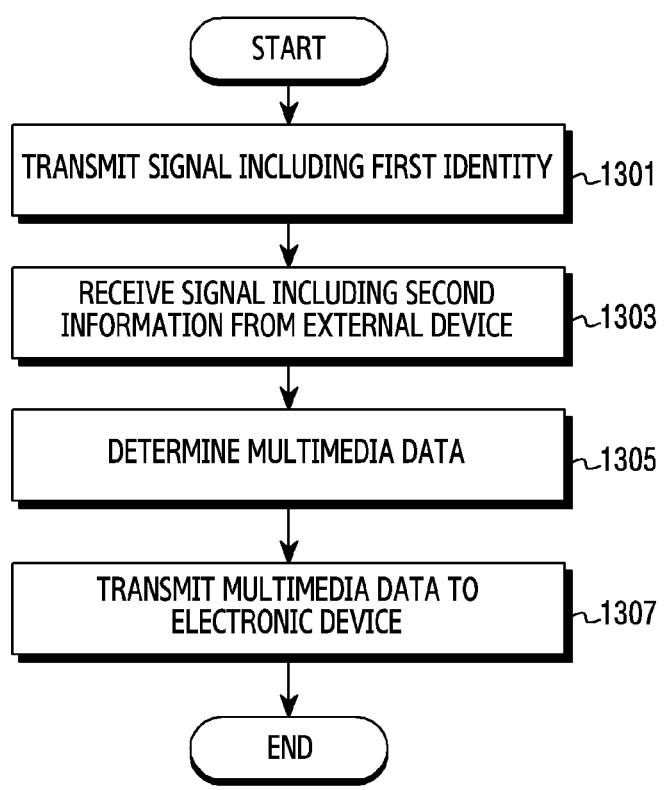
FIG. 13 is a flowchart to illustrate operations performed by an external server to provide a content according to various embodiments of the present disclosure.

FIG. 13 is a flowchart to illustrate operations performed by the external server 108 to provide a content according to various embodiments of the present disclosure. For example, FIG. 13 is a view to illustrate a method by which the external server 108 provides multimedia data related to the external device 102 through the electronic device 101.

Referring to FIG. 13, it is assumed that the external server 108 has performed the operation of connecting to the electronic device 101 and the external device 102 based on the account as in operations 601 and 603 of FIG. 6.

In operation 1301, the external server 108 may transmit a signal including the first identity to the electronic device 101.

In an embodiment, the external server 108 may periodically generate the first identity. For example, the external server 108 may periodically change the first identity and may transmit the first identity to the electronic device 101.

In an embodiment, the first identity may be information for identifying that the external device 102 has authority over the content providing service. In an embodiment, the first identity may be information for determining a state in which the external device 102 can receive a beacon signal from the electronic device 101 (or the external device 102 is located within a specified distance from the electronic device 101) when the external device 102 is not directly connected with the electronic device 101. In an embodiment, the first identity may be information for obtaining (or searching) the account of the user of the electronic device 101 along with the unique information of the electronic device 101, included in the second information, when the external server 108 receives a signal including the second information from the external device 102 as in operation

1305, which will be described below. In an embodiment, the first identity may be information based on the account of the user of the electronic device 101. However, this should not be considered as limiting.

In operation 1303, the external server 108 may receive a signal including the second information from the external device 102.

In an embodiment, the second information may include the first identity, the unique information of the electronic device 101, the unique information of the external device 102, and the information for requesting provision of a content.

In an embodiment, the second information may include profile information of the user of the external device 102, in addition to the first identity, the unique information of the electronic device 101, and the unique information of the external device 102.

Although not shown in FIG. 13, when the electronic device 101 receives the second beacon signal for synchronizing from the external device 102, the external server 108 may receive information regarding the external device 102 from the electronic device 101 after operation 1303.

In an embodiment, the information regarding the external device 102 may include at least one of the unique information of the external device 102, the information indicating that the external device 102 is included in the same cluster as that of the electronic device 101, or information indicating that the synchronization beacon is received from the external device 102. However, this should not be considered as limiting.

In operation 1305, the external server 108 may determine multimedia data to be transmitted to the electronic device 101 based at least in part on the information regarding the external device 102.

The operation of the external server 108 determining multimedia data in operation 1305 will be described hereinbelow in detail with reference to FIGS. 14 to 16.

Figure 14:
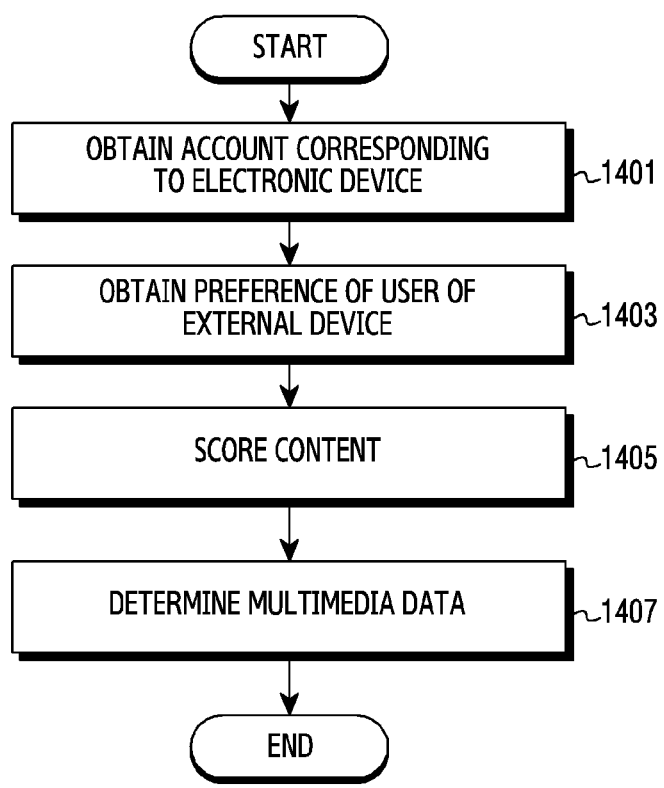
FIG. 14 is a flowchart to illustrate a method by which the external server determines multimedia data according to various embodiments of the present disclosure.

FIG. 14 is a flowchart to illustrate a method by which the external server 108 determines multimedia data according to various embodiments of the present disclosure.

FIG. 15 is a view to illustrate a method by which the external server 108 obtains preference regarding profile information according to various embodiments of the present disclosure.

FIG. 16 is a view to illustrate a method by which the external server 108 scores contents according to various embodiments of the present disclosure.

Referring to FIGS. 14 to 16, in operation 1401, the external server 108 may obtain (or search) an account corresponding to the electronic device 101 (or an account of the user of the electronic device 101), based at least in part on the first identity and the unique information of the electronic device 101, included in the second information. For example, the external server 108 may obtain the account of the user of the electronic device 101 that matches the first identity and the unique information of the electronic device 101, included in the second information, and is stored.

In operation 1403, the external server 108 may obtain preference of the user of the external device 102 for the profile information. For example, when the content is music, the external server 108 may obtain (or determine or calculate) preference of the user of the external device 102 for a genre of music in the profile. However, this should not be considered as limiting. The external server 108 may identify (or search) information regarding the account of the user of the external device 102, based at least in part on the unique information of the external device received from the external device 102. The external server 108 may obtain preference of the user of the external device 102 corresponding to the account of the user of the external device 102 from the account DB 430.

In an embodiment, the external server 108 may obtain preference of the user of the external device 102 for the profile information by using a certain method of machine learning. For example, the external server 108 may analyze music that the user of the external device 102 has been provided with from the external server 108 (or that has been outputted by the external device 102) in view of frequency and time, by using a neural network (or deep learning), and may obtain (or calculate) preference (for example, digitized data regarding the genre of music) based at least in part on the analyzed data. However, the preference is not limited to the digitized data regarding the genre of music, and may include digitized data of a variety of profile information like at least one of a title of music, a composer of music, or a tempo of music.

In an embodiment, the preference of the user of the external device 102 for the profile information may match (or may be mapped onto) the user account of the external device 102, and may be stored (updated).

In an embodiment, when the second information includes information regarding a content selected by the user of the external device 102, the external server 108 may obtain preference of the user of the external device 102 for the profile information by reflecting the information regarding the content selected by the user of the external device 102. For example, when the second information includes information regarding music selected by the user of the external device 102, the external server 108 may obtain preference of the user of the external device 102 for the profile information (for example, a genre of music, or the like) by applying a certain method of machine learning to the music selected by the user of the external device 102. However, this should not be considered as limiting.

In an embodiment, when the external server 108 receives the second information from a plurality of external devices 102, the external server 108 may obtain preference of respective users of the plurality of external devices 102 for profile information.

When the external server 108 obtains preference of the users of the plurality of external devices 102 for the profile information, the external server 108 may associate (or match) the preference of the users for the profile information with the accounts of the users of the plurality of external devices 102, and may store the preference.

For example, as shown in FIG. 15, the external server 108 may store digitized preference of the users for the profile information (for example, genres 1 to 5) in association with the accounts of the users (for example, A account, B account, and C account) of the plurality of external devices 102 (first external device 102-1 to third external device 102-5). For example, for the A account, digitized preference values 1, 2, 1, 3, 2 may be stored for genres 1 to 5. For the B account, digitized preference values 3, 2, 1, 5, 2 may be stored for genres 1 to 5. For the C account, digitized preference values 6, 2, 4, 2, 1 may be stored for genres 1 to 5.

In operation 1405, the external server 108 may perform a scoring operation with respect to a content to be outputted by the electronic device 101, based at least in part on the obtained preference. In an embodiment, when there are a plurality of contents to be outputted by the electronic device 101, the external server 108 may score each of the plurality of contents (or digitize by adding) based at least in part on the obtained preference. For example, when the content is music and there are a plurality of external devices 102, the external server 108 may identify (or determine) genres of music regarding respective contents to be outputted by the electronic device 101. The external server 108 may add digitized preference values of the users of the plurality of external devices 102 regarding each of genres of music with respect to each of the contents to be outputted by the electronic device 101. However, the scoring operation performed by the external server 108 is not limited to the above-described example.

For example, when there are a plurality of contents (for example, Songs 1 to 5) to be currently outputted by the electronic device 101 as shown in FIG. 16, the external server 108 may determine scored values 0, 1, 2, 3, 4 for the plurality of contents with respect to the account (A account) of the user of the first external device 102-1, may determine scored values 8, 2, 5, 1, 8 for the plurality of contents with respect to the account (B account) of the user of the second external device 102-3, and may determine scored values 2, 4, 1, 6, 2 for the plurality of contents with respect to the account (C account) of the user of the third external device 102-5.

In an embodiment, the external server 108 may add the scored values of the plurality of accounts for each content, and may average the values. For example, the external server 108 may add the scored values of the A account to C account for Song 1, and may obtain (or calculate) an average of 3.333333. Specifically, regarding Song 1, the external server 108 may add the scored values (0, 8, 2) of the A account to C account, and may obtain (or calculate) the average of 3.333333. Regarding Song 2, the external server 108 may add the scored values (1, 2, 4) of the A account to C account, and may obtain (or calculate) an average of 2.333333. Regarding Song 3, the external server 108 may add the scored values (2, 5, 1) of the A account to C account, and may obtain (or calculate) an average of 2.666667. Regarding Song 4, the external server 108 may add the scored values (3, 1, 6) of the A account to C account, and may obtain (or calculate) an average of 3.333333. Regarding Song 5, the external server 108 may add the scored values (4, 8, 2) of the A account to C account, and may obtain (or calculate) an average of 4.666667.

Referring back to FIG. 14, in operation 1407, the external server 108 may determine a content (or multimedia data) to be outputted by the electronic device 101 based at least in part on the scored values regarding the content to be outputted by the electronic device 101. For example, the external server 108 may generate (or change or update) a content list in order for the electronic device 101 to output the contents in order from the content having the highest scored value (for example, a highest added preference value regarding titles of music to be outputted by the electronic device 101). For example, the external server 108 may determine the output order of the contents to be outputted by the electronic device 101, based at least in part on the scored value. However, this should not be considered as limiting.

In an embodiment, the external server 108 may change the generated content list, based at least in part on basic profile information (or user private information) of the user of the external device 102 (for example, at least one of age or sex of the user of the external device 102). For example, when the user of at least one external device 102 is a minor, the external server 108 may remove a content that cannot be provided to minors from the generated content list. However, this should not be considered as limiting.

In an embodiment, the external server 108 may generate multimedia data regarding the generated content list.

Referring back to FIG. 13, in operation 1307, the external server 108 may transmit the generated multimedia data to the electronic device 101.

Although not shown in FIG. 13, the external server 108 may transmit information regarding the generated content list to the external device 102, such that the external device 102 outputs the generated content list through the user interface.

Figure 17:
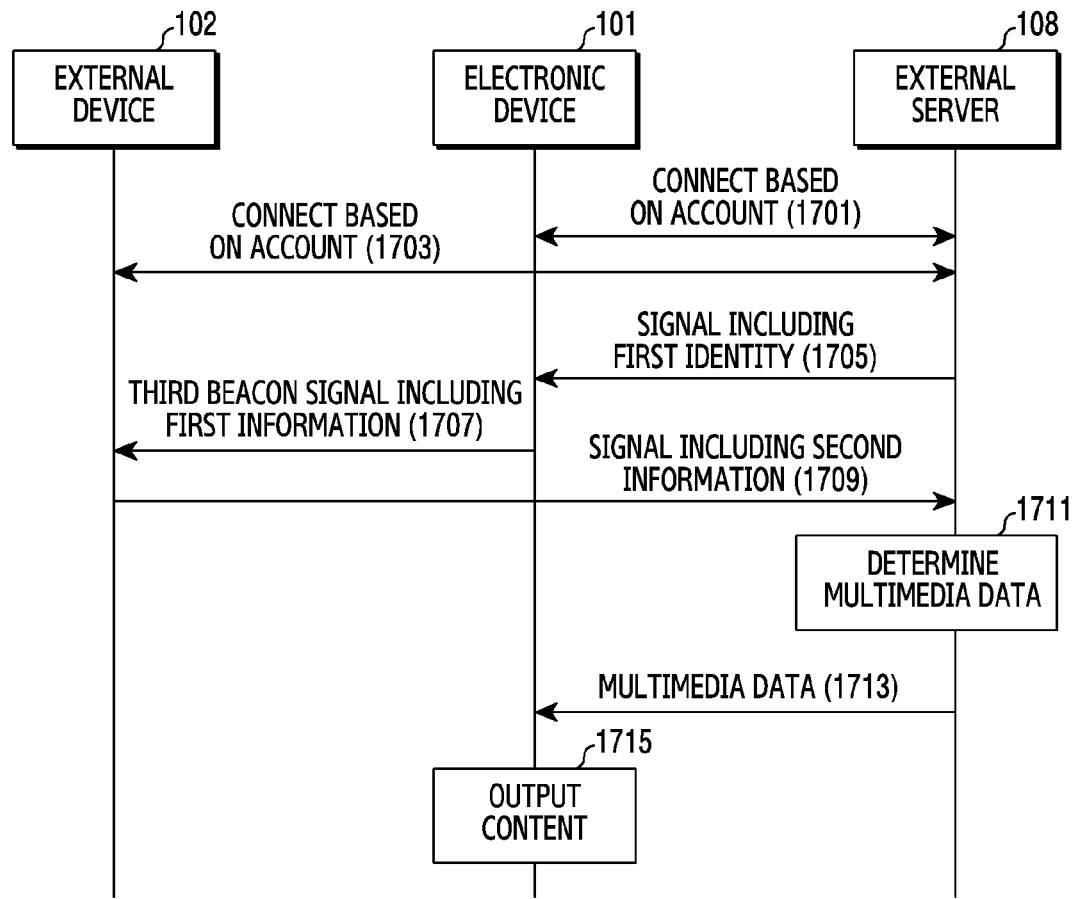
FIG. 17 is a view to illustrate a method for providing a content according to various embodiments of the present disclosure.

FIG. 17 is a view to illustrate a method for providing a content according to various embodiments of the present disclosure. For example, FIG. 17 is a view to illustrate a method by which the electronic device 101 provides a content when the electronic device 101 and the external server 102 support BLE.

Referring to FIG. 17, operations 1701 to 1705 are the same as or similar to operations 601 to 605 of FIG. 6 at least in part, and operations 1709 to 1715 are the same as or similar to operations 611 to 617 at least in part, and thus a detailed description thereof is omitted.

In operation 1707, the electronic device 101 may transmit (or broadcast) a third beacon signal including the first information.

The third beacon signal including the first information will be described below in detail with reference to FIGS. 18A and 18B.

Figure 18A:
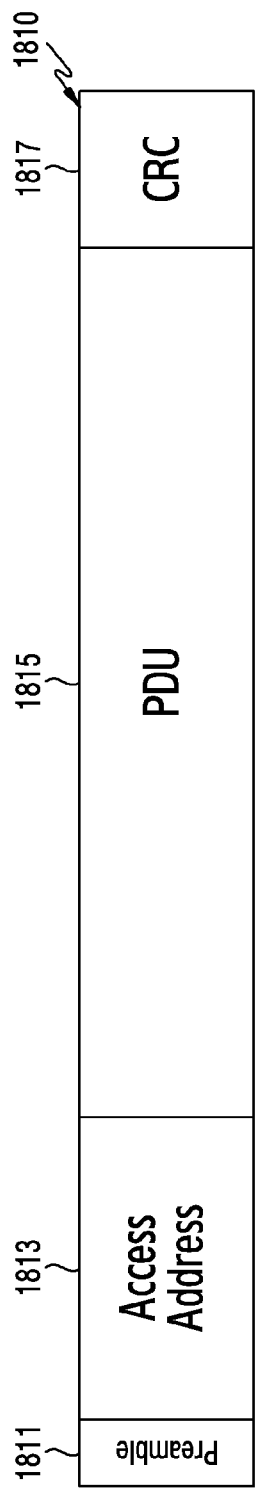
FIGS. 18A and 18B are views illustrating an example of a discovery beacon packet which is transmitted by the electronic device according to various embodiment of the present disclosure.
Figure 18B:
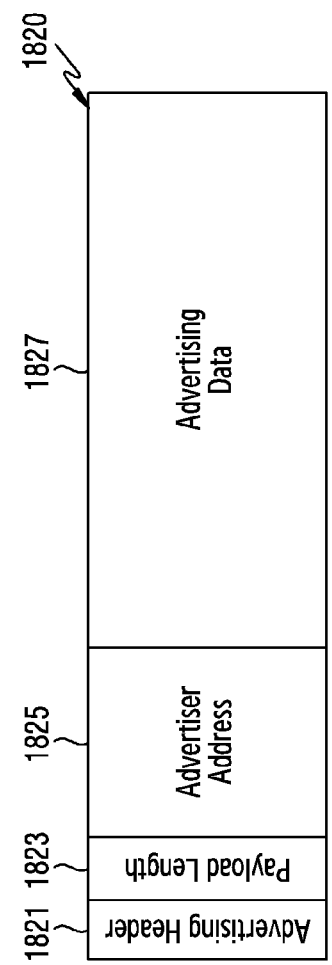

FIGS. 18A and 18B are views illustrating an example of a discovery beacon packet transmitted by the electronic device 101 according to various embodiments of the present disclosure.

FIG. 18A is a view illustrating an example of the third beacon, for example, a BLE packet 1810. In an embodiment, the BLE packet 1810 may include a preamble field 1811, an access address field 1813, a packet data unit (PDU) field 1815, a cyclical redundancy check (CRC) field 1817.

FIG. 18B is a view illustrating an example of an advertising packet 1820 included in the PDU 1815. In an embodiment, the advertising packet 1820 may include an advertising header field 1821, a payload length field 1823, an advertiser address field 1825, and an advertising data field 1827. In an embodiment, the first information may be included in the advertising data field 1827 of the advertising packet 1820. However, this should not be considered as limiting.

In an embodiment, the electronic device 101 may not perform an operation (or procedure) of connecting the electronic device 101 and the external device 102, in addition to the operation of transmitting the third beacon signal. However, this should not be considered as limiting.

In an embodiment, FIG. 17 illustrates an advertising (or posting) operation of BLE by passive scanning, but this should not be considered as limiting. For example, according to active scanning, the external device 102 may transmit a scan request to the electronic device 101, and the electronic device 101 may transmit a scan response including the first information to the external device 102.

Figure 19:
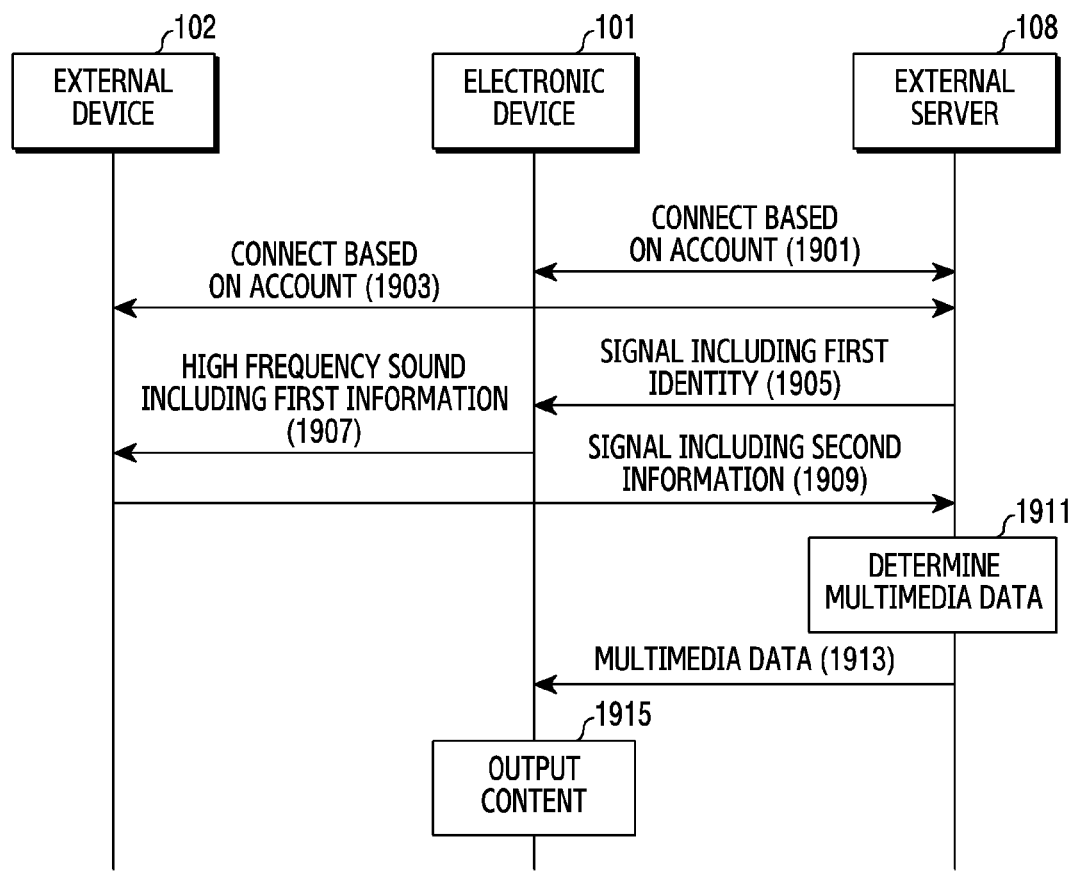
FIG. 19 is a view to illustrate a method for providing a content according to various embodiment of the present disclosure.

FIG. 19 is a view to illustrate a method for providing a content according to various embodiments of the present disclosure.

For example, FIG. 19 is a view to illustrate a method by which the electronic device 101 provides a content when the electronic device 101 and the external device 102 support a high frequency sound (or ultrasonic waves).

Referring to FIG. 19, operations 1901 to 1905 are the same as or similar to operations 601 to 605 of FIG. 6 at least in part, and operations 1909 to 1915 are the same as or similar to operations 611 to 617 at least in part, and thus a detailed description thereof is omitted.

In operation 1907, the electronic device 101 may transmit (or broadcast) a high frequency sound including the first information.

In an embodiment, the high frequency sound may be periodically generated at the electronic device 101, and may be a frequency which falls out of an audible frequency or may be the highest audible frequency. In an embodiment, the external device 102 may obtain the first information from the high frequency sound by using an application capable of analyzing a waveform (or pattern) of the high frequency sound received from the electronic device 101.

Although not shown in FIG. 19, when the external device 102 receives the high frequency sound including the first information, the external device 102 may transmit a high frequency sound to the electronic device 101 as a response. However, this should not be considered as limiting.

Figure 20:
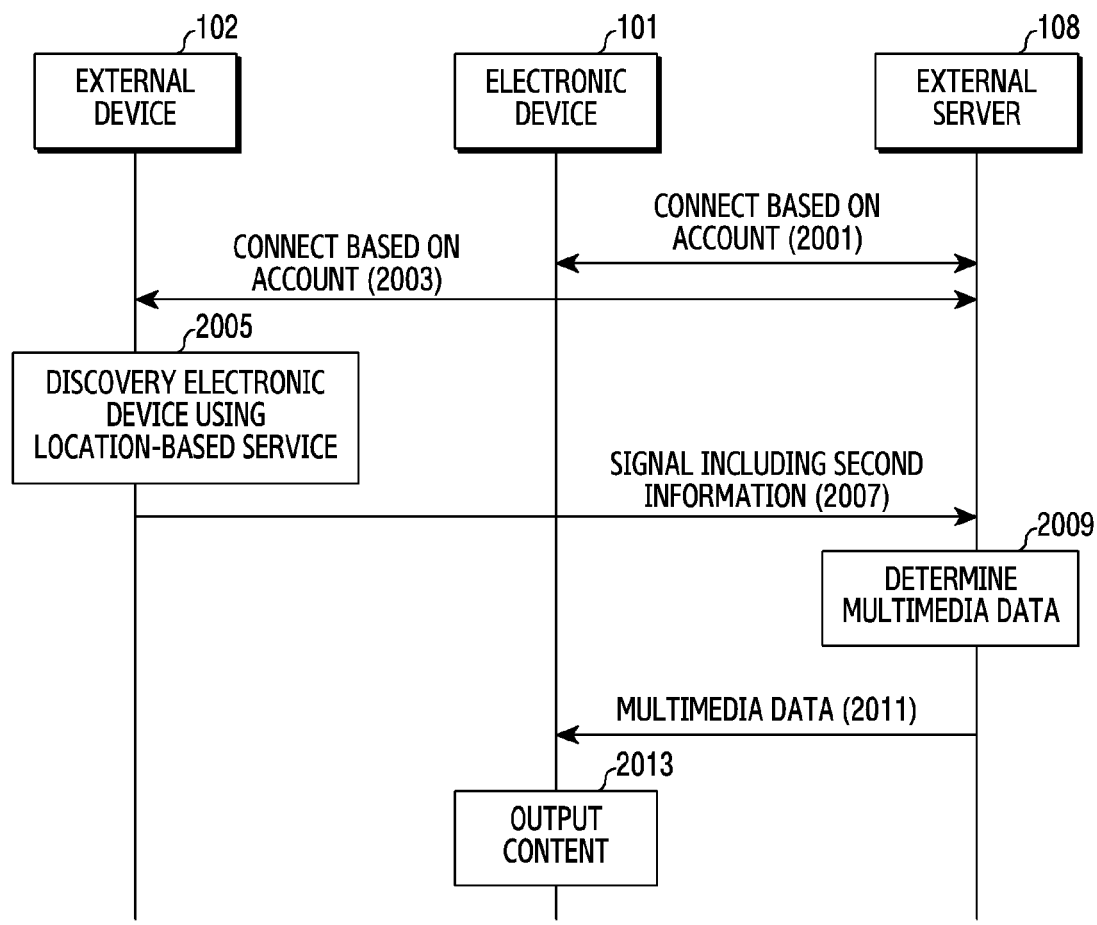
FIG. 20 is a view to illustrate a method for providing a content by using a location-based service according to various embodiments of the present disclosure.

FIG. 20 is a view to illustrate a method for providing a content by using a location-based service according to various embodiments of the present disclosure.

Referring to FIG. 20, operations 2001 to 2003 are the same as or similar to operations 601 to 603 of FIG. 6 at least in part, and operations 2009 to 2013 are the same as or similar to operations 613 to 617 at least in part, and thus a detailed description thereof is omitted.

In operation 2005, the external device 102 may discover the electronic device 101 by using a location-based service.

In an embodiment, the location-based service may discover the electronic device 101 by using a global positioning system (GPS). For example, the external device 102 may detect a current location of the external device 102 by using a GPS module included in the external device 102. The external device 102 may transmit information regarding the current location of the external device 102 to a server related to a location or the external server 108. The external device 102 may receive, from the server related to the location or the external server 108, information regarding at least one electronic device 101 located within a specified distance (or a short distance or a close distance) from the external device 102. For example, the external device 102 may receive, from the server related to the location or the external server 108, unique information of the at least one electronic device 101 (for example, a MAC address of the electronic device 101 or an UUID of the electronic device 101) located within the specified distance from the external device 102. In an embodiment, when the external device 102 receives the unique information of the at least one electronic device 101 located within the specified distance from the external device 102, the external device 102 may display a list of the at least one electronic device 101, based at least in part on the unique information of the at least one electronic device 101. However, this should not be considered as limiting.

In another embodiment, the external device 102 may discover the electronic device 101 by using a WiFi positioning system (WPS) as a location-based service. For example, the external device 102 may receive, from at least one electronic device (for example, an access point (AP)) located on the periphery of the external device 102, a signal (for example, a beacon signal or the like) including information of the at least one electronic device (unique information of the at least one electronic device). The external device 102 may transmit the information regarding the at least one electronic device to the server related to the location or the external server 108. The external device 102 may receive, from the server related to the location or the external server 108, information regarding one or more electronic devices located within a specified distance (or a short distance or a close distance) from the external device 102. In an embodiment, the external device 102 may receive, from the server related to the location or the external server 108, information regarding a current location of the external device 102 and information regarding one or more electronic devices located within the specified distance from the external device 102. However, the information received by the external device 102 from the server related to the location or the external server 108 is not limited to the above-described example.

In still another embodiment, the external device 102 may discover the electronic device 101 by using a geo-fence as a location-based service (for example, based on cell information regarding an adjacent base station). For example, the external device 102 may receive, from a base station adjacent to the external device 102, a signal including cell information of the base station (for example, information regarding a location of the base station). The external device 102 may transmit the cell information of the base station to the server related to the location or the external server 108. The external device 102 may receive, from the server related to the location or the external server 108, information regarding one or more electronic devices located within a specified radius from the location of the base station. In an embodiment, the external device 102 may store information regarding a region (or geo-fence) within a specified radius from a location of a specific base station (or a first base station), and information regarding at least one electronic device located within the specified radius from the location of the specific base station. When the external device 102 enters the region within the specified radius from the location of the specific base station, the external device 102 may obtain information regarding at least one electronic device located within the specified radius from the location of the specific base station, based at least in part on the stored information. In an embodiment, when the external device 102 receives the information regarding one or more electronic devices located within the specified distance from the external device 102, the external device 102 may display a list of one or more electronic devices, based at least in part on the unique information of the one or more electronic devices. However, this should not be considered as limiting In operation 2007, the external device 102 may transmit a signal including a portion of the second information to the external server 108.

In an embodiment, when the external device 102 displays the list of one or more electronic devices, the external device 102 may receive an input of selecting (or determining) the electronic device 101 from the list of the at least one electronic device from the user. In response to the input of selecting the electronic device 101 being received, the external device 102 may transmit a signal including a portion of the second information to the external device 108. However, this should not be considered as limiting.

In an embodiment, a portion of the second information may include the unique information of the electronic device 101, the unique information of the external device 102, and the information for requesting provision of a content. In another embodiment, a portion of the second information may include profile information of the user of the of the external device 102, in addition to the unique information of the electronic device 101, the unique information of the external device 102, and the information for requesting provision of a content. In still another embodiment, a portion of the second information may further include information regarding the account of the user of the of the electronic device 101, in addition to the unique information of the electronic device 101, the unique information of the external device 102, and the information for requesting provision of a content. However, this should not be considered as limiting.

In operation 2009, the external server 108 may determine multimedia data to be transmitted to the electronic device 101, based at least in part on the signal including the second information.

In an embodiment, the external server 108 may determine multimedia data based at least in part on the profile information of the user of the external device 102 for a specified time (or limited time) in the electronic device 101. For example, the external server 108 may identify that the second information that does not include the first identity is received from the external device 102. The external server 108 may generate a content list to be outputted by the electronic device 101 to reflect preference of the user of the external device 102 for the limited time. For example, the external server 108 may generate a content list, such that the electronic device 101 outputs a content by reflecting profile information of the user of the external device 102 and the user of another external device 102 for the limited time, and outputs a content by reflecting the profile of the user of another external device 102 except for the user of the external device 102 when the limited time passes. However, this should not be considered as limiting.

In operation 2011, the external server 108 may transmit the generated multimedia data to the electronic device 101.

In operation 2013, the electronic device 101 may output a content based at least in part on the received multimedia data.

In an embodiment, based at least in part on the received multimedia data, the electronic device 101 may output a content by reflecting profile information of the user of the external device 102 and the user of another external device for the limited time, and, when the limited time passes, the electronic device 101 may output a content by reflecting the profile of the user of another external device except for the user of the external device 102. However, this should not be considered as limiting.

In an embodiment although not shown in FIG. 20, the external device 102 may perform the operation of discovering the electronic device 101 periodically by using the location-based service, and, when the electronic device 101 is discovered, the external device 102 may transmit a portion of the second information to the external server 108. In an embodiment, the external device 102 may discover a second electronic device which performs the same function as that of the electronic device 101 and is located at a different place, in addition to the electronic device 101, according to a movement of the external device 102. In an embodiment, the external device 102 may update (or refine) the list of at least one electronic device according to the movement of the external device 102 (or a current location of the external device 102). For example, when the external device 102 moves from a first location to a second location, the external device 102 may update (or change) a first list of at least one first electronic device detected at the first location to a second list of at least one second electronic device detected at the second location. When the external device 102 discovers the second electronic device, the external device 102 may transmit a portion of the second information to the external server 108. In an embodiment, the external server 108 may determine multimedia data of a content to be outputted by the second electronic device, based on a portion of the second information. The external server 108 may transmit the determined multimedia data to the second electronic device, such that the second electronic device outputs the content.

Figure 21:
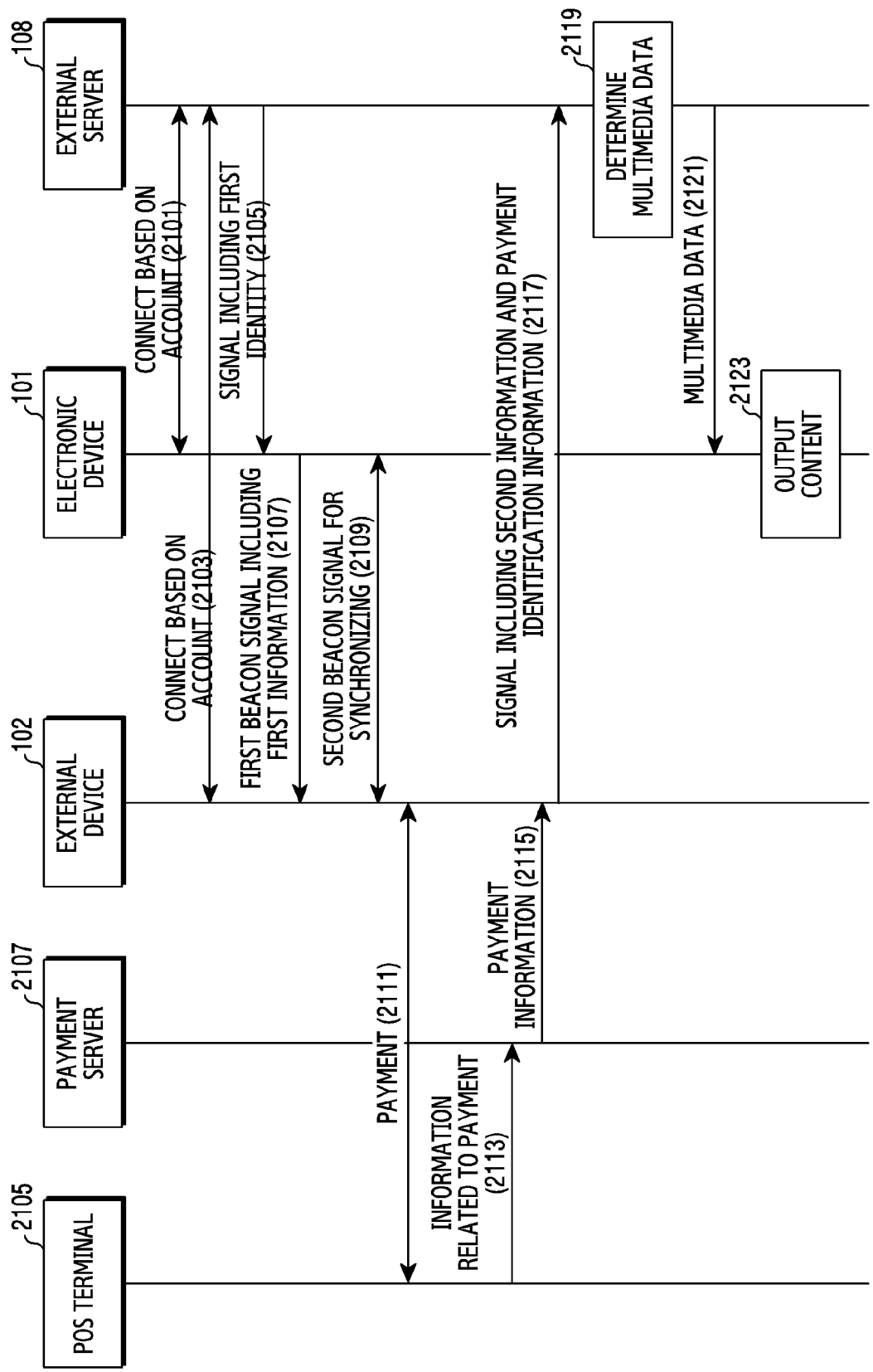
FIG. 21 is a view to illustrate a method for providing a content in association with a payment operation according to various embodiments of the present disclosure.

FIG. 21 is a view to illustrate a method for providing a content in association with a payment operation according to various embodiments of the present disclosure.

Referring to FIG. 21, operations 2101 to 2109 are the same as or similar to operations 601 to 611 of FIG. 6 at least in part, and operations 2119 to 2123 are the same as or similar to operations 613 to 617 at least in part, and thus a detailed description thereof is omitted.

In operation 2111, the external device 102 and a point of sale (POS) terminal 2105 may perform a payment operation. For example, the external device 102 may perform the payment operation with the POS terminal 2105 by using an application for a mobile payment (for example, the Samsung pay application). In an embodiment, the POS terminal 2105 may be a POS terminal which is placed at a store at which the electronic device 101 is located (or placed). However, this should not be considered as limiting. In an embodiment, in operation 2111, the external device 102 and the POS terminal 2105 perform the payment operation, but this should not be considered as limiting. For example, the user of the external device 102 may perform the payment by doing an action for a payment (for example, bringing a card into contact with the POS terminal or swiping) with the POS terminal 2105 using a card (for example, a real credit card). In an embodiment, when the external device 102 and the POS terminal 2105 perform the payment operation, it means that the user of the external device 102 is in the place where the electronic device 101 is placed. In an embodiment, when the external device 102 and the POS terminal 2105 performs the payment operation, it means that the user of the external device 102 has authority to receive a content by using the electronic device 101. In an embodiment, when the external device 102 and the POS terminal 2105 perform the payment operation, a portion of information transmitted or received in at least one of operations 2107 to 2109 or in any one of operations 2107 to 2109 may not be transmitted or received.

In operation 2113, the POS terminal 2105 may transmit information related to the payment to a payment server 2107. For example, the POS terminal 2105 may transmit, to the payment server 2107, the information related to the payment (for example, a payment amount or the like) and information related to the user of the card which performs the payment operation.

In an embodiment, the payment server 2107 may include at least one of a server providing a mobile payment service (for example, a server or the like providing a payment service through the Samsung pay application), a finance server (for example, a server managed by a finance company (for example, a credit card company, a bank, or the like), or a purchase server. However, this should not be considered as limiting.

In operation 2115, the payment server 2107 may transmit information regarding the payment to the external device 102. For example, the payment server 2107 may transmit, to the external device 102, information regarding the payment amount, the store, or the like, or information regarding a payment time or the like, and payment identification information identifying that the payment has been performed. However, the information regarding the payment is not limited to the above-described examples, and according to an embodiment, the POS terminal 2105 may receive the payment information from the payment server 2107 and may transmit the payment information to the external device 102.

In operation 2117, the external device 102 may transmit the second information and the information identifying the payment to the external server 108.

In an embodiment, the external device 102 may transmit the second information and the information identifying the payment (or information identifying payment completion) to the external server 108, in response to the information regarding the payment being received from the payment server 2107.

In an embodiment, the information identifying the payment may include information identifying that the payment has been completed.

Although not shown in FIG. 21, when the second information and the information identifying the payment are received from the external device 102 in operation 2117, the external server 108 may transmit a signal including information for identifying the payment (or information for requesting identification of payment completion) to the payment server 2107. In an embodiment, when the information for identifying the payment is received from the external server 108, the payment server 2107 may transmit a signal including information indicating that the payment has been identified (or payment has been completed or payment has been normally performed) to the external server 108. In an embodiment, the external server 108 may determine multimedia data based at least in part on the information of the external device 102 in response to the signal including the information indicating that the payment has been identified being received from the payment server 2107. However, this should not be considered as limiting.

Figure 22:
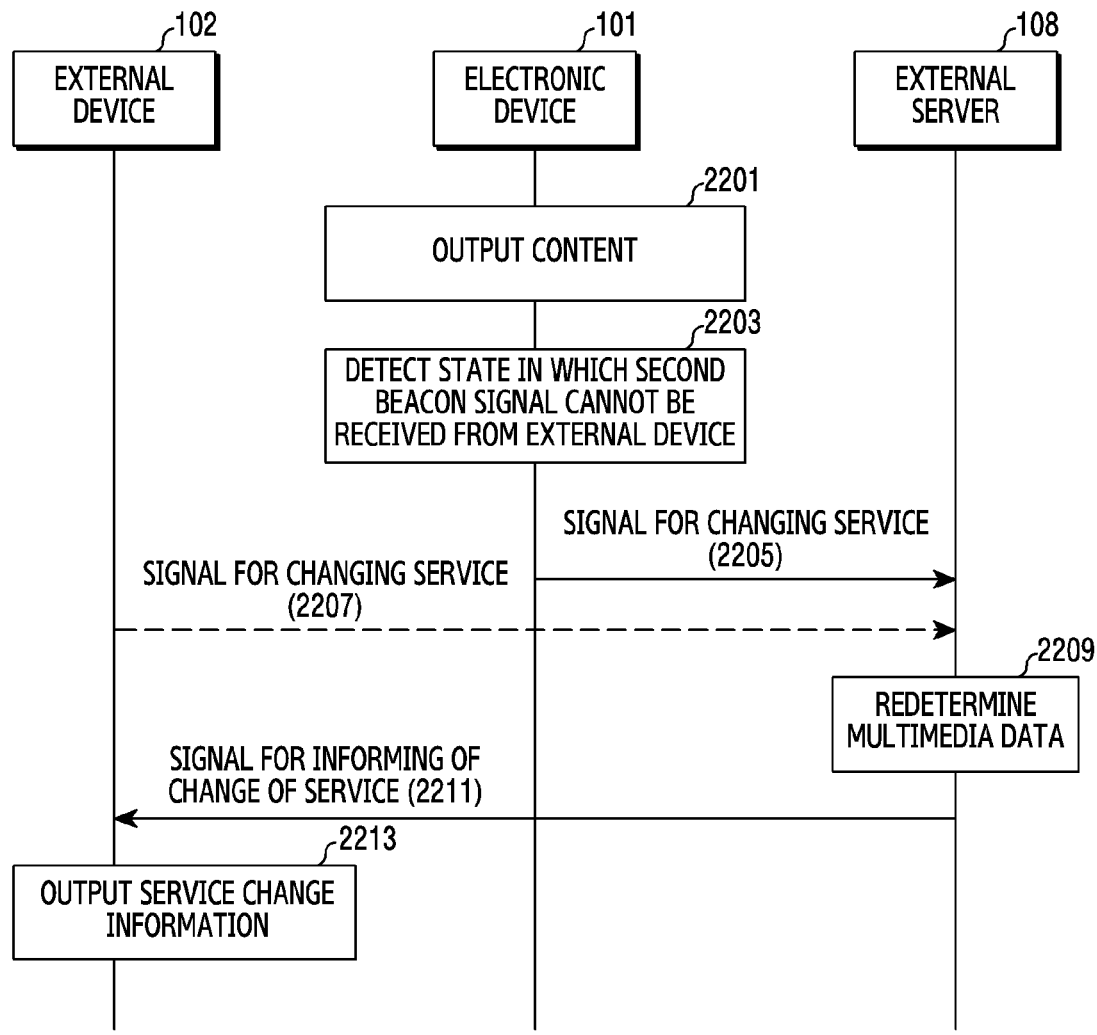
FIG. 22 is a view to illustrate a method for changing a content providing service according to various embodiments of the present disclosure.

FIG. 22 is a view to illustrate a method for changing a content providing service according to various embodiments of the present disclosure. For example, FIG. 22 is a view to illustrate a method for changing a content providing service when the electronic device 101 and the external device 102 support NAN.

Referring to FIG. 22, in operation 2201, the electronic device 101 may output a content (or is outputting the content). For example, the electronic device 101 may output the content based at least in part on profile information (or preference of a profile) of the user of the external device 102.

In operation 2203, the electronic device 101 may detect a state in which the electronic device 101 cannot receive the second beacon signal from the external device 102.

In an embodiment, the electronic device 101 may detect that the second beacon signal (or synchronization beacon packet) is not received from the external device 102 in the DW period 840. For example, after forming a cluster with the external device 102, the electronic device 101 may detect that a synchronization beacon packet is not received from the external device 102. In an embodiment, the synchronization beacon packet not being received from the external device 102 may mean that the external device 102 is not located within a specified distance from the electronic device 101. In an embodiment, the synchronization beacon packet not being received from the external device 102 may mean that the external device 102 leaves from the same cluster.

In operation 2205, the electronic device 101 may transmit a signal for changing the content providing service to the external server 108.

In an embodiment, the electronic device 101 may transmit a signal requesting termination of the provision (or change) of the content providing service to the external server 108.

In an embodiment, the signal for changing the content providing service may include at least one of the unique information of the external device 102, the unique information of the electronic device 101, or the first identity. However, this should not be considered as limiting.

When the external device 102 was not able to (or is not able to) receive the second beacon signal (for example, the synchronization beacon packet) from the electronic device 101, the external device 102 may transmit a signal for changing the content providing service (or a signal for requesting change of the content providing service) to the external server 108 in operation 2207. In an embodiment, the signal for requesting the change of the content providing service, transmitted to the external server 108, may include at least one of the unique information of the external device 102, the unique information of the electronic device 101, or the first identity. However, this should not be considered as limiting. In an embodiment, operation 2207 may be omitted.

In operation 2209, the external server 108 may re-determine multimedia data.

In an embodiment, when the external server 108 receives the signal for changing the content providing service from the electronic device 101 or the external device 102, the external server 108 may generate (or change or update) a content list to be outputted by the electronic device 101, without reflecting the profile information (or preference of the profile) of the user of the external device 102.

In an embodiment although not shown in FIG. 22, the electronic device 101 may receive multimedia data (for example, multimedia data for generating the changed content list) from the external server 108. The electronic device 101 may output a content included in the changed content list based at least in part on the received multimedia data.

In operation 2211, the external server 108 may transmit a signal for informing of the change of the content service to the external device 102.

In operation 2213, the external device 102 may output information indicating that the content service is changed (or terminated). For example, in response to the signal for informing of the change of the content service being received at the external device 102, the external device 102 may display a screen indicating that the content service is changed. However, this should not be considered as limiting.

In an embodiment although not shown in FIG. 22, when the external server 108 receives, from the external device 102, the first identity included in the signal for changing the content providing service or the signal including the second information (for example, when the external device 102 transmits the signal including the second information to the external server 108), the external server 108 may identify whether the first identity received from the external device 102 is the first identity that has been transmitted to the electronic device 101 most recently (or has been generated most recently). In an embodiment, when the first identity received by the external server 108 from the external device 102 is different from the first identity that has been transmitted to the electronic device 101 most recently (or when the first identity received from the external device 102 is the first identity which was previously generated, the external server 108 may change the content providing service.

In an embodiment although not shown in FIG. 22, when the first identity received by the external server 108 from the external device 102 is the same as the first identity transmitted to the electronic device 101 most recently (or when the first identity received from the external device 102 is the first identity generated most recently), the external server 108 may provide the content providing service continuously or for a specified time.

Figure 23:
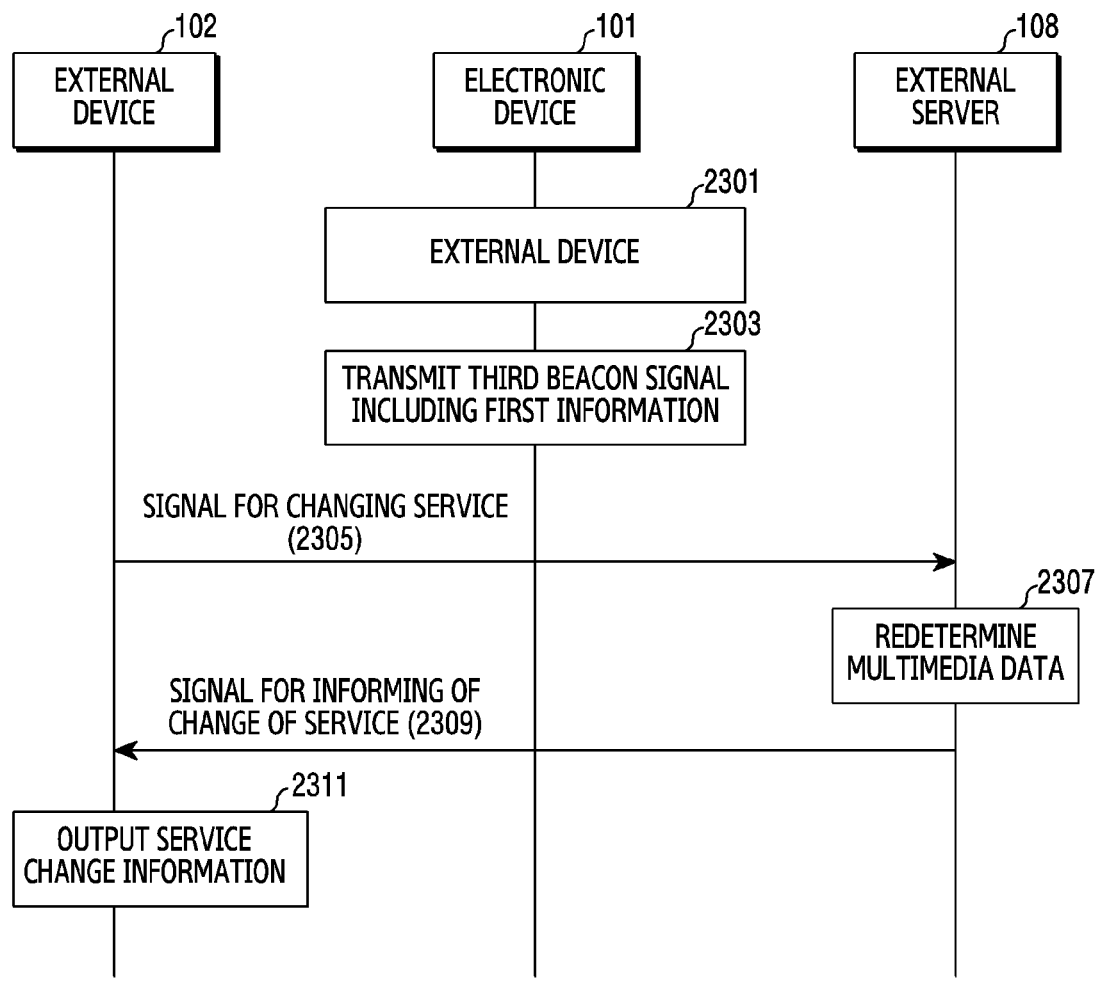
FIG. 23 is a view to illustrate a method for changing a content providing service according to various embodiments of the present disclosure.

FIG. 23 is a view to illustrate a method for changing a content providing service according to various embodiments of the present disclosure. For example, FIG. 23 is a view to illustrate a method for changing a content providing service when the electronic device 101 and the external device 102 support BLE.

Referring to FIG. 23, operation 2301 and operations 2307 to 2311 are the same as or similar to operation 2201 and operations 2209 to 2213 of FIG. 22 at least in part, and thus a detailed description thereof is omitted.

In operation 2303, the electronic device 101 may transmit (or broadcast) a third beacon signal (for example, a BLE packet) including the first information.

In an embodiment, the external device 102 may detect that the external device 102 is not able to receive the third beacon signal. For example, when the external device 102 is located at a distance longer than a specified distance from the electronic device 101 (or is moved), the external device 102 may not be able to receive the third beacon signal from the electronic device 101.

In operation 2305, the external device 102 may transmit a signal for changing the content providing service to the external server 108. In an embodiment, the electronic device 101 may transmit a signal for requesting change of the content providing service.

In an embodiment, the signal for changing the content providing service may include at least one of the unique information of the external device 102, the unique information of the electronic device 101, or the first identity. However, this should not be considered as limiting.

In an embodiment, the external server 108 may receive, from the external device 102, the first identity included in the signal for changing the content providing service or the signal including the second information. For example, when the external device 102 transmits the signal including the second information to the external server 108, the external server 108 may determine whether the first identity received from the external device 102 is the first identity transmitted to the electronic device 101 most recently (or generated most recently). In an embodiment, when the first identity received by the external server 108 from the external device 102 is different from the first identity transmitted to the electronic device 101 most recently (or when the first identity received from the external device 102 is the first identity generated previously), the external server 108 may change the content providing service.

In an embodiment although not shown in FIG. 23, the electronic device 101 may receive multimedia data (for example, multimedia data for generating a changed content list) from the external server 108. The electronic device 101 may output a content included in the changed content list based at least in part on the received multimedia data.

In an embodiment although not shown in FIG. 23, when the first identity received by the external server 108 from the external device 102 is the same as the first identity transmitted to the electronic device 101 most recently (or when the first identity received from the external device 102 is the first identity generated most recently), the external server 108 may provide the content providing service continuously or for a specified time.

Figure 24:
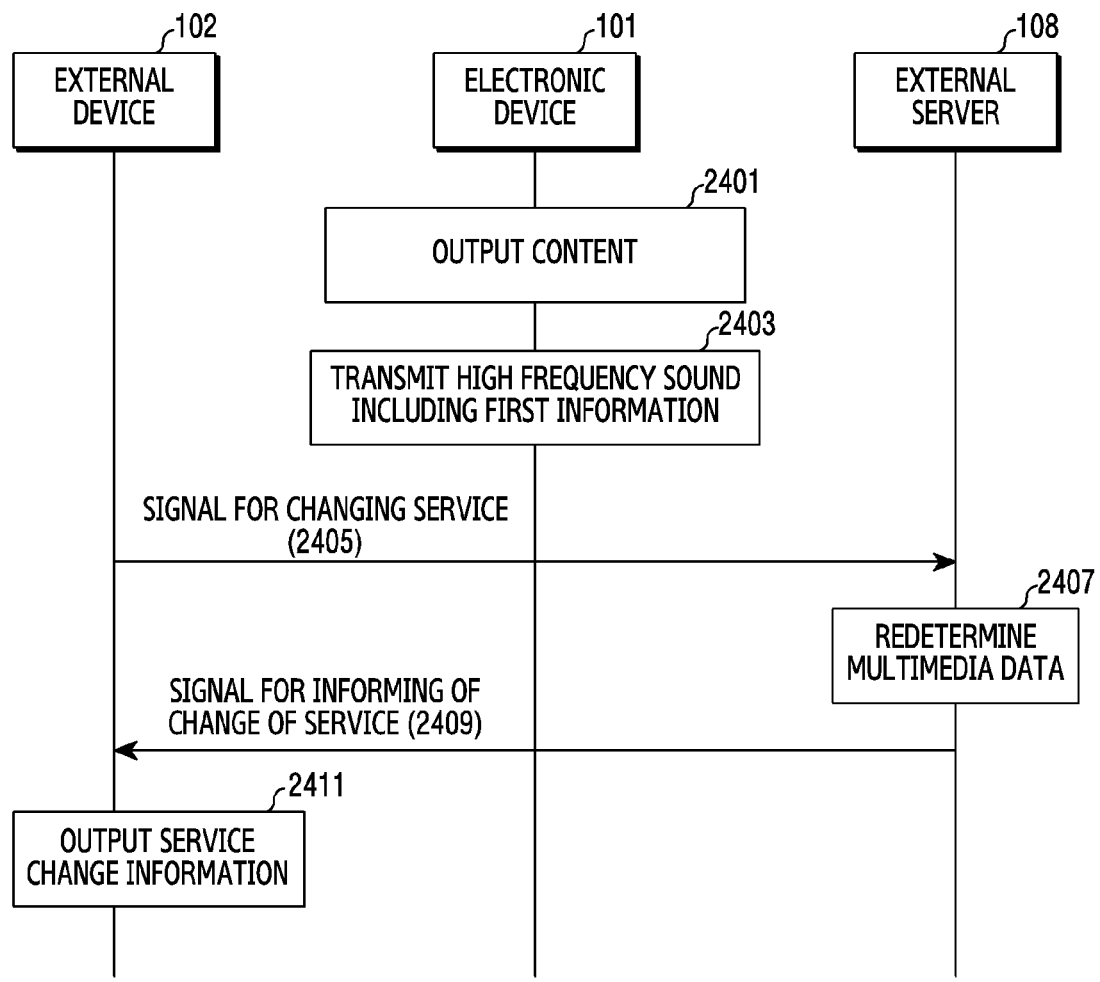
FIG. 24 is a view to illustrate a method for changing a content providing service according to various embodiments of the present disclosure.

FIG. 24 is a view to illustrate a method for changing a content providing service according to various embodiments of the present disclosure. For example, FIG. 24 is a view to illustrate a method for changing a content providing service when the electronic device 101 and the external device 102 support a high frequency sound (or ultrasonic waves).

Referring to FIG. 24, operation 2401 and operations 2407 to 2411 are the same as or similar to operation 2301 and operations 2307 to 2311 of FIG. 23 at least in part, and thus a detailed description thereof is omitted.

In operation 2403, the electronic device 101 may transmit a high frequency sound including the first information to the external device 102.

In an embodiment, the high frequency sound may be periodically generated at the electronic device 101, and may be a frequency which falls out of an audible frequency or may be the highest audible frequency. In an embodiment, the external device 102 may obtain the first information from the high frequency sound by using an application capable of analyzing a waveform (or pattern) of the high frequency sound received from the electronic device 101. In an embodiment, the operation of receiving the first information by using the high frequency sound may be an auxiliary operation for transmitting a beacon signal including the first information by using NAN or BLE.

In operation 2405, the external device 102 may transmit a signal for changing the content providing service to the external server 108. In an embodiment, the electronic device 101 may transmit a signal for requesting change of the content providing service.

In an embodiment, the external device 102 may detect that the high frequency sound cannot be received from the electronic device 101. For example, when the external device 102 is located at a distance longer than a specified distance from the electronic device 101 (or is moved), the external device 102 may not be able to receive the high frequency sound from the electronic device 101. When the external device 103 is not able to receive the high frequency sound from the electronic device 101, the external device 102 may transmit a signal 2405 for changing the service to the external server 108.

In an embodiment, the signal for changing the content providing service may include at least one of the unique information of the external device 102, the unique information of the electronic device 101, or the first identity. However, this should not be considered as limiting.

In an embodiment although not shown in FIG. 24, the external server 108 may receive, from the external device 102, the first identity included in the signal for changing the content providing service or the signal including the second information (for example, when the external device 102 transmits the signal including the second information to the external server 108). The external server 108 may determine whether the first identity received from the external device 102 is the first identity transmitted to the electronic device 101 most recently (or generated most recently). In an embodiment, when the first identity received by the external server 108 from the external device 102 is different from the first identity transmitted to the electronic device 101 most recently (or when the first identity received from the external device 102 is the first identity generated previously), the external server 108 may change the content providing service.

In an embodiment although not shown in FIG. 24, the electronic device 101 may receive multimedia data (for example, multimedia data for generating a changed content list) from the external server 108. The electronic device 101 may output a content included in the changed content list, based at least in part on the received multimedia data.

In an embodiment although not shown in FIG. 24, when the first identity received by the external server 108 from the external device 102 is the same as the first identity transmitted to the electronic device 101 most recently (or when the first identity received from the external device 102 is the first identity generated most recently), the external server 108 may provide the content providing service continuously or for a specified time.

Figure 25A:
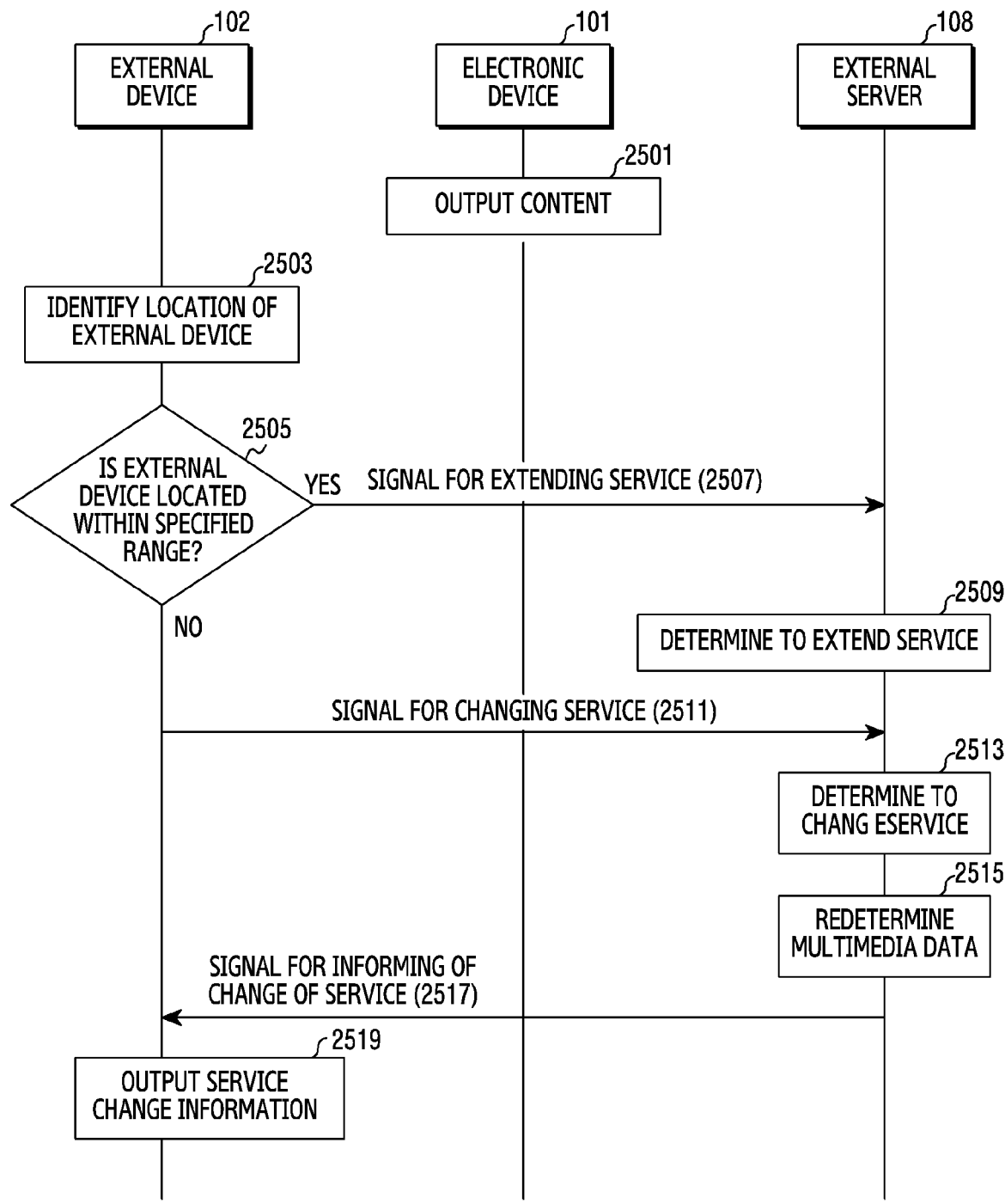
FIG. 25A is a view to illustrate a method for changing a content providing service based on a location of an external device according to various embodiments of the present disclosure.

FIG. 25A is a view to illustrate a method for changing a content providing service based on a location of the external device 102 according to various embodiments of the present disclosure.

Referring to FIG. 25A, in operation 2501, the electronic device 101 may output a content (or may be outputting a content). For example, the electronic device 101 may output the content based at least in part on profile information (or preference of a profile) of the user of the external device 102.

In operation 2503, the external device 102 may identify a location of the external device 102.

In an embodiment, the external device 102 may periodically identify the location of the external device 102.

In an embodiment, the external device 102 may identify the location of the external device 102 based at least in part on GPS or WPS. The external device 102 may identify whether the external device 102 is located within a specified range from the electronic device 101, based at least in part on the location of the external device 102.

In an embodiment, the external device 102 may receive information regarding the specified range from the electronic device 101. However, this should not be considered as limiting.

In operation 2505, when the external device 102 identifies that the external device 102 is located within the specified range from the electronic device 101, the external device 102 may transmit a signal for extending the content providing service to the external server 108 in operation 2507. In an embodiment, the signal for extending the content providing service, transmitted to the external server 108, may include unique information of the external device 102. However, this should not be considered as limiting.

In operation 2509, the external server 108 may determine to extend the content providing service. For example, the external server 108 may determine to generate multimedia data for the electronic device 101 to output a content based at least in part on the profile information (or preference for a profile) of the user of the external device 102, and to transmit the multimedia data to the electronic device 101.

In an embodiment, the external server 108 may further include a timer. In an embodiment, the external server 108 may determine whether the signal for extending the service is received from the external device 102 at specified time intervals by using the timer. When the external server 108 identifies that the signal for extending the service is not received from the external device 102 for a specified time set by the timer, the external server 108 may determine to change (or terminate) the content providing service. However, this should not be considered as limiting. When the external server 108 identifies that the signal for extending the service is received from the external device 102 within the specified time set by the timer, the external server 108 may determine to extend the content providing service, and may update (or initialize) the specified time set by the timer. However, this should not be considered as limiting.

In operation 2505, when the external device 102 identifies that the external device 102 is not located within the specified range from the electronic device 101, the external device 102 may transmit a signal for changing the content providing service to the external server 108 in operation 2511. In an embodiment, the signal for changing the content providing service, transmitted to the external server 108, may include the unique information of the external device 102. However, this should not be considered as limiting.

In operation 2513, the external server 108 may determine to change the content providing service.

In an embodiment, the external server 108 may determine to change the content providing service in response to the signal for changing the content providing service being received from the external device 102.

Operations 2515 to 2519 are the same as or similar to operations 2209 to 2213 of FIG. 22 at least in part, and thus a detailed description thereof is omitted.

In an embodiment although not shown in FIG. 25A, the electronic device 101 may receive multimedia data (for example, multimedia data for generating a changed content list) from the external server 108. The electronic device 101 may output a content included in the changed content list based at least in part on the received multimedia data.

Figure 25B:
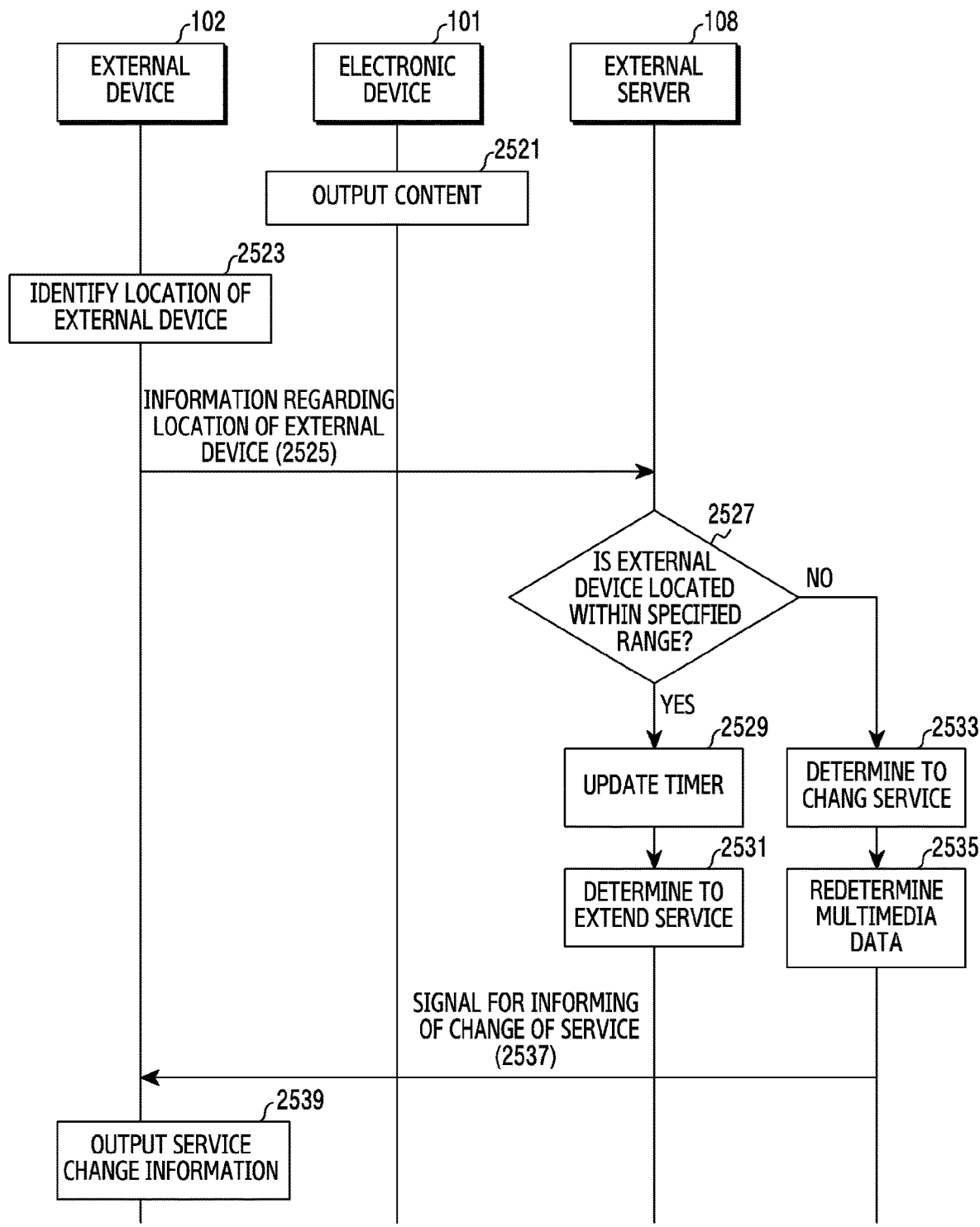
FIG. 25B is a view to illustrate a method for changing a content providing service based on a location of an external device according to various embodiments of the present disclosure.

FIG. 25B is a view to illustrate a method for changing a content providing service based on a location of the external device 102 according to various embodiments of the present disclosure.

Referring to FIG. 25*b*, in operation 2521, the electronic device 101 may output a content (or may be outputting a content). For example, the electronic device 101 may output the content based at least in part on profile information (or preference of a profile) of the user of the external device 102.

In operation 2523, the external device 102 may identify a location of the external device 102.

In an embodiment, the external device 102 may periodically identify the location of the external device 102.

For example, the external device 102 may identify the location of the external device 102 based at least in part on GPS or WPS.

In operation 2525, the external device 102 may transmit a signal including information regarding the location of the external device 102 to the external server 108. In an embodiment, the external device 102 may periodically transmit the signal including the information regarding the location of the external device 102 to the external server 108.

In operation 2527, the external server 108 may identify whether the external device 102 is located within a specified range from the electronic device 101, based at least in part on the information regarding the location of the external device 102.

In operation 2527, when it is identified that the external device 102 is located within the specified range from the electronic device 101, the external server 108 may update the timer in operation 2529. However, this should not be considered as limiting.

In operation 2531, the external server 108 may determine to extend the content providing service.

In an embodiment, when the external server 108 determines to extend the content providing service, the external server 108 may generate multimedia data for the electronic device 101 to output a content based at least in part on the profile information (or preference for a profile) of the user of the external device 102, and may transmit the multimedia data to the electronic device 101.

In operation 2527, when the external server 108 identifies that the external device 102 is not located within the specified range from the electronic device 101, the external server 108 may determine to change the content providing service in operation 2533.

Operations 2535 to 2539 are the same as or similar to operations 2407 to 2411 of FIG. 25A at least in part, and thus a detailed description thereof is omitted.

In an embodiment although not shown in FIG. 25B, the electronic device 101 may receive multimedia data (for example, multimedia data for generating a changed content list) from the external server 108. The electronic device 101 may output a content included in the changed content list based at least in part on the received multimedia data.

Figure 26:
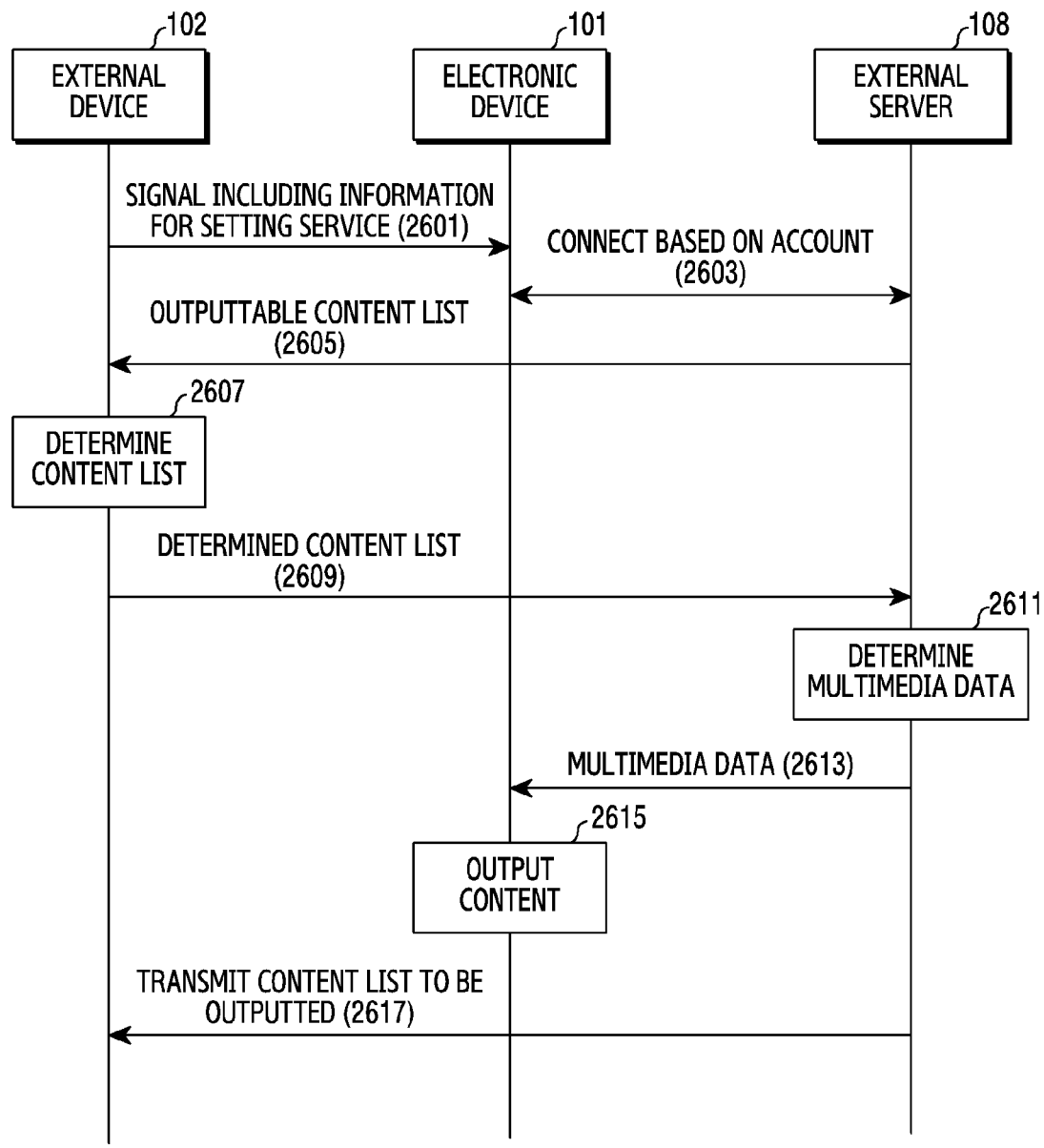
FIG. 26 is a view to illustrate a method for providing a content providing service according to various embodiments of the present disclosure.

FIG. 26 is a view to illustrate a method for providing a content providing service according to various embodiments of the present disclosure. For example, FIG. 26 is a view to illustrate a method for generating a content list to be outputted by the electronic device 101 first (or initially).

In operation 2601, the external device 102 may transmit a signal including information for setting a content providing service to the electronic device 101.

For example, when the electronic device 101 does not store information regarding the account of the user of the electronic device 101, or when the electronic device 101 does not store information for accessing (or approaching or logging in) the external server 108, the external device 102 may transmit, to the electronic device 101, information necessary for the electronic device 101 to receive the content providing service from the external server 108.

In an embodiment, the external device 102 and the electronic device 101 may be the devices of the same user. In an embodiment, the external device 102 may be a device which stores information regarding the account or the like of the user of the electronic device 101. However, this should not be considered as limiting.

Although not shown in FIG. 26, when the electronic device 101 includes an element for receiving information regarding the account or the like of the user of the electronic device 101 from the user, operation 2601 may be omitted. For example, when the electronic device 101 includes an interface such as a display device or an input device, the electronic device 101 may receive the information regarding the account or the like from the user. In an embodiment, the electronic device 101 may further include a microphone or the like for voice recognition. When the electronic device 101 includes the microphone, the electronic device 101 may obtain the information regarding the account or the like of the user of the electronic device 101, based at least in part on a voice signal inputted by the user. However, this should not be considered as limiting.

In operation 2603, the electronic device 101 may be connected with the external server 108 based on the account. In an embodiment, the electronic device 101 may set (or establish) an account-based session with the external server 108, based at least in part on the account.

In operation 2605, the external server 108 may transmit, to the external device 102, a content list that can be outputted by the electronic device 101.

In an embodiment, the outputtable content list may include contents which are determined based at least in part on authority (for example, digital right management (DRM), or the like) of the user of the electronic device 101 to receive the content providing service (for example, a music streaming service). However, this should not be considered as limiting.

In operation 2607, the external device 102 may determine a content list to be outputted through the electronic device 101 from among the received content lists. For example, the external device 102 may receive an input of selecting a content list to be outputted through the electronic device 101 from the user. The external device 102 may determine the content list to be outputted through the electronic device 101, based at least in part on the received input.

In operation 2609, the external device 102 may transmit information regarding the determined content list to the external server 108.

In operation 2611, the external server 108 may determine multimedia data regarding a content to be outputted by the electronic device 101.

In an embodiment, when a signal including the second information is received from a plurality of external devices 102, the external server 108 may determine to change the output order of the determined content list, received in operation 2609, based at least in part on the profile information (or preference) of the users of the plurality of external devices 102.

In another embodiment, when a signal including the second information is received from one external device 102, the external server 108 may determine to let the electronic device 101 output the content list based on the determined content list received in operation 2609.

In operation 2613, the external server 108 may transmit the multimedia data to the electronic device 101.

In operation 2615, the electronic device 101 may output the content based at least in part on the multimedia data received from the external server 108.

In operation 2617, the external server 108 may transmit information regarding the content list (or redetermined content list) to be outputted (or scheduled to be outputted) by the electronic device 101.

In an embodiment, the information regarding the content list to be outputted by the electronic device 101 may further include information regarding an order in which contents included in the content list are outputted by the electronic device 101. However, this should not be considered as limiting.

Although not shown in FIG. 26, the external device 102 may output the content list which is outputted by the electronic device 101, based at least in part on information regarding the content list outputted from the electronic device 101, received in operation 2617.

Figure 27A:
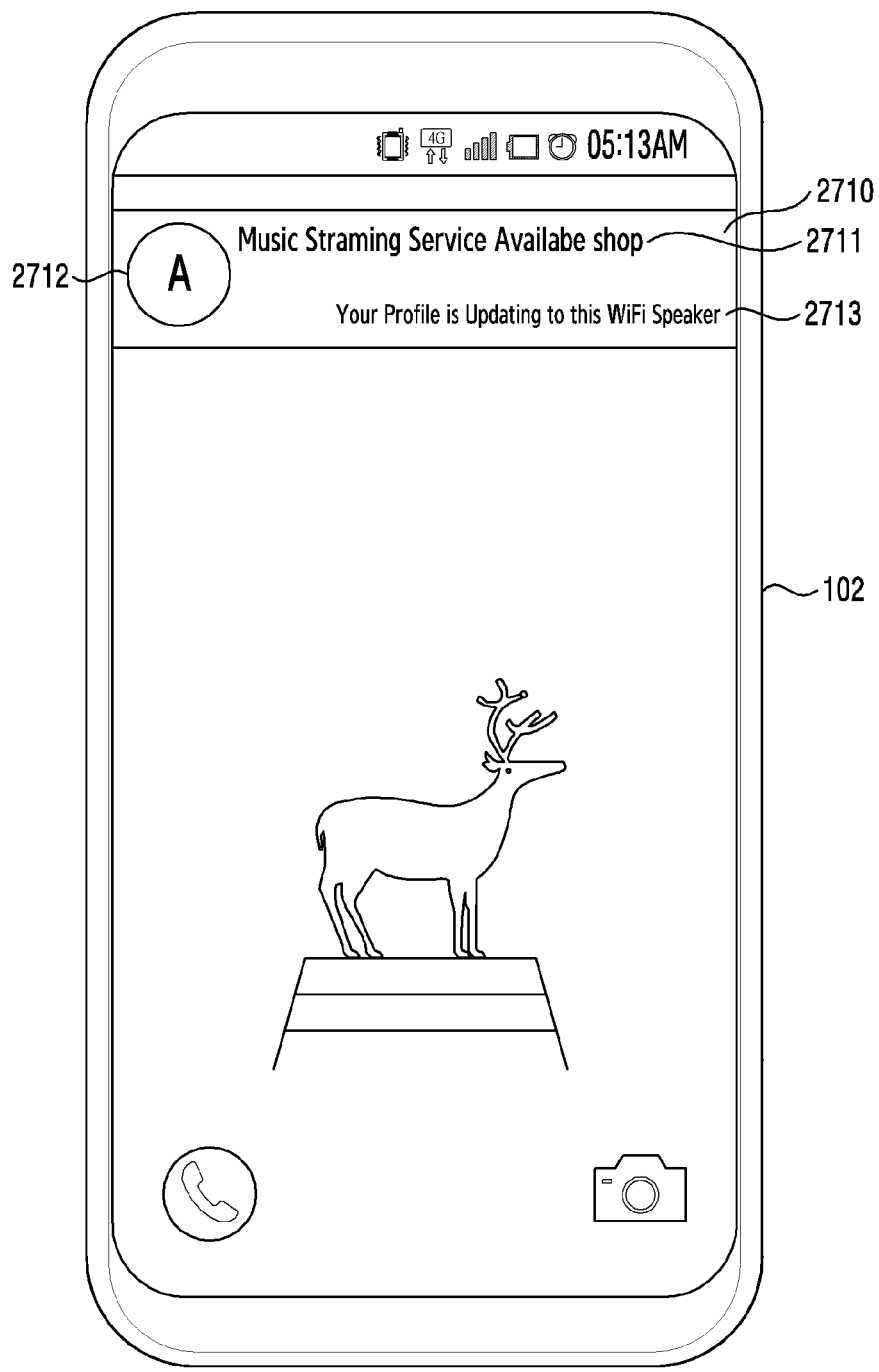
FIGS. 27A to 27C are views illustrating a method for providing a content providing service according to various embodiments of the present disclosure.
Figure 27B:
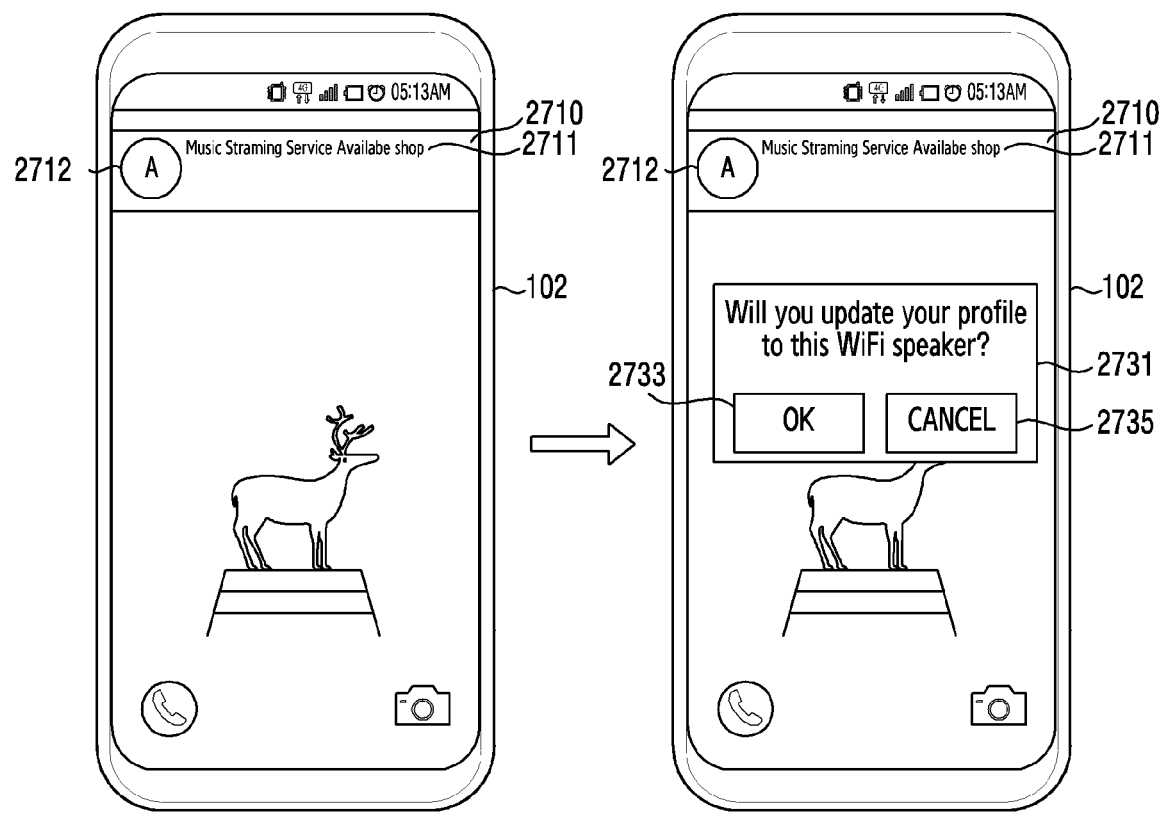
Figure 27C:
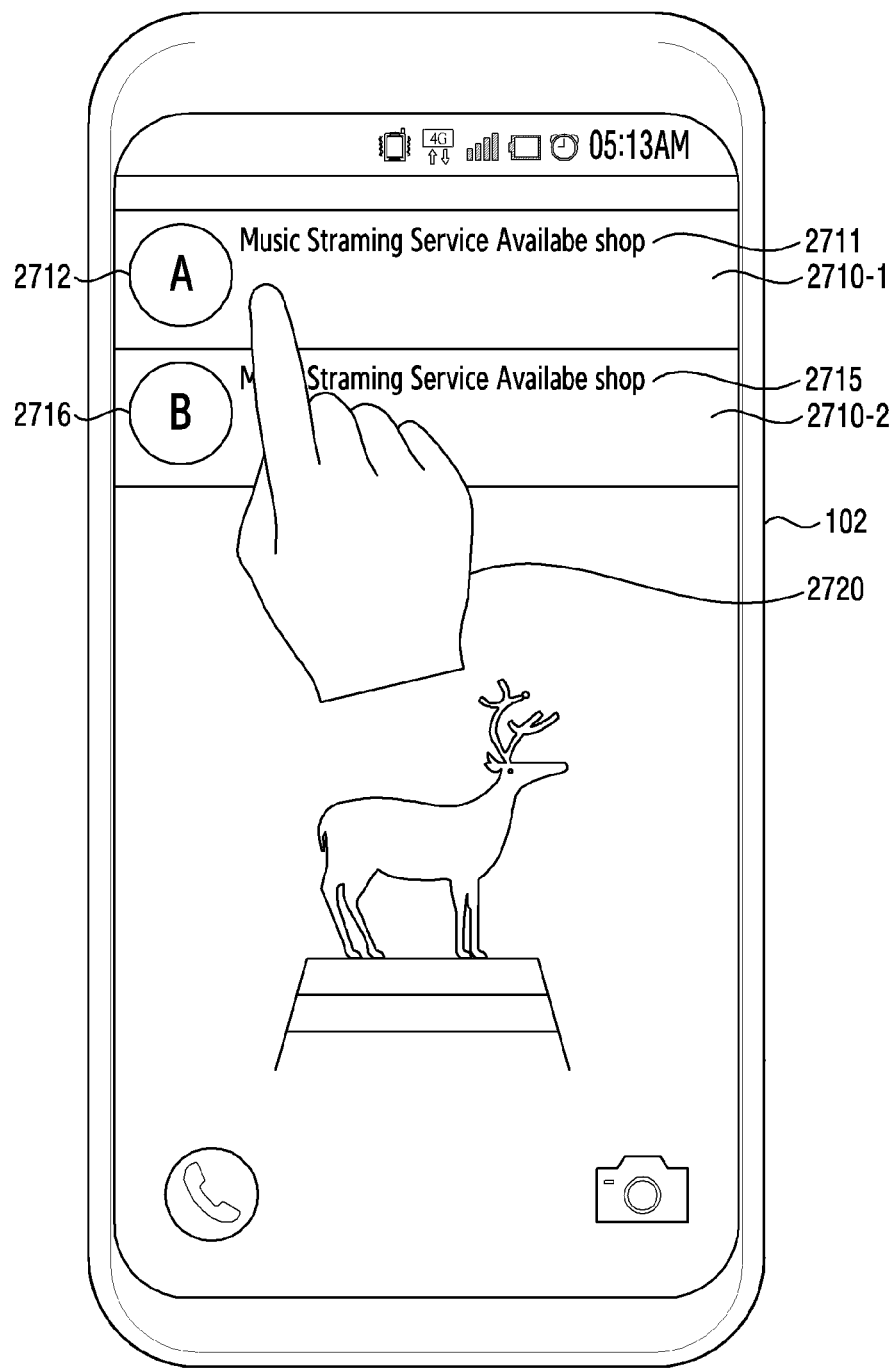

FIGS. 27A to 27C are views to illustrate a method for providing a content providing service according to various embodiments of the present disclosure.

In an embodiment, FIG. 27A illustrates a screen outputted on the external device 102 when the external device 102 receives a beacon signal from the electronic device 101.

In FIG. 27A, the external device 102 may output, on a certain region 2710 of the display device of the external device 102, a logo 2712 regarding a store where the electronic device 101 is placed, and a phrase 2711 indicating that the store is able to provide a content providing service (or a streaming service), and simultaneously, may output a phrase 2713 indicating that the external device 102 is transmitting the second information to the external server 108.

In an embodiment, FIG. 27A illustrates an example in which, when information including the first information is received from the electronic device 101, the external device 102 transmits the second information to the external server 108 without an input from the user of the external device 102 (or automatically).

In an embodiment, although FIG. 27A depicts that the external device 102 outputs the logo 2712 regarding the store where the electronic device 101 is placed, and the phrase 2711 indicating that the store is able to provide the content providing service through the certain region 2710 of the display device of the external device 102, and simultaneously, outputs the phrase 2713 indicating that the external device 102 is transmitting the second information to the external server 108, this should not be considered as limiting. For example, the external device 102 may output information in various forms such as a pop-up window or a quick panel.

In an embodiment, FIG. 27B illustrates an example in which, when the external device 102 receives the beacon signal from the electronic device 101 and outputs information, the external device 102 transmits the second information to the external server 108 by receiving a user input.

In an embodiment, in FIG. 27B, when a user 2720 touches the certain region 2710 of the display device, the external device 102 may output an object 2731 for receiving an input for identifying whether to transmit the second information to the external server 108 from the user. When an input on an object 2733 is received from the user, the external device 102 may transmit the second information to the external server 108. When an input on an object 2735 is received from the user, the external device 102 may not transmit the second information to the external server 108 and may make the object 2731 disappear from the screen.

In an embodiment, FIG. 27C illustrates a screen outputted on the external device 102 when the external device 102 receives beacon signals from a plurality of electronic devices 101.

In FIG. 27C, the external device 102 may output, on a certain region 2710-1 of the display device of the external device 102, a logo 2712 regarding a first store where a first electronic device 101 is placed, and a phrase 2711 indicating that the first store is able to provide a content providing service, and may output, on another region 2710-2, a logo 2716 regarding a second store where a second electronic device 101 is placed, and a phrase 2715 indicating that the second store is able to provide a content providing service. In an embodiment, when an input of selecting the first store or the second store (for example, an input on the region 2710-1 or another region 2710-2) is received from the user, the external device 102 may transmit the second information received from an electronic device corresponding to the input (or selected region) to the external server 108.

Figure 28:
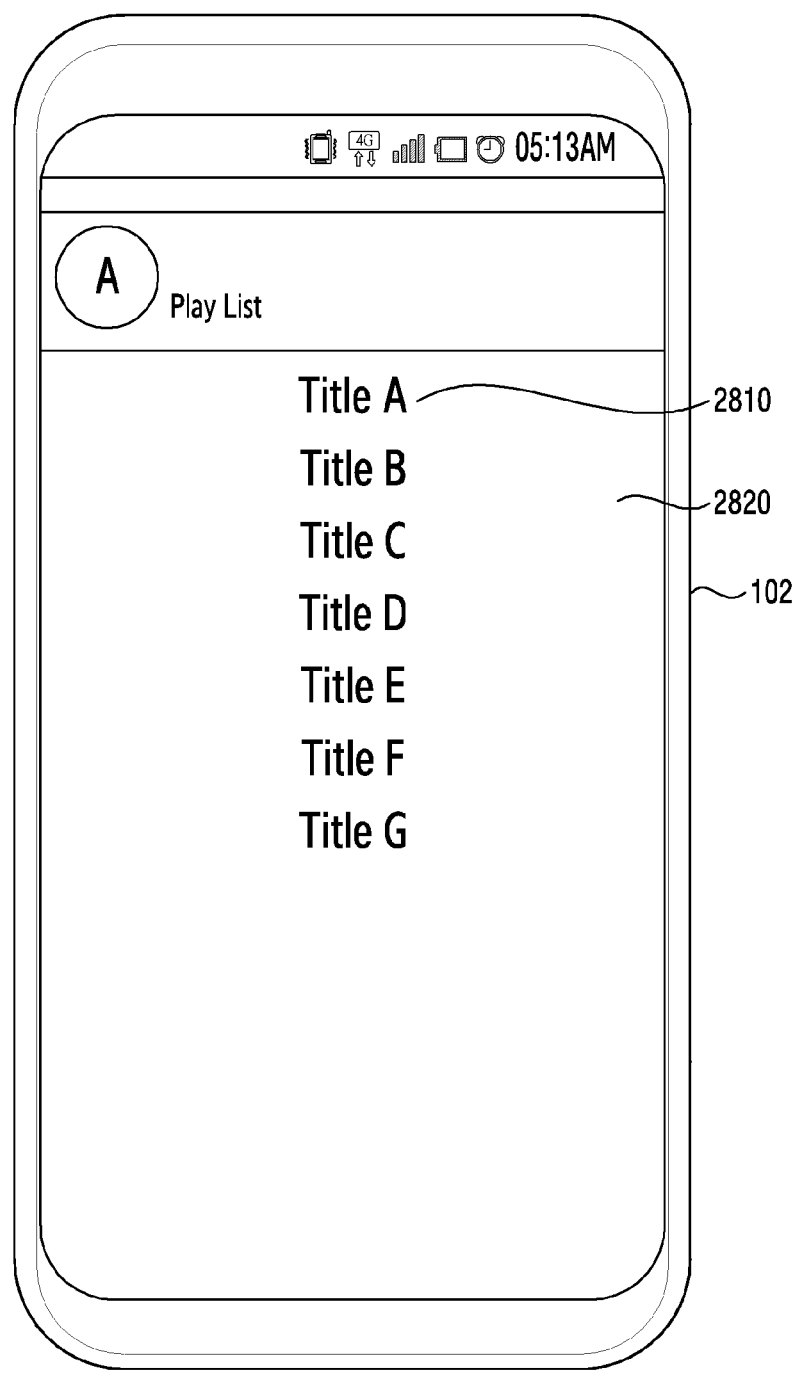
FIG. 28 is a view to illustrate a method for providing a content providing service according to various embodiments of the present disclosure.

FIG. 28 is a view to illustrate a method for providing a content providing service according to various embodiments of the present disclosure. For example, FIG. 28 illustrates an example in which the external device 102 displays a content list which is currently outputted (or is being currently outputted) by the electronic device 101.

In an embodiment, as shown in FIG. 28, the external device 102 may display a content list 2810 including contents currently outputted by the electronic device 101 on a certain region 2820 of the display device. For example, the external device 102 may display titles of music as the content list 2810. In an embodiment, although FIG. 28 depicts that the titles of songs are outputted, this should not be considered as limiting. For example, the external device 102 may further display a variety of information such as genres, composers, or tempos of music in addition to the titles of songs.

Figure 29:
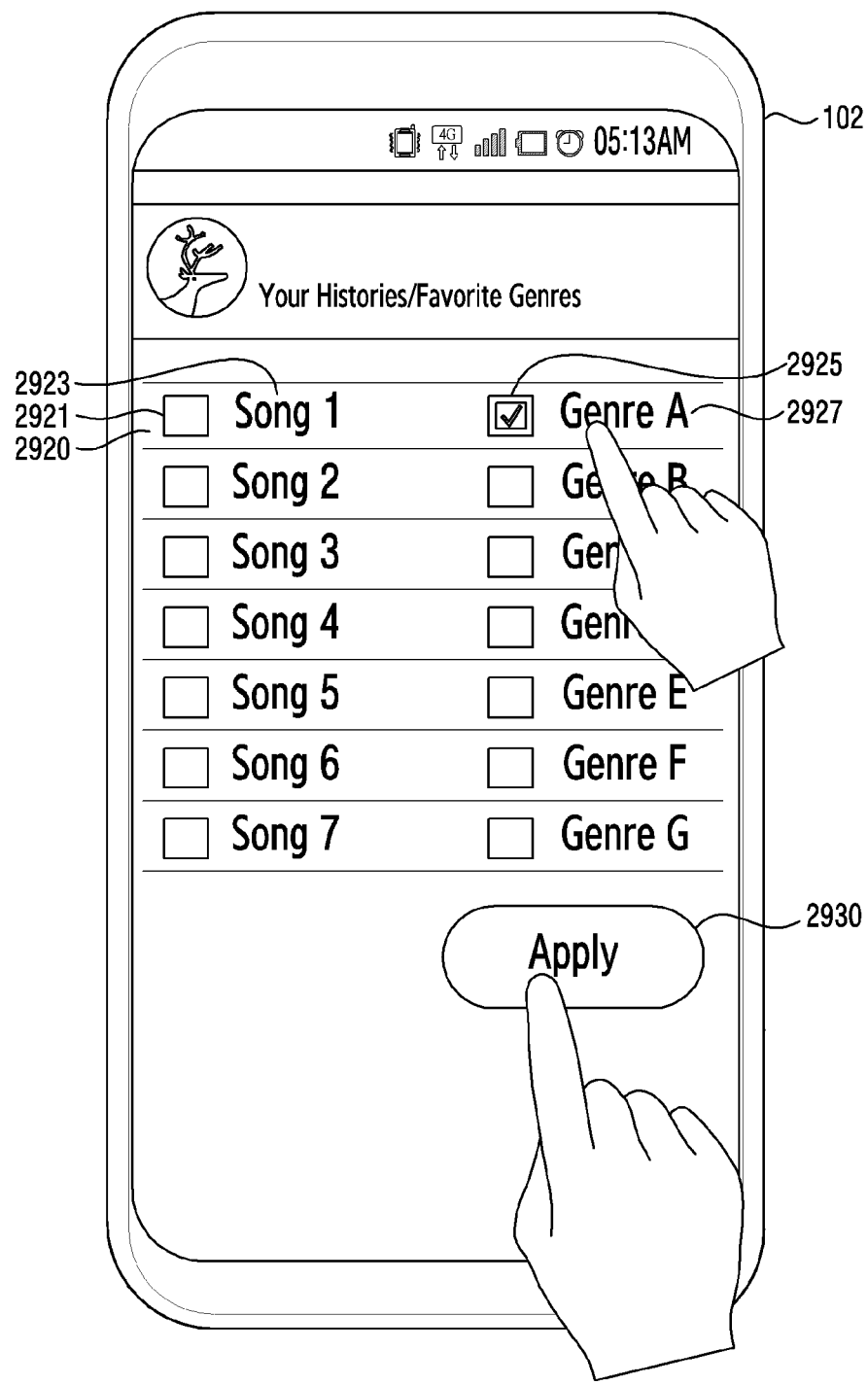
FIG. 29 is a view to illustrate a method for providing a content providing service according to various embodiments of the present disclosure.

FIG. 29 is a view illustrating a method for providing a content providing service according to various embodiments of the present disclosure. For example, FIG. 29 illustrates an example in which the external device 102 displays information regarding a history of the user of having been provided with contents from the external server 108 (or having been outputted through the external device 102), and the user of the external device 102 intends to reflect profile information to a content to be outputted by the electronic device 101.

In an embodiment, as shown in FIG. 29, the external device 102 may display titles 2923 and genres 2927 on a certain region 2920 as a history regarding contents of the user of the external device 102. In an embodiment, the external device 102 may display objects 2921, 2925 in order for the user of the external device 102 to select a title or a genre to reflect the profile (or preference) to the music to be outputted by the electronic device 101. In an embodiment, when at least one of the titles or genres is selected by the user input, the external device 102 may transmit, to the external server 108, a signal including information regarding at least one of the titles or genres that is selected and the second information (for example, the first identity, the unique information of the electronic device 101, and the information for requesting provision of a content), in response to an input on an object 2930 being received. However, this should not be considered as limiting.

Figure 30:
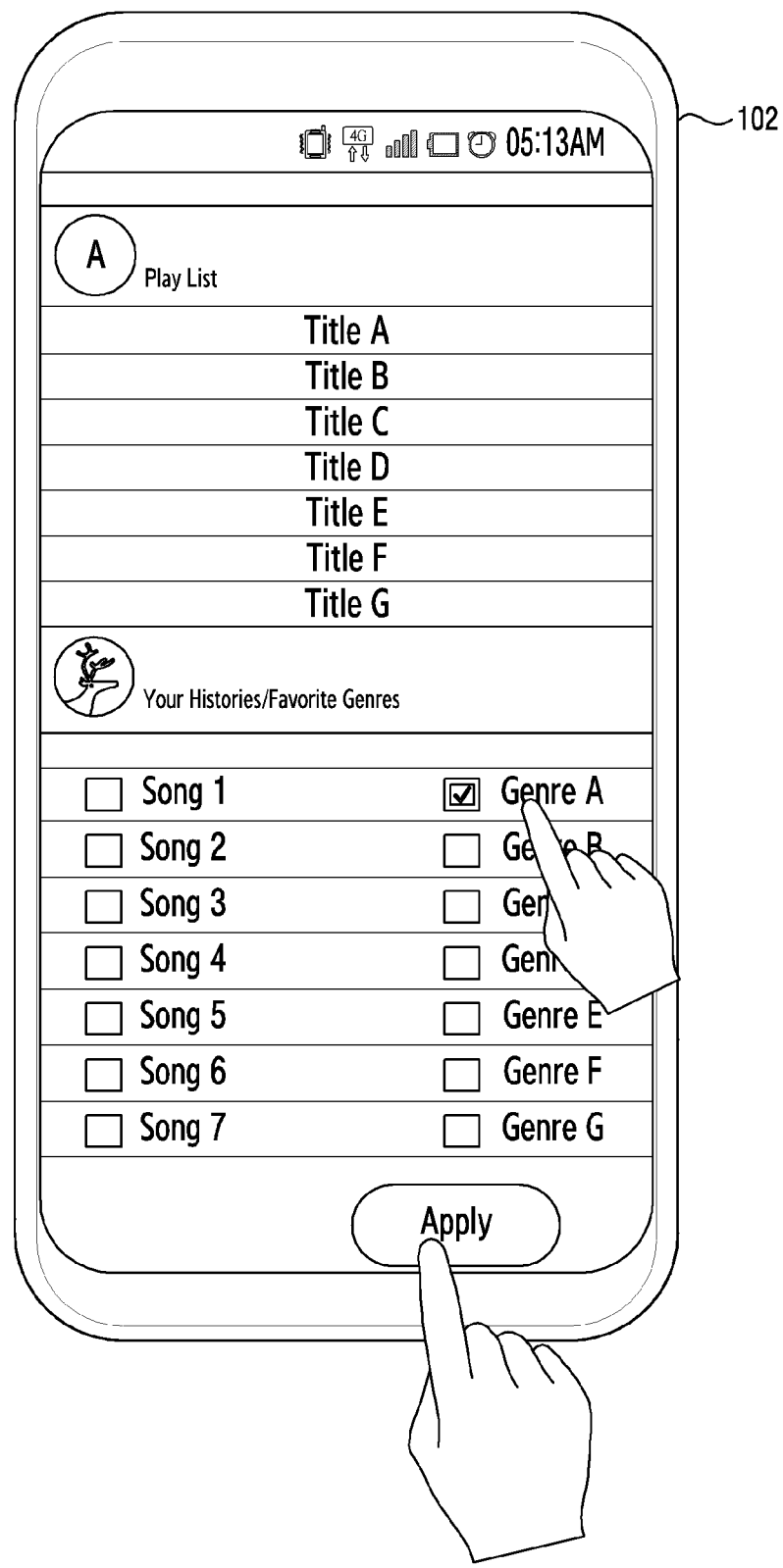
FIG. 30 is a view to illustrate a method for providing a content providing service according to various embodiments of the present disclosure.

FIG. 30 is a view to illustrate a method for providing a content providing service according to various embodiments of the present disclosure. For example, FIG. 30 illustrates an example in which the external device 102 of FIG. 28 displays the content list which is currently outputted (or is being currently outputted) by the electronic device 101, and also displays the history of the user of the external device 102 of FIG. 29 regarding the contents as shown in FIG. 29.

In an embodiment, the external server 108 may determine information regarding the content list based at least in part on the history information of the user regarding the contents. In an embodiment, the external device 102 may display the content list based at least in part on the information regarding the content list, received from the external server 108. In an embodiment, while the electronic device 101 outputs a content based at least in part on the content list, the external device 102 may receive an input of additionally selecting at least one of the titles or the genres from the user. The external device 102 may transmit information regarding the additionally selected at least one of the titles or genres to the external server 108. The external server 108 may change the information regarding the content list by reflecting the information regarding the additionally selected at least one of the titles or genres. The external server 108 may transmit the information regarding the changed content list to the external device 102. The external device 102 may display the content list, based at least in part on the information regarding the changed content list, received from the external server 108.

However, FIG. 30 is merely an example, and the external device 102 may display the content list which is currently outputted (or is currently being outputted) by the electronic device 101, and the history of the user of the external device 102 regarding the contents in various methods.

Figure 31A:
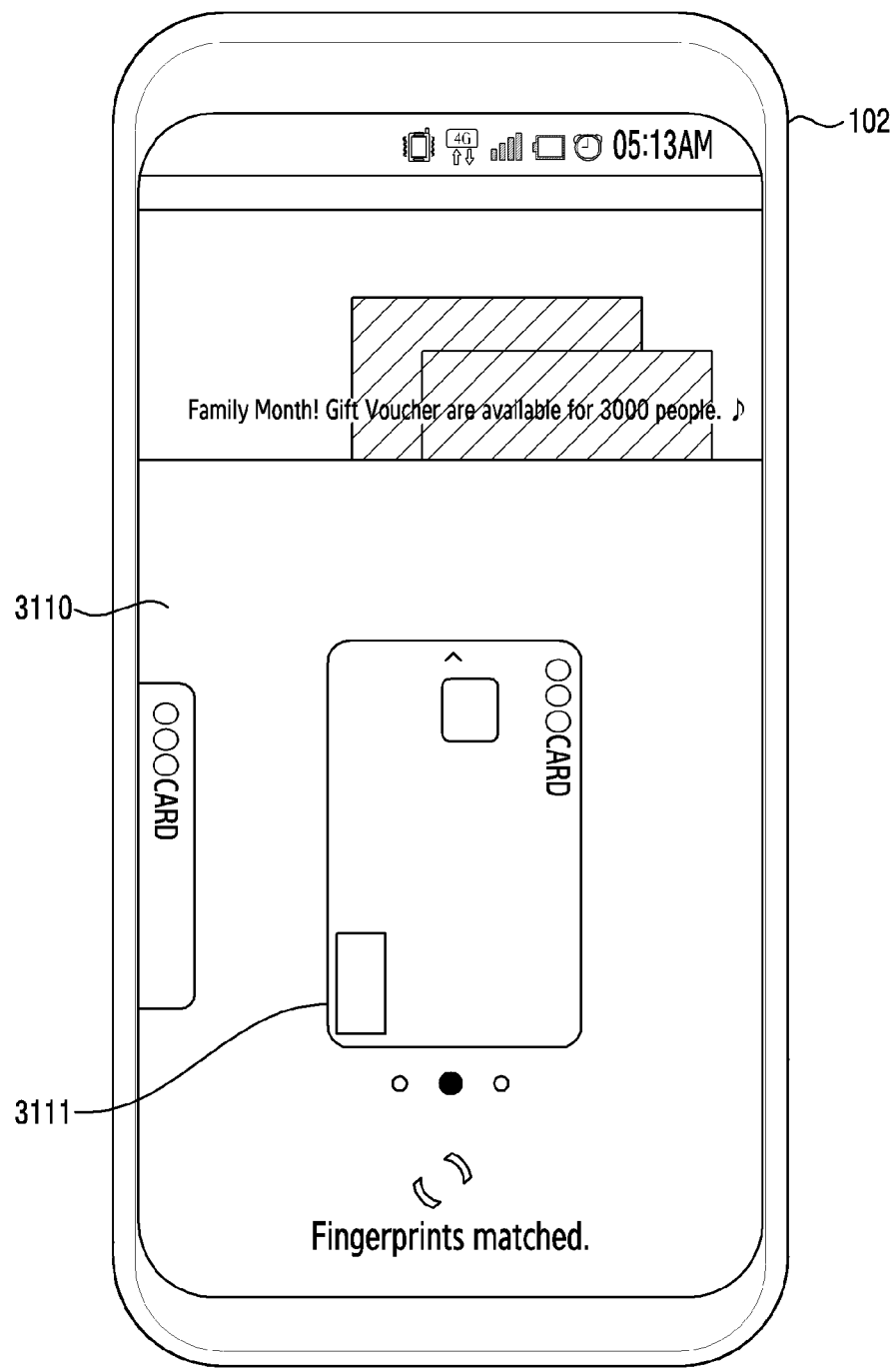
FIGS. 31A and 31B are views to illustrate a method for providing a content providing service according to various embodiments of the present disclosure.
Figure 31B:
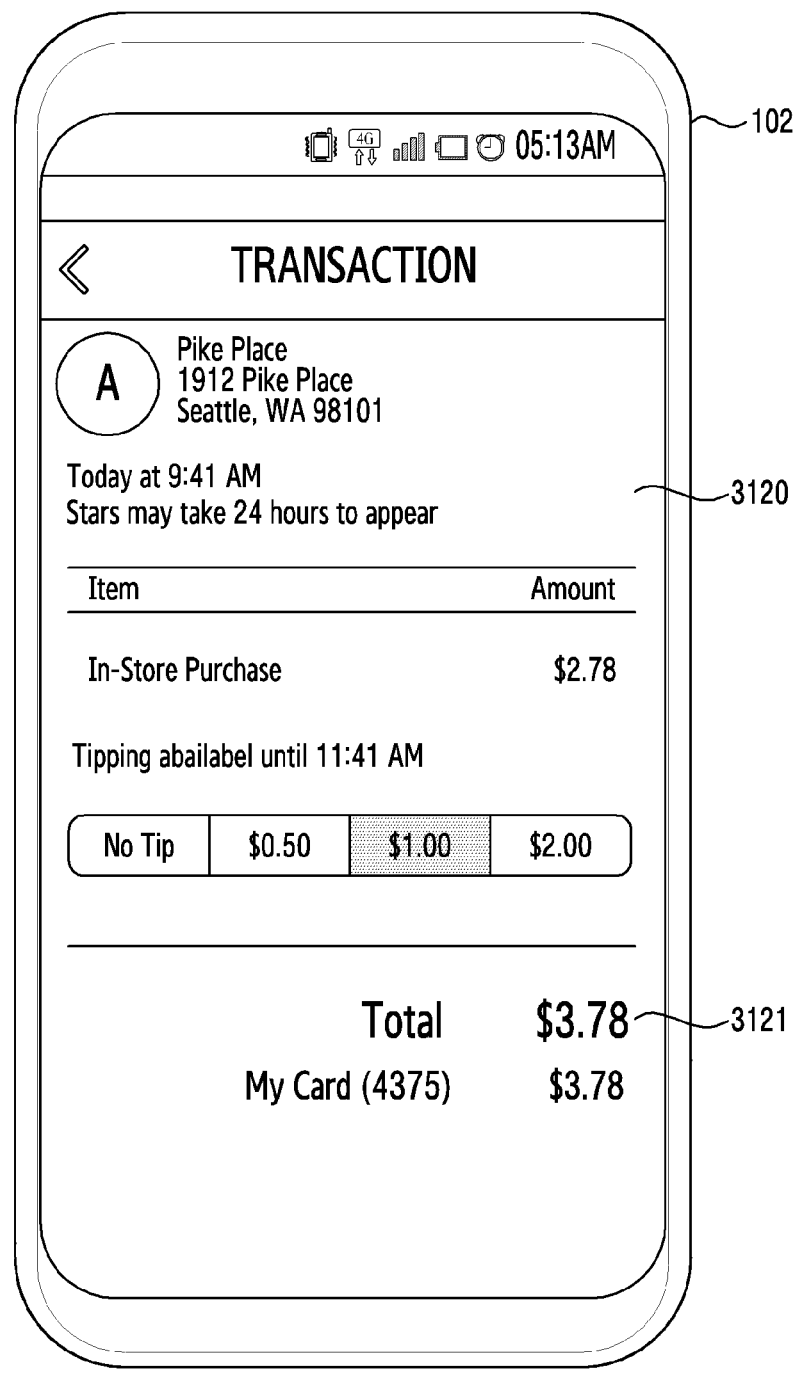

FIGS. 31A and 31B are views to illustrate a method for providing a content providing service according to various embodiments of the present disclosure. For example, FIGS. 31A and 31B illustrate an example related to a mobile payment service.

In an embodiment, as shown in FIG. 31A, the external device 102 may display a screen for a payment. For example, the external device 102 may perform an authentication process by using a user's fingerprint or the like, and then may display a screen 3110 for selecting a card 311 for paying. However, the screen 3110 displayed on the display device of the external device 102 is not limited to that of FIG. 31A.

In an embodiment, as shown in FIG. 31B, the external device 102 may receive information regarding the payment from the payment server 2107, and may display a screen 3120 regarding the received information regarding the payment. For example, as shown in FIG. 31B, the external device 102 may display information regarding a store related to a place where the payment is made, a payment time, a payment amount 3121 or the like. However, the information regarding the payment displayed by the external device 102 is not limited to the above-described example, and the method for displaying the information regarding the payment is not limited to the screen of FIG. 31B.

In an embodiment, the external device 102 may transmit the second information and the information identifying the payment (or information identifying payment completion) to the external server 108, in response to the information regarding the payment being received from the payment server 2107.

In an embodiment, when the second information and the information identifying the payment are received, the external server 108 may determine a time to provide the content service according to the payment amount. For example, the external server 108 may determine multimedia data to let the electronic device 101 output a content reflecting profile information (or preference) of the user of the external device 102 for a time proportional to the payment amount 3121. However, this should not be considered as limiting.

In an embodiment, when the second information and the information identifying the payment are received, the external server 108 may determine multimedia data to let the electronic device 101 output a content reflecting profile information (or preference) of the user of the external device 102 for a specified (or predetermined) time. However, this should not be considered as limiting.

Figure 32A:
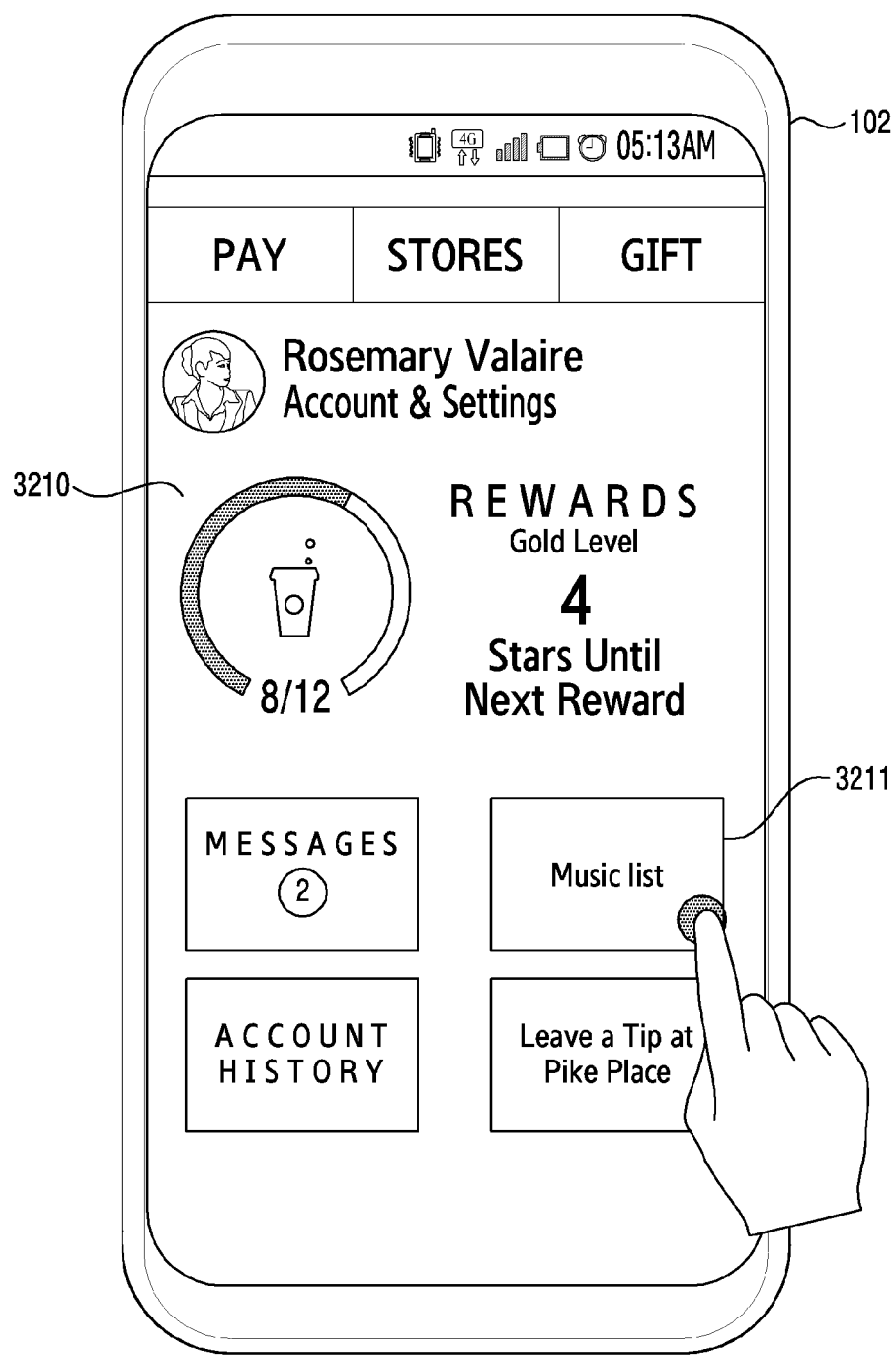
FIGS. 32A and 32B are views to illustrate a method for providing a content providing service according to various embodiments of the present disclosure.
Figure 32B:
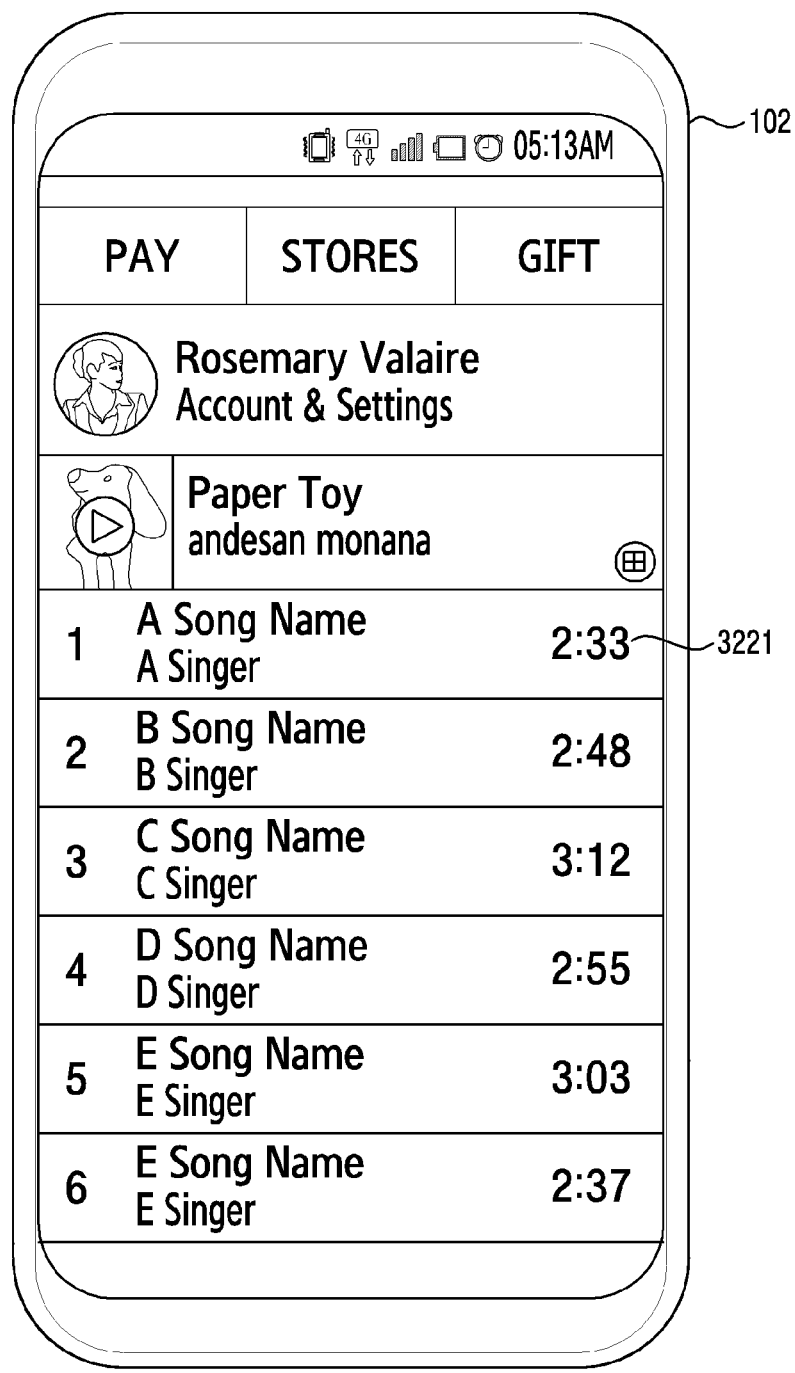

FIGS. 32A and 32B are views to illustrate a method for providing a content providing service according to various embodiments of the present disclosure. For example, FIGS. 32A and 32B illustrate an example of displaying a screen 3210 related to a content providing service in a screen of execution of an application related to a service provided by a store where the electronic device 101 is placed (or a company of the store).

In an embodiment, as a portion of the application regarding the service provided by the store where the electronic device 101 is placed, an application for the content providing service may be installed. However, this should not be considered as limiting.

In an embodiment, as shown in FIG. 32A, the external device 102 may display an object 3211 indicating a music list outputted by the electronic device 101 in the screen of the execution of the application regarding the service provided by the store where the electronic device 101 is placed.

In an embodiment, when the user of the external device 102 inputs an input on the object 3211, the external device 102 may display a list of music 3221 outputted by the electronic device 101 as shown in FIG. 32B.

Figure 33A:
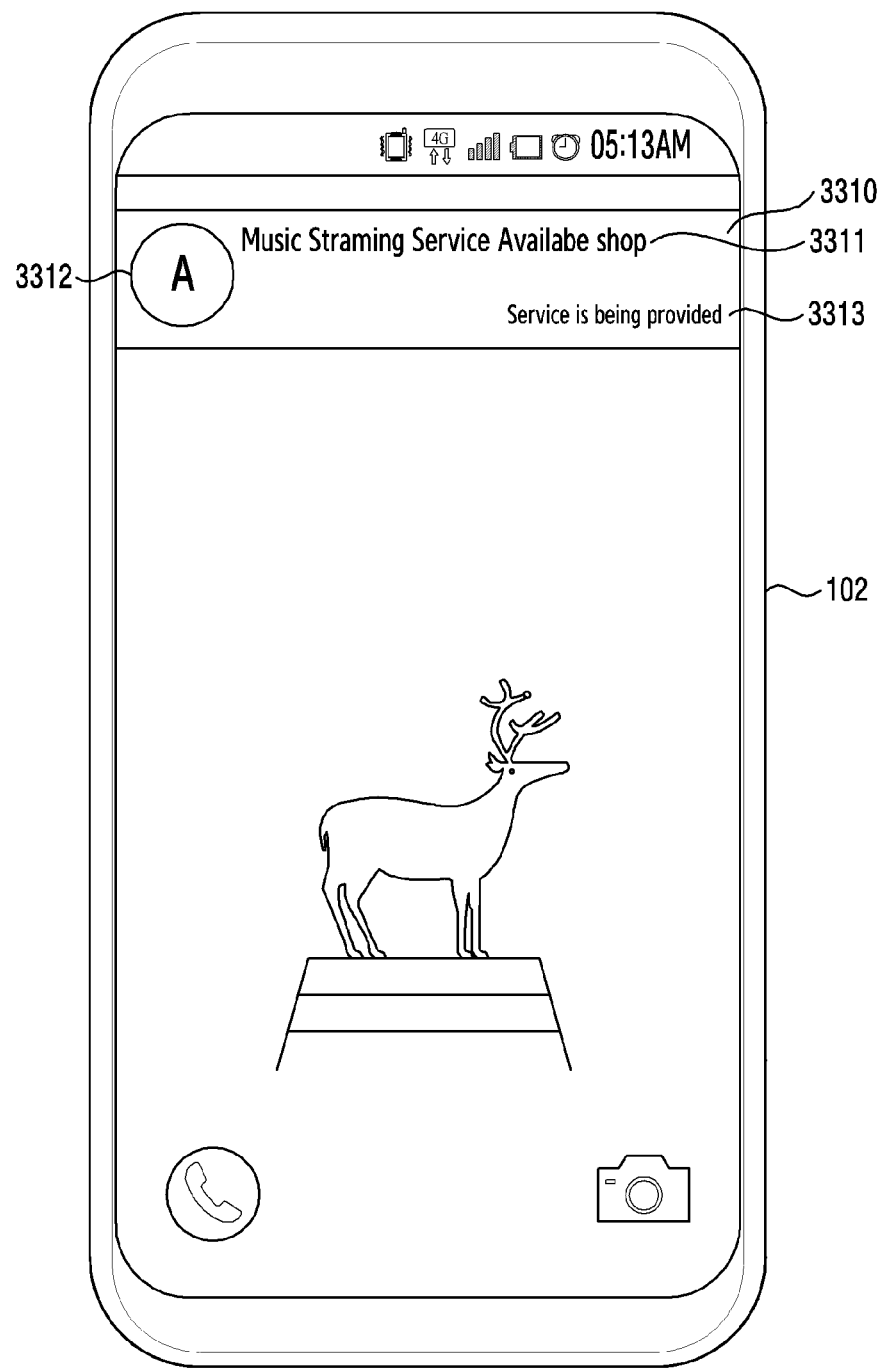
FIGS. 33A and 33B are views to illustrate a method for providing a content providing service according to various embodiments of the present disclosure.
Figure 33B:
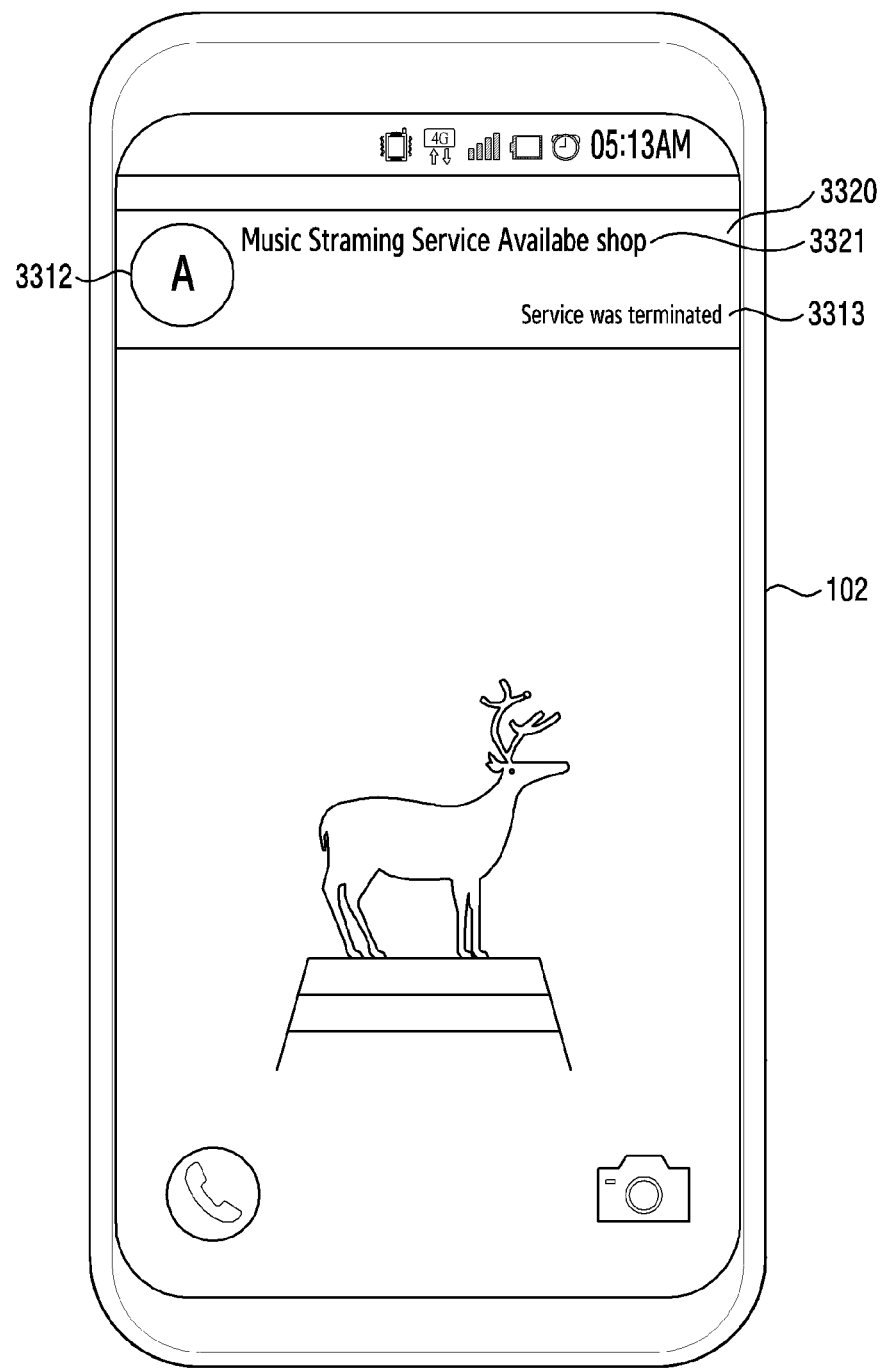

FIGS. 33A and 33B are views to illustrate a method for providing a content providing service according to various embodiments of the present disclosure. For example, FIGS. 33A and 33B illustrate an example of displaying information regarding a state in which the content providing service is provided.

In an embodiment, as shown in FIG. 33A, the external device 102 may output, on a certain region 3310 of the display device of the external device 102, a logo 3312 regarding a store where the electronic device 101 is placed, and a phrase 3311 indicating that the store is able to provide the content providing service, and simultaneously, may output a phrase 3313 indicating that the external server 108 is providing the content providing service reflecting the profile of the user of the external device 102 to the electronic device 101. However, this should not be considered as limiting. For example, the external device 102 may display a screen indicating that the external server 108 is providing the content providing service reflecting the profile of the user of the external device 102 to the electronic device 101 in various forms.

In an embodiment, as shown in FIG. 33B, the external device 102 may output, on a certain region 3320 of the display device of the external device 102, the logo 3312 regarding the store where the electronic device 101 is placed, and a phrase 3321 indicating that the store is able to provide the content providing service, and simultaneously, may output a phrase 3313 indicating that the external server 108 is not providing the content providing service reflecting the profile of the user of the external device 102 to the electronic device 101 (or a phrase indicating a change of the content providing service). However, this should not be considered as limiting. For example, the external device 102 may display a screen indicating that the external server 108 is not providing the content providing service reflecting the profile of the user of the external device 102 to the electronic device 101 (or a screen informing a change of the content providing service) in various forms.

According to various embodiments of the present disclosure, a method for providing a content in the electronic device 101 includes: transmitting a plurality of first beacon signals for wireless connection by using a communication circuit (for example, the communication module 190, the communication module 290) during first time periods; detecting at least one second beacon signal for wireless connection, transmitted from the external device 102, by using the communication circuit (for example, the communication module 190, the communication module 290), during one period of second time periods which are different from the first time periods; receiving multimedia data from the external server 108 after detecting the at least one second beacon signal; and outputting at least one of an audio, an image, or a video based at least in part on the multimedia data.

According to various embodiments, the method may further include transmitting information regarding the external device 102 to the external server 108 after detecting the at least one second beacon signal.

According to various embodiments, the method may further include: determining that the at least one second beacon signal is not detected anymore; and, when it is determined that the at least one second beacon signal is not detected anymore, stopping outputting at least one of the audio, the image, or the video.

According to various embodiments, the plurality of first beacon signals may include first information regarding the electronic device 101, and the first information may include at least one of a MAC address of the electronic device 101, or a UUID of the electronic device 101.

According to various embodiments, the multimedia data may include at least one of sound data or music data.

According to various embodiments, the multimedia data may include at least one of image data or video data.

According to various embodiments, the method may further include periodically receiving identities related to the multimedia data from the external server 108.

According to various embodiments, the plurality of first beacon signals may include the identities.

According to various embodiments, the electronic device 101 may be configured to support NAN.

In addition, the structure of the data used in the above-described embodiments of the present disclosure may be recorded on a computer readable recording medium through various means. The computer readable recording medium may include a storage medium such as a magnetic storage medium (for example, a read only memory (ROM), a floppy disk, a hard disk, or the like) and an optical reading medium (for example, a CD-ROM, a DVD, or the like).

In an embodiment, the computer readable recording medium may record a program for executing in the electronic device 101: transmitting a plurality of first beacon signals for wireless connection by using a communication circuit (for example, the communication module 190, the communication module 290) during first time periods; detecting at least one second beacon signal for wireless connection, transmitted from the external device 102, by using the communication circuit (for example, the communication module 190, the communication module 290), during one period of second time periods which are different from the first time periods; receiving multimedia data from the external server 108 after detecting the at least one second beacon signal; and outputting at least one of an audio, an image, or a video based at least in part on the multimedia data.

The present disclosure has been described with reference to various example embodiments thereof. It will be understood by a person skilled in the art that the present disclosure can be implemented in modified forms without departing from the essential characteristics of the present disclosure. Therefore, disclosed embodiments should be considered from a descriptive perspective, not from a limited perspective. The scope of the present disclosure is defined not by the detailed description but by the appended claims, and all differences within the scope should be understood as being included in the present disclosure.

The invention claimed is:

1. An electronic device comprising:
a housing;
a user interface exposed through a portion of the housing;
at least one communication circuit configured to discover and connect to another electronic device wirelessly without an access point or a base station;
at least one processor operatively connected with the user interface and the communication circuit; and
a memory operatively connected with the processor,
wherein, when being executed, the memory stores instructions that cause the processor to:
transmit a plurality of first beacon signals including first information for identifying a content providing service to an external device for wireless connection by using the communication circuit during first time periods,
detect at least one second beacon signal for wireless connection, transmitted from the external device, by using the communication circuit, during one period of second time periods which are different from the first time periods,
receive, based on at least part of the first information, multimedia data from an external server after detecting the at least one second beacon signal, and
output at least one of an audio, an image, or a video based at least in part on the multimedia data,
wherein the first information includes an identifier for identifying the content providing service or information indicating the content providing service.

2. The electronic device of claim 1, wherein the memory stores instructions that cause the processor to transmit information regarding the external device to the external server after detecting the at least one second beacon signal.

3. The electronic device of claim 1, wherein the memory further stores instructions that cause the processor to determine that the at least one second beacon signal is not detected anymore, and, when it is determined that the at least one second beacon signal is not detected anymore, to stop outputting at least one of the audio, the image, or the video.

4. The electronic device of claim 1, wherein the first information comprises at least one of a MAC address of the electronic device, or a UUID of the electronic device.

5. The electronic device of claim 1, wherein the user interface further comprises a speaker, and
wherein the multimedia data comprises at least one of sound data or music data.

6. The electronic device of claim 1, wherein the user interface further comprises a display, and
wherein the multimedia data comprises at least one of image data or video data.

7. The electronic device of claim 1, wherein the memory further stores instructions that cause the processor to periodically receive identities related to multimedia data from the external server.

8. The electronic device of claim 7, wherein the plurality of first beacon signals comprises the identities.

9. The electronic device of claim 1, wherein the communication circuit is configured to support NAN.

10. A method for providing a content in an electronic device, the method comprising:
transmitting a plurality of first beacon signals including first information for identifying a content providing service to an external device for wireless connection by using a communication circuit during first time periods;
detecting at least one second beacon signal for wireless connection, transmitted from the external device, by using the communication circuit, during one period of second time periods which are different from the first time periods;
receiving, based on at least part of the first information, multimedia data from an external server after detecting the at least one second beacon signal; and
outputting at least one of an audio, an image, or a video based at least in part on the multimedia data,
wherein the first information includes an identifier for identifying the content providing service or information indicating the content providing service.

11. The method of claim 10, further comprising transmitting information regarding the external device to the external server after detecting the at least one second beacon signal.

12. The method of claim 10, further comprising:
determining that the at least one second beacon signal is not detected anymore; and
when it is determined that the at least one second beacon signal is not detected anymore, stopping outputting at least one of the audio, the image, or the video.

13. The method of claim 10, wherein the first information comprises at least one of a MAC address of the electronic device, or a UUID of the electronic device.

14. The method of claim 10, wherein the multimedia data is determined based at least in part on profile information of a user of the external device.

15. The method of claim 10, wherein the electronic device is configured to support BLE.

16. The method of claim 10, further comprising periodically receiving identities related to the multimedia data from the external server.

17. The method of claim 16, wherein the plurality of first beacon signals comprises the identities.

18. The method of claim 10, wherein the electronic device is configured to support NAN.

19. An electronic device comprising:
a housing;

a user interface exposed through a portion of the housing;
at least one communication circuit configured to discover and connect to another electronic device wirelessly without an access point or a base station;
at least one processor operatively connected with the user interface and the communication circuit; and
a memory operatively connected with the processor,
wherein, when being executed, the memory stores instructions that cause the processor to:
  transmit a plurality of first beacon signals including first information for identifying a content providing service to an external device for wireless connection by using the communication circuit during first time periods,
  detect at least one second beacon signal for wireless connection, transmitted from an external device, by using the communication circuit, during one period of second time periods which are different from the first time periods,
  transmit information regarding the external device to an external server after detecting the at least one second beacon signal, and
  receive, based on at least part of the first information, information regarding multimedia data to be outputted by the external device from the external server.

20. The electronic device of claim 19, wherein the first information comprises at least one of a MAC address of the external device, or a UUID of the external device, and
  wherein the plurality of first beacon signals comprise identities related to the multimedia data periodically transmitted to the external device by the external server.

* * * * *